United States Patent
Takahashi et al.

(10) Patent No.: US 8,426,761 B2
(45) Date of Patent: Apr. 23, 2013

(54) METHOD OF DETECTION OF WELDING WORKPIECE POSITION USING MOVABLE ELECTRODE

(75) Inventors: Hiromitsu Takahashi, Yamanashi (JP);
Toshimichi Aoki, Yamanashi (JP);
Akinori Nishimura, Yamanashi (JP)

(73) Assignee: Fanuc Ltd (JP)

( * ) Notice: Subject to any disclaimer, the term of this patent is extended or adjusted under 35 U.S.C. 154(b) by 425 days.

(21) Appl. No.: 12/883,713

(22) Filed: Sep. 16, 2010

(65) Prior Publication Data
US 2011/0089146 A1     Apr. 21, 2011

(30) Foreign Application Priority Data

Oct. 21, 2009   (JP) .................. 2009-242624
Oct. 21, 2009   (JP) .................. 2009-242708
Oct. 30, 2009   (JP) .................. 2009-250104

(51) Int. Cl.
*B23K 11/10*     (2006.01)
*B23K 9/28*      (2006.01)
*G06F 19/00*     (2011.01)
*B23K 11/00*     (2006.01)

(52) U.S. Cl.
USPC ........ 219/91.2; 219/87; 219/86.41; 219/86.7; 219/110; 219/117.1; 219/86.1; 700/245

(58) Field of Classification Search .............. 219/91.2, 219/110, 87, 86.1, 86.41, 86.24, 86.7, 117.1; 228/212; 700/245
See application file for complete search history.

(56) References Cited

U.S. PATENT DOCUMENTS

| | | | | |
|---|---|---|---|---|
| 7,738,996 B2 * | 6/2010 | Luthardt | ........................ | 700/245 |
| 2008/0308533 A1 * | 12/2008 | Takahashi et al. | .......... | 219/117.1 |

FOREIGN PATENT DOCUMENTS

| | | | |
|---|---|---|---|
| JP | 06-218554 A | | 8/1994 |
| JP | 2001314976 A | * | 11/2001 |
| JP | 3337448 B2 | | 10/2002 |
| JP | 4233584 B2 | | 3/2009 |

\* cited by examiner

*Primary Examiner* — Sang Paik
*Assistant Examiner* — Renee L Miller
(74) *Attorney, Agent, or Firm* — Lowe Hauptman Ham & Berner, LLP

(57) ABSTRACT

A spot welding system including spot welding gun having a movable electrode driven by a servo motor, a counter electrode arranged facing it and with a multiarticulated robot, holding one of the welding workpiece and spot welding gun which moves welding workpiece and spot welding gun relative to each other and thereby make the movable electrode and the welding workpiece approach each other from a separated state or vice-versa, monitoring the current or torque of the servo motor, and detecting the surface position of the welding workpiece from the position of the movable electrode and the position of the multiarticulated robot when the trend of the current or torque changes. The precision of detection of the surface position of the welding workpiece by a movable electrode in a spot welding system can now be improved without lengthening the time required for detection of the surface position of the welding workpiece.

15 Claims, 32 Drawing Sheets

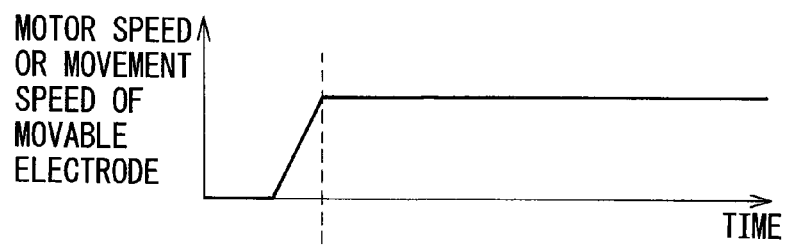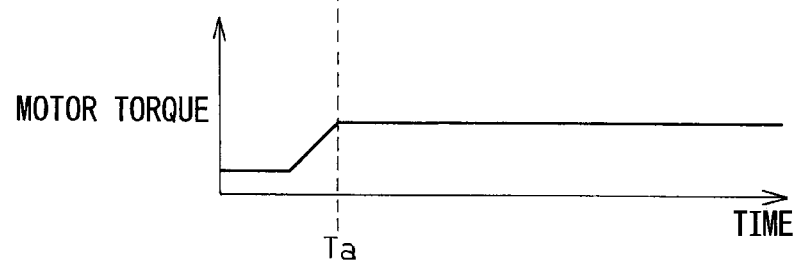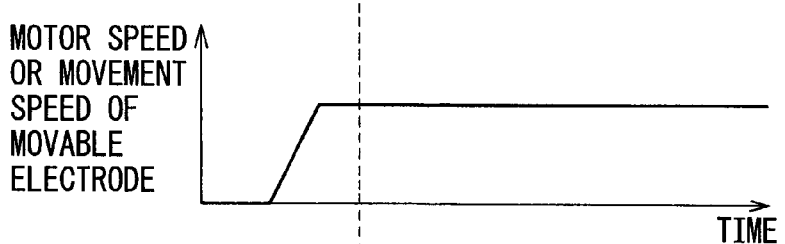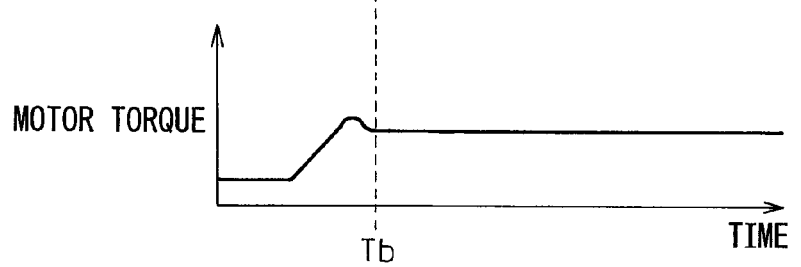

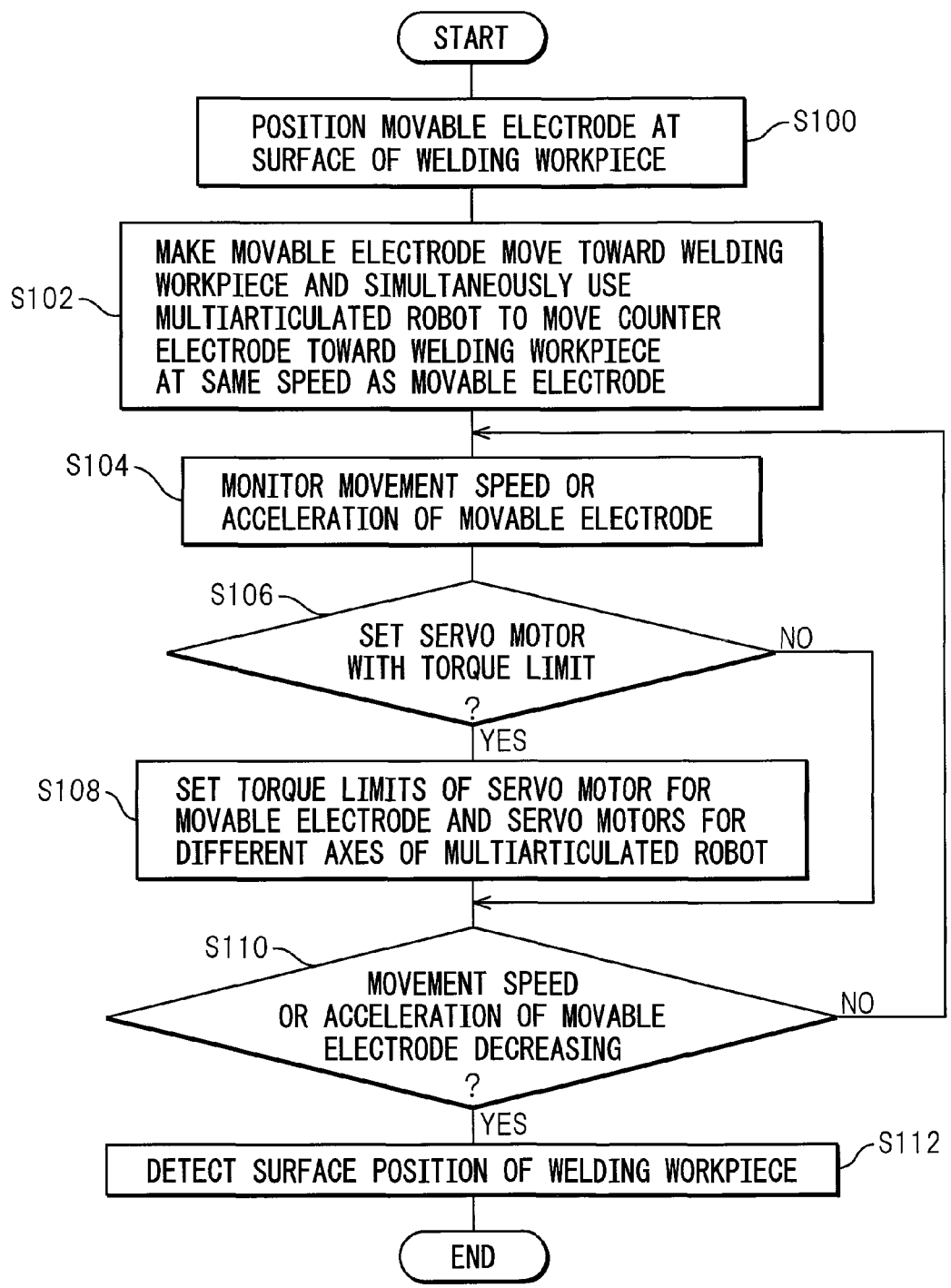

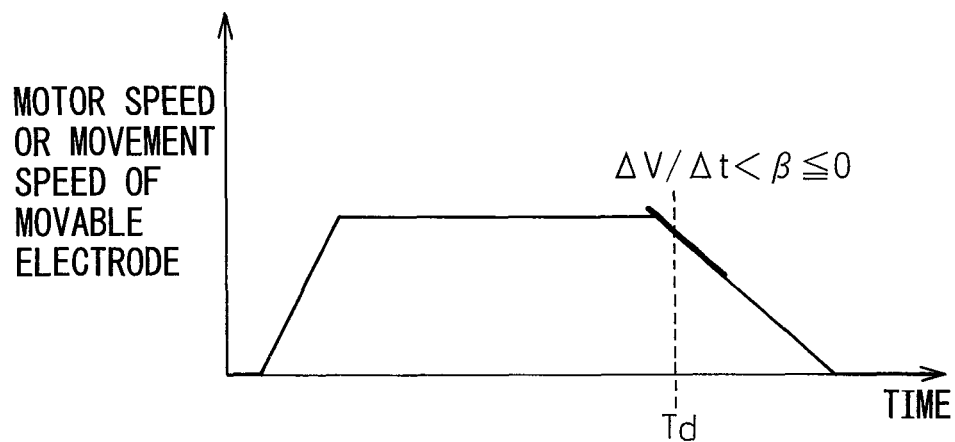
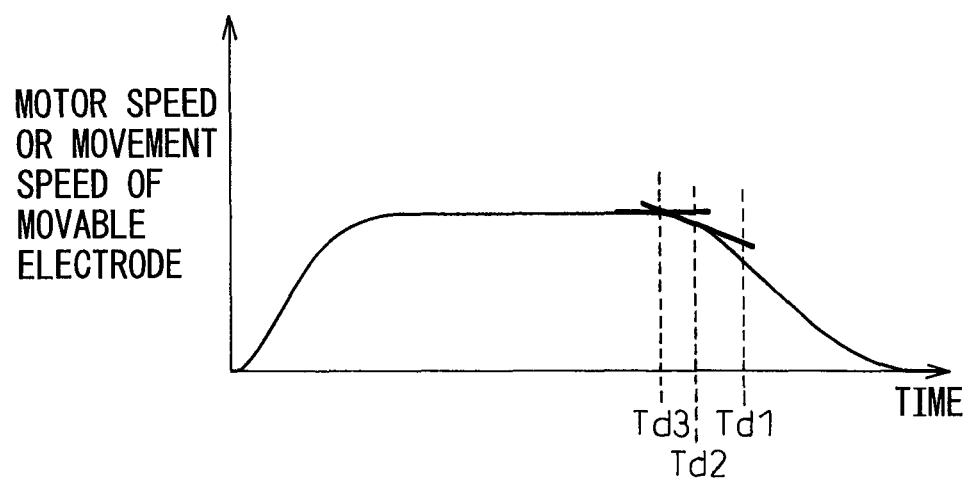

MOTOR SPEED OR MOVEMENT SPEED OF MOVABLE ELECTRODE

MOTOR ACCELERATION OR MOVEMENT ACCELERATION OF MOVABLE ELECTRODE

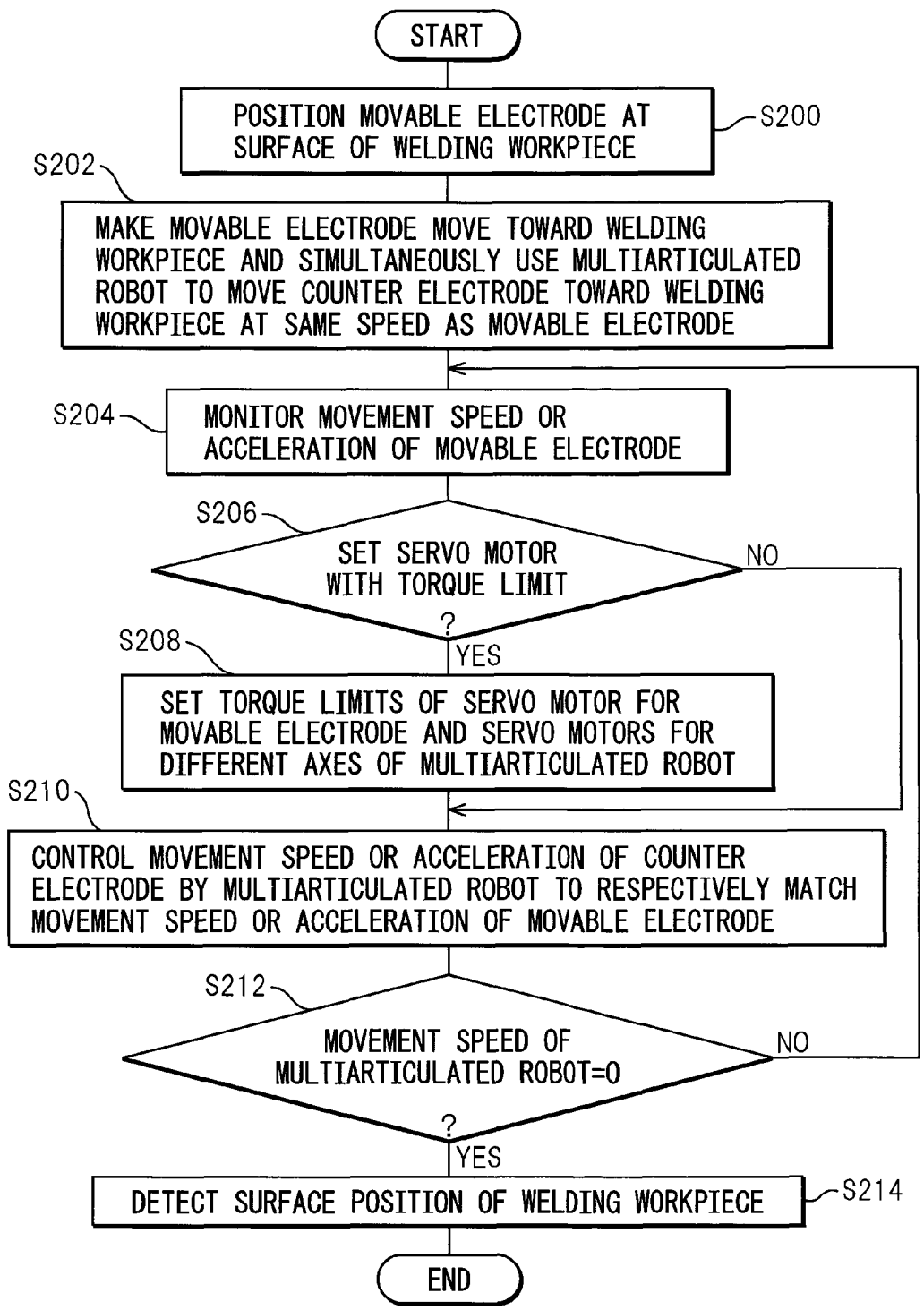

Fig.33
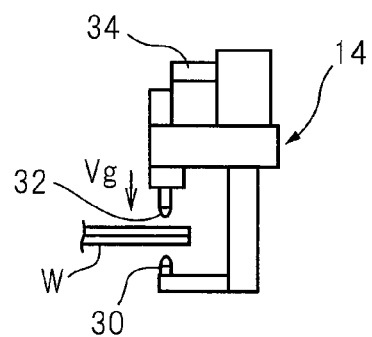
Fig.34a  MOTOR SPEED OR MOVEMENT SPEED OF MOVABLE ELECTRODE
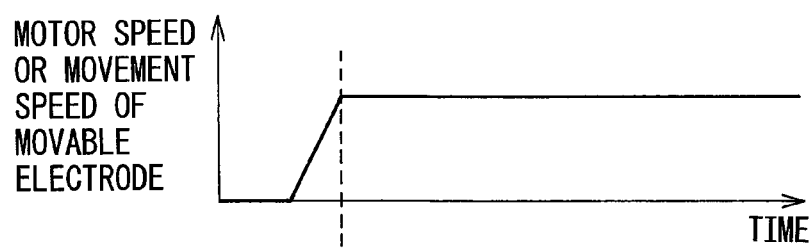
Fig.34b  MOTOR TORQUE
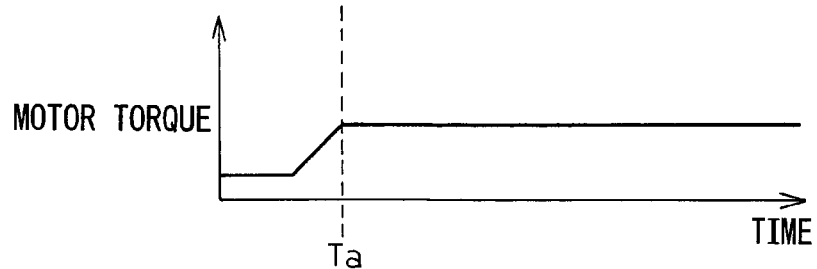

MOTOR SPEED OR MOVEMENT SPEED OF MOVABLE ELECTRODE

MOTOR ACCELERATION OR MOVEMENT ACCELERATION OF MOVABLE ELECTRODE

MOTOR TORQUE

TIME

MOTOR SPEED OR MOVEMENT SPEED OF MOVABLE ELECTRODE

TIME

MOTOR ACCELERATION OR MOVEMENT ACCELERATION OF MOVABLE ELECTRODE

TIME

A B C

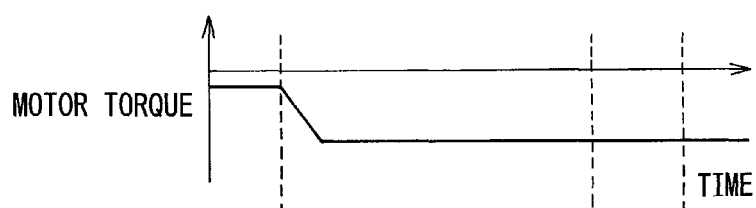
Fig.47a MOTOR TORQUE
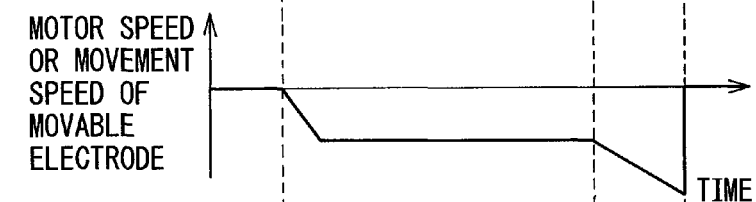
Fig.47b MOTOR SPEED OR MOVEMENT SPEED OF MOVABLE ELECTRODE
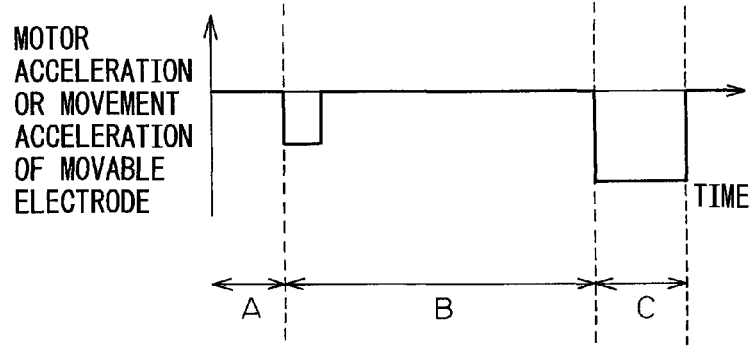
Fig.47c MOTOR ACCELERATION OR MOVEMENT ACCELERATION OF MOVABLE ELECTRODE

METHOD OF DETECTION OF WELDING WORKPIECE POSITION USING MOVABLE ELECTRODE

RELATED APPLICATIONS

The present application is based on, and claims priority from, Japanese Application Number 2009-242624, filed Oct. 21, 2009; Japanese Application Number 2009-242708, filed Oct. 21, 2009; and Japanese Application Number 2009-250104, filed Oct. 30, 2009 the disclosures of which are hereby incorporated by reference herein in their entirety.

BACKGROUND OF THE INVENTION

1. Field of the Invention

The present invention relates to a method of detection of a welding workpiece position which uses the movable electrode to detect a surface position of a welding workpiece in a spot welding system which uses a multiarticulated robot to make the welding workpiece and a spot welding gun move relative to each other, clamps the welding workpiece between a facing movable electrode and counter electrode of the spot welding gun, and spot welds the welding workpiece.

2. Description of the Related Art

A spot welding system is provided with a spot welding gun having a movable electrode driven by a servo motor and a counter electrode arranged facing the movable electrode and with a multiarticulated robot holding the spot welding gun at its front end. It uses the multiarticulated robot to make the welding workpiece and spot welding gun move relative to each other, then closes the movable electrode and counter electrode of the spot welding gun toward a predetermined strike position on the welding workpiece to clamp the welding workpiece between the movable electrode and counter electrode of the spot welding gun and, in this state, applies voltage across the two electrodes to thereby perform spot welding at the strike position. The counter electrode is generally a fixed electrode provided on a gun arm. In such a spot welding system, to enable the movable electrode and counter electrode to be positioned at the strike position on the welding workpiece, the surface position of the welding workpiece at the movable electrode side and surface position at the counter electrode side at the strike position have to be taught to the multiarticulated robot in advance.

In the teaching work, the worker visually confirms the position of the welding workpiece and operates the multiarticulated robot to make the spot welding gun move to a position where the movable electrode and counter electrode contact at the strike position of the welding workpiece when closing the movable electrode and counter electrode of the spot welding gun. After making the spot welding gun move to the desired position, the position of the multiarticulated robot and position of the movable side electrode tip are stored. In other words, positions based on the position of the welding workpiece are taught for the position of the multiarticulated robot and position of the movable side electrode tip.

In the above such teaching work, the positions have to be taught so that the movable electrode and counter electrode can suitably contact the surface of the welding workpiece. If such a judgment of contact of the movable electrode and counter electrode with the welding workpiece is performed visually by a worker, depending on the degree of skill of the worker and the viewing conditions in the work environment, contact may not be able to be accurately detected and therefore detection of the surface position of the welding workpiece at the movable electrode side and surface position at the counter electrode side at the strike position also becomes uncertain. Therefore, for example, as described in Japanese Patent No. 3337448, the method has been proposed of utilizing the increase in the value of a current of a servo motor (that is, a value of a torque) caused by action of a reaction force caused by bending, denting, or other elastic deformation of a welding workpiece when a movable electrode is moved under the drive force of a servo motor toward a counter electrode and contacts the surface of the welding workpiece and judging that the movable electrode and welding workpiece have contacted each other when the value of the current of a servo motor reaches a predetermined threshold value and of utilizing the generation of a reaction force to the multiarticulated robot from the welding workpiece caused by elastic deformation of the welding workpiece when a counter electrode is moved by the multiarticulated robot toward the welding workpiece and contacts the surface of the welding workpiece and judging that the counter electrode and welding workpiece have contacted each other when the reaction force to the multiarticulated robot reaches a predetermined value. Note that, the reaction force to the multiarticulated robot is found from the values of the current of the servo motors driving the different axes of the multiarticulated robot. Further, as described in Japanese Patent Publication (A) No. 6-218554, there is also the method of using the same method as in Japanese Patent No. 3337448 to detect contact of the movable electrode and welding workpiece, then using the multiarticulated robot to move the spot welding gun so as to make the counter electrode approach toward the welding workpiece until the distance between the movable electrode and counter electrode become equal to a thickness of the welding workpiece at a strike position measured in advance, using the servo motor to make the movable electrode move toward the counter electrode by the same speed of movement as the spot welding gun so as to maintain the state of the movable electrode contacting the welding workpiece, and thereby making the counter electrode and welding workpiece contact and position the counter electrode on the welding workpiece.

Further, Japanese Patent No. 4233584 proposes a method using the same method as in Japanese Patent No. 3337448 to detect contact between the movable electrode and welding workpiece, then making the counter electrode move toward the welding workpiece by exactly the value of the difference between the distance between the movable electrode and counter electrode at that time and a set thickness of the welding workpiece and thereby positioning the counter electrode at that position.

To shorten the time required for detection of the surface position of a welding workpiece using a movable electrode in teaching work of a spot welding system, it is necessary to make the movable electrode move faster. If making the movable electrode move, the dynamic friction of the drive mechanism of the movable electrode causes the current or torque of the servo motor to vary (fluctuate). Therefore, if making the movable electrode move at a fast speed, the variation of the current or torque of the servo motor also becomes greater. As a result, due to the variation of the current or torque of the servo motor caused by the dynamic friction of the drive mechanism of the movable electrode, the current or torque of the servo motor ends up exceeding a threshold value for judging contact and erroneous detection of contact of the movable electrode and welding workpiece occurs in some cases.

To prevent this erroneous detection, it is necessary to set the threshold value of the current or torque of the servo motor for judging contact of the movable electrode and welding workpiece to a value larger than the variation of the current or torque of the servo motor due to dynamic friction. However, if the threshold value is large, the movable electrode is moved from when actually contacting the welding workpiece to when it is judged to have contacted the welding workpiece, so the amount of elastic deformation of the welding workpiece becomes larger and the surface position of the welding workpiece is no longer able to be accurately detected. Further, in the worst case, the welding workpiece is liable to end up being caused to plastically deform.

Furthermore, the amount of elastic deformation of the welding workpiece becomes the sum of the "push-in distance" over which the movable electrode is made to move from when actually contacting the welding workpiece to when judged to contact the welding workpiece and the "runaway distance" from when it is judged that the welding workpiece has been contacted to when the movable electrode tip actually stops. However, the runaway distance can be calculated from the deceleration time of operation of the movable electrode tip, while the push-in distance depends on the material or fastening method of the welding workpiece and the mechanical rigidity of the spot welding gun, so it is necessary to consider the deformation model of a complex workpiece. This cannot be found by simple calculation. Therefore, it is not possible to strictly calculate the amount of elastic deformation of the welding workpiece.

Further, the increase in the current or torque of the servo motor used when detecting that the movable electrode has contacted the welding workpiece depends on the reaction force from the welding workpiece to the movable electrode due to the elastic deformation of the welding workpiece, so in the case of a soft welding workpiece, even with the same amount of elastic deformation of the welding workpiece, the reaction force becomes smaller than with a hard welding workpiece and, as a result, the amount of change of the current or torque of the servo motor when the movable electrode and welding workpiece contact becomes smaller. Therefore, in the case of a soft welding workpiece, the change of the current or torque of the servo motor when the movable electrode and welding workpiece contact is hidden by the variation of the current or torque of the servo motor due to the dynamic friction, so detection of the contact of the movable electrode and welding workpiece becomes difficult and the precision of detection of contact deteriorates.

On the contrary, if slowing the speed of movement of the movable electrode, the fluctuation or variation of the current or torque of the servo motor due to the dynamic friction of the movable electrode drive mechanism can be made smaller and further, as a result, the threshold value can be set to a small value, so the above two problems can be solved. However, if slowing the speed of movement of the movable electrode, the problem arises that the time required for detection of the surface position of the welding workpiece by the movable electrode becomes longer and therefore the operation becomes impractical.

Accordingly, a first object of the present invention is to eliminate the above problems of the prior art and provide a spot welding system in which the precision of detection the surface position of a welding workpiece by a movable electrode can be improved without lengthening the time required for detection of the surface position of the welding workpiece by the movable electrode.

In the method described in Japanese Patent Publication (A) No. 6-218554, to position the counter electrode at the surface of the welding workpiece, it is necessary to preset the thickness of the welding workpiece at each strike position. However, setting the thickness of the welding workpiece takes time, so there is the problem that it is difficult to set the thicknesses at each of the strike positions, which may number in the hundreds, in actual welding work. Furthermore, if setting the thickness of the welding workpiece at each strike position based on the values in design data of the welding workpiece, due to the presence of gaps between welding workpieces and individual differences in welding workpieces, the counter electrode sometimes does not contact the welding workpiece, the counter electrode sometimes is excessively pressed against the welding workpiece causing the welding workpiece to deform, and, in the worst case, the welding workpiece is made to plastically deform and the spot welding gun is damaged. Therefore, there is the problem that to prevent deformation of the welding workpiece or damage to the spot welding gun, before setting the thickness of the welding workpiece, it is necessary to measure in advance the thickness of the welding workpiece at all strike positions on the welding workpiece.

On the contrary, with the method described in Japanese Patent No. 3337448, it is not necessary, like in the method of Japanese Patent Publication (A) No. 6-218554, to measure the thickness of the welding workpiece at all strike positions. However, the reaction force from the welding workpiece to the multiarticulated robot, used for detecting the contact of the counter electrode with the welding workpiece, is due to the elastic deformation of the welding workpiece arising when the counter electrode contacts the welding workpiece. Therefore, for the reaction force to exceed a threshold value, the welding workpiece has to be made to deform by a certain extent. The threshold value depends on the rigidity of the welding workpiece. Further, the changes in the values of the currents of the servo motors driving the axes of the multiarticulated robot due to the reaction force from the welding workpiece to the multiarticulated robot depend, in addition to the rigidity of the welding workpiece, on the rigidity of the arm of the spot welding gun and the multiarticulated robot. Therefore, the threshold value of the reaction force used for detecting the contact of the counter electrode with the welding workpiece differs depending on the combination of the welding workpiece, spot welding gun, and multiarticulated robot used. To accurately detect the contact of the counter electrode with the welding workpiece, it is necessary to find the threshold value of the reaction force in advance experimentally, then set it. For this reason, there is the problem that it is difficult to handle a broad range of workpieces.

Accordingly, a second object of the present invention is to eliminate the above problems in the prior art and provide a spot welding system in which it is possible to accurately detect the surface position of a welding workpiece to which a counter electrode contacts without regard as to the rigidity of the welding workpiece, spot welding gun, and multiarticulated robot.

In the methods disclosed in Japanese Patent No. 3337448 and Japanese Patent No. 4233584, when detecting the surface position of the welding workpiece at the movable electrode side, when using a servo motor to drive the movable electrode to make it move so as to make it approach toward the counter electrode, the value of the current or the value of the torque of the servo motor driving the movable electrode is monitored. However, when the movable electrode is moving driven by a servo motor, due to the mechanical resistance present at the spot welding gun (for example, internal friction of the drive part, elastic deformation of the conductive parts connecting the movable electrode and the welding transformer, etc.), variation or fluctuation of the current or torque of the servo motor driving the movable electrode occurs and an unstable state is easily caused. For this reason, the increase in the current or torque of the servo motor occurring when the movable electrode contacts the welding workpiece ends up being hidden by the variation or fluctuation of the mechanical resistance of the spot welding gun and the point of time of contact of the movable electrode and welding workpiece becomes difficult to accurately identify or erroneous detection of contact of the movable electrode and welding workpiece occurs.

Accordingly, a third object of the present invention is to solve the above problems in the prior art and provide a spot welding system improving the precision of detection of the surface position of a welding workpiece by a movable electrode.

SUMMARY OF THE INVENTION

In view of the above first object, according to the present invention, there is provided a method of detection of a welding workpiece position using a movable electrode to detect a surface position of a welding workpiece in a spot welding system provided with a spot welding gun having a movable electrode driven by a servo motor and a counter electrode arranged facing the movable electrode and a multiarticulated robot holding one of the welding workpiece and the spot welding gun, the servo motor being used to make the movable electrode and the counter electrode approach and move away from each other and clamp the welding workpiece between the counter electrode and the movable electrode of the spot welding gun for spot welding the welding workpiece, which method comprises using the multiarticulated robot to make the welding workpiece and the spot welding gun move relative to each other so that the movable electrode and the welding workpiece are made to approach each other from a separated state or to move away from each other from a contact state, while doing this, monitoring a current or torque of the servo motor and, when a trend of change of the current or torque changes, judging that the movable electrode has contacted the welding workpiece or that the movable electrode has separated from the welding workpiece, and detecting the surface position of the welding workpiece from the position of the movable electrode and the position of the multiarticulated robot when the trend of change of the current or torque has changed.

Here, in the present application, "when a trend of change . . . changes" means when a trend of decrease or constant state changes to a monotonic increase, when a trend of gentle increase changes to a relatively sharp increase with a larger amount of increase per unit time, when a trend of monotonic decrease changes to a gentle, steady increase or constant state, or when a trend of monotonic decrease changes to a gentle decrease with a smaller amount of decrease per unit time.

In the method of detection of the welding workpiece position according to the above movable electrode, a multiarticulated robot is used to make the spot welding gun and welding workpiece move relative to each other and thereby make the movable electrode and welding workpiece approach and move away from each other, so it is possible to perform the operation of making the movable electrode and welding workpiece contact each other from the separated state or making them move away from each other from the contact state by movement of the multiarticulated robot instead of movement of the movable electrode by the servo motor. Therefore, by using movement of the multiarticulated robot to make the movable electrode and welding workpiece move relative to each other, it is possible to decrease the speed of movement of the movable electrode by the amount of the speed of movement by the multiarticulated robot and possible to suppress movement of the movable electrode by the servo motor down to the minimum. As a result, the variation of the current or torque of the servo motor due to the dynamic friction of the movable electrode drive mechanism becomes smaller. Further, rather than by making the speed of movement of the movable electrode by the servo motor increase, by making the speed of movement of the spot welding gun by the multiarticulated robot increase, it is possible to shorten the detection time of the surface position of the welding workpiece.

In the above method of detection of the welding workpiece position using a movable electrode, when monitoring the current or torque of the servo motor to detect the position of the welding workpiece, it is preferable to use the servo motor to drive the movable electrode at a speed Vg while using the multiarticulated robot to make the spot welding gun and the welding workpiece move relative to each other. The speed Vg may be a speed of an extent enabling elimination of static friction of the mechanism for driving the movable electrode. If the welding gun is one of a very small static friction of the mechanical parts, the speed Vg may even be 0.

In one embodiment, the current or torque of the servo motor is monitored to detect the position of the welding workpiece, while doing so, the multiarticulated robot is used to make the spot welding gun and the welding workpiece move relative to each other in a direction making the movable electrode and the welding workpiece approach each other from a separated state, and it is judged that the movable electrode contacts the welding workpiece when the actual value or amount of change per unit time of the current or torque of the servo motor changes to a trend of increase compared with the value or amount of change of the current or torque of the servo motor when assuming a reference state.

In the above embodiment, preferably the reference state is determined as the state when the current or torque of the servo motor has the same trend of change as a preparatory operation zone after the start of relative movement of the spot welding gun and the welding workpiece and before contact of the movable electrode and the welding workpiece.

For example, when the actual value or amount of change per unit time of the current or torque of the servo motor increases by a predetermined value or more compared with the value or amount of change of the current or torque of the servo motor when assuming the reference state, it can be judged that the actual value or amount of change per unit time of the current or torque of the servo motor has changed to a trend of increase compared with the value or amount of change of the current or torque of the servo motor when assuming the reference state.

Further, when the amount of change per unit time of the current or torque of the servo motor when assuming the reference state is "0" and the actual amount of change per unit time of the current or torque of the servo motor becomes a predetermined positive value or more, it is possible to judge that the actual value or amount of change per unit time of the current or torque of the servo motor has changed to a trend of increase compared with the actual value or amount of change per unit time of the current or torque of the servo motor when assuming the reference state.

Furthermore, it is possible to trace back along in time a time-series waveform of the current or torque of the servo motor from a point of time when the actual value or amount of change per unit time of the current or torque of the servo motor increases by a predetermined value or more compared with the value or amount of change of the current or torque of the servo motor when assuming the reference state or a point of time when the amount of change per unit time of the current or torque of the servo motor in the case of assuming the reference state is made "0" and the actual amount of change per unit time of the current or torque of the servo motor becomes a predetermined positive value or more and to judge that the movable electrode contacts the welding workpiece when the actual amount of change per unit time of the current or torque of the servo motor changed from a positive value to 0 or a negative value.

In another embodiment, to detect the position of the welding workpiece, the current or torque of the servo motor is monitored while using the multiarticulated robot to make the spot welding gun and the welding workpiece move relatively in directions where the movable electrode and the welding workpiece separate from the state when they are pressed against each other. When the actual value or amount of change per unit time of the current or torque of the servo motor changes to a trend of increase compared with the value or amount of change of the current or torque of the servo motor when assuming the reference state, it is judged that the movable electrode has separated from the welding workpiece.

In the above other embodiment, preferably the reference state is determined as the state when the current or torque of the servo motor has the same trend of change as a preparatory operation zone after the start of relative movement of the spot welding gun and the welding workpiece and before separation of the movable electrode and the welding workpiece.

For example, when the actual value or amount of change per unit time of the current or torque of the servo motor has increased by a predetermined value or more compared with the value or amount of change of the current or torque of the servo motor when assuming the reference state, it is possible to judge that the actual value or amount of change per unit time of the current or torque of the servo motor has changed to a trend of increase compared with the value or amount of change of the current or torque of the servo motor when assuming the reference state.

Further, it is possible to trace back along in time a time-series waveform of the current or torque of the servo motor from a point of time when the actual value or amount of change per unit time of the current or torque of the servo motor increases by a predetermined value or more compared with the value or amount of change of the current or torque of the servo motor when assuming the reference state and to judge that the movable electrode separated from the welding workpiece at the point of time when the actual amount of change per unit time of the current or torque of the servo motor changed from a positive value to 0 or a negative value.

Furthermore, it is possible to monitor the current or torque of the servo motor to detect the position of the welding workpiece while using the multiarticulated robot to make the spot welding gun and the welding workpiece move relatively to each other in a direction making the movable electrode and the welding workpiece separate from the state pressed against each other and judge that the movable electrode has separated from the welding workpiece when the amount of change per unit time of the current or torque of the servo motor becomes 0 or a positive value.

In the above two embodiments, it is possible to use the value of the current or torque of the servo motor converted to a pressing force so as to detect the welding workpiece position. By using the pressing force instead of the current or torque of the servo motor in this way, it is possible to determine the criteria for detection and judgment of a workpiece across the board using any spot welding gun regardless of the gun mechanism or motor performance.

Further, in the above two embodiments, it is possible to detect the position of a welding workpiece by a movable electrode by executing welding program instructions. It is possible to perform the process of detection of the welding workpiece position by the movable electrode by running a spot welding program recorded in a robot control device in advance and thereby simplify the work procedures for workers.

In consideration of the above second object, according to the present invention, there is provided a method of detection of a welding workpiece position detecting a surface position of a welding workpiece which a counter electrode contacts in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and separate from each other and clamp the welding workpiece between the movable electrode and the counter electrode of the spot welding gun for spot welding the welding workpiece, which method comprises steps of positioning the movable electrode so as to be contiguous with the surface of the welding workpiece, then using the servo motor to make the movable electrode move by a predetermined speed Vg in a direction making it approach the counter electrode, simultaneously using the multiarticulated robot to make the spot welding gun and the welding workpiece move relative to each other at a speed the same as the speed Vg so as to make the counter electrode and the welding workpiece approach each other, while doing so, monitoring at least one of the speed of movement and acceleration of the movable electrode with respect to the counter electrode, and thereby detecting contact of the counter electrode and the welding workpiece and detecting the surface position of the welding workpiece which the counter electrode contacts from the detected position of the counter electrode.

Note that, monitoring of the speed of movement and acceleration of the movable electrode with respect to the counter electrode is equivalent to monitoring the rotational speed and rotational acceleration of the servo motor for driving the movable electrode. Monitoring the speed of movement and acceleration of the movable electrode with respect to the counter electrode is therefore deemed to include monitoring of the rotational speed and rotational acceleration of the servo motor for driving the movable electrode.

The above method of detection of the welding workpiece position positions the movable electrode so as to be contiguous with the surface of the welding workpiece, then uses the servo motor to make the movable electrode move by a predetermined speed Vg in a direction making it approach the counter electrode and simultaneously uses the multiarticulated robot to make the spot welding gun and welding workpiece move relative to each other at a speed equal to the speed Vg so as to make the counter electrode and welding workpiece approach each other. Therefore, when the counter electrode contacts the welding workpiece, the movable electrode and counter electrode clamp the welding workpiece between them, so movement of the movable electrode with respect to the counter electrode is obstructed and the speed of movement of the movable electrode with respect to the counter electrode is reduced from a predetermined value Vg. Similarly, the acceleration of the movable electrode with respect to the counter electrode changes from 0 to a negative value. Therefore, it is possible to detect that the counter electrode has contacted the welding workpiece if detecting the point of time when the speed of movement of the movable electrode with respect to the counter electrode decreases from a predetermined value Vg or the point of time when acceleration of the movable electrode with respect to the counter electrode changes from 0 to a negative value. Furthermore, what is monitored is the speed of movement or acceleration of the movable electrode with respect to the counter electrode predetermined at any value. Unlike with the current or torque of a servo motor driving an electrode, it does not change due to the characteristics of the individual servo motor or frictional characteristics of the electrode drive mechanism etc. Therefore, it is possible to detect the contact of the counter electrode with the welding workpiece without being affected much at all by the rigidity of the welding workpiece, spot welding gun, and multiarticulated robot.

In the above method of detection of the welding workpiece position, the servo motor for driving the movable electrode with respect to the counter electrode is preferably set with a torque limit. If the servo motor for driving the movable electrode is set with a torque limit, the torque of the servo motor will reach the torque limit when the counter electrode contacts the welding workpiece, so the movement of the movable electrode by the servo motor can be limited, the decrease in the speed of movement and acceleration of the movable electrode when the counter electrode contacts the welding workpiece can be caused to occur earlier and more markedly, and therefore the detection precision can be raised. Further, elastic deformation of the welding workpiece due to the movable electrode and counter electrode can be suppressed.

The torque limit of the servo motor is preferably set based on the value of the torque of the servo motor when making the spot welding gun and the welding workpiece move by the same speed as the speed Vg. When making the counter electrode and welding workpiece contact each other by operating the motor to make the spot welding gun and welding workpiece move relative to each other by the same speed as the speed Vg, the movable electrode moves by the speed Vg. The servo motor operates by the minimum extent of torque for maintaining this speed Vg. If obtaining this required minimum extent torque and setting it as the torque limit, movement of the movable electrode is restricted immediately when the counter electrode contacts the welding workpiece, so the decrease in the speed of movement and acceleration of the movable electrode can be caused to occur earlier and more markedly, and therefore the detection precision can be raised.

When the servo motor is set with a torque limit, it is preferable to position the movable electrode so as to be contiguous with the surface of the welding workpiece, then furthermore position the movable electrode at a position offset by exactly a predetermined distance from the surface of the welding workpiece and, from that state, use the servo motor to make the movable electrode move by a predetermined speed Vg in a direction approaching the counter electrode and simultaneously use the multiarticulated robot to make the spot welding gun and the welding workpiece move relative to each other at the same speed as the speed Vg so that the counter electrode and the welding workpiece approach each other. The offset may be performed in a direction pressing the movable electrode against the welding workpiece or in a direction making it separate from it. In the state when the movable electrode of spot welding gun is contiguous with the surface of the welding workpiece, with just the vibration of the spot welding gun caused by vibration of the multiarticulated robot etc., the movable electrode contacts or separates from the welding workpiece and the reaction force from the welding workpiece is conveyed to or released from the movable electrode resulting in an unstable state. Even in the state before the counter electrode contacts the welding workpiece, the torque of the servo motor fluctuates and determination of the torque for maintaining the movable electrode at the speed Vg is difficult. As opposed to this, if making the movable electrode move away from the surface of the welding workpiece slightly, the reaction force from the welding workpiece can be eliminated. Further, conversely, if pressing the movable electrode against the welding workpiece slightly, the reaction force from the welding workpiece to the movable electrode is not released, so it becomes possible to stably receive substantially the same reaction force. Therefore, by positioning the movable electrode offset from the surface of the welding workpiece, it becomes possible to stably determine the torque for maintaining the operation at the speed Vg.

In the above method of detection of the welding workpiece position, it is also possible to monitor at least one of the speed of movement and acceleration of the movable electrode with respect to the counter electrode, judge that the counter electrode has contacted the welding workpiece when the speed of movement of the movable electrode with respect to the counter electrode changes from a constant state to a decrease or when the acceleration of the movable electrode with respect to the counter electrode changes from 0 to negative, and detect the surface position of the welding workpiece to which the counter electrode contacts from the position of the counter electrode when the speed of movement of the movable electrode with respect to the counter electrode changes from a constant state to a decrease or when the acceleration of the movable electrode with respect to the counter electrode changes from 0 to negative. In this case, as one example, it is possible to trace back along in time the time-series waveform of the speed of movement or acceleration of the movable electrode with respect to the counter electrode from the point of time when at least one of the value or amount of change per unit time of the speed of movement and acceleration of the movable electrode with respect to the counter electrode falls below a negative threshold value and judge that the speed of movement of the movable electrode with respect to the counter electrode changed from a constant state to a decrease or the acceleration of the movable electrode with respect to the counter electrode changed from 0 to negative at the point of time when the amount of change per unit time of the speed of movement or acceleration of the movable electrode with respect to the counter electrode changed from a negative value to 0 or a positive value.

Further, in the above method of detection of the welding workpiece position, it is possible to monitor at least one of the speed of movement and acceleration of the movable electrode with respect to the counter electrode, when the speed of movement of the movable electrode with respect to the counter electrode decreases or when the acceleration of the movable electrode with respect to the counter electrode changes from 0 to negative, use the multiarticulated robot to make the speed for making the spot welding gun and the welding workpiece move relative to each other also decrease by exactly the same amount of decrease or use the multiarticulated robot to make the acceleration for making the spot welding gun and the welding workpiece move relative to each other also decrease by exactly the same amount of decrease, judge that the counter electrode has contacted the welding workpiece when movement of the movable electrode or the multiarticulated robot has stopped, and detect the surface position of the welding workpiece which the counter electrode contacts from the position of the counter electrode when movement of the movable electrode or the multiarticulated robot has stopped.

Further, according to the present invention, there is provided a method of detection of a welding workpiece position detecting the respective surface positions of a welding workpiece which a movable electrode and a counter electrode contact in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and move away from each other and clamp the welding workpiece between the counter electrode and the movable electrode of the spot welding gun for spot welding the welding workpiece, which method comprises steps of using the multiarticulated robot to make the welding workpiece and the spot welding gun move relative to each other so that the movable electrode and the welding workpiece are made to approach each other from a separated state or to separate from each other from a contact state, while doing so, monitoring a current or torque of the servo motor and, when a trend of change of the current or torque changes, judging that the movable electrode has contacted the welding workpiece or that the movable electrode has moved away from the welding workpiece, detecting the surface position of the welding workpiece which the movable electrode contacts from the position of the movable electrode and the position of the multiarticulated robot when the trend of change of the current or torque has changed, and detecting the surface position of the welding workpiece which the counter electrode contacts by the above-mentioned method of detection of the welding workpiece position.

The above method of detection of the welding workpiece position may further include a step of finding a thickness of the welding workpiece from the detected surface position of the welding workpiece to which the movable electrode contacts and the detected surface position of the welding workpiece to which the counter electrode contacts. If finding the thickness of the welding workpiece in this way, it is possible to compare it with the preset thickness of the welding workpiece and, when the difference of the two exceeds a predetermined allowable value, judge that the thickness of the welding workpiece is abnormal. Due to this, a worker can discover mistakes in selection of welding workpiece or mistakes in placement and judge the appropriateness of detection points and can therefore prevent work errors.

Further, all of the above methods of detection of the welding workpiece position can be executed by executing welding program instructions. It is possible to perform all of the above steps of detection of the welding workpiece position by running a spot welding program stored in advance in the robot control device in this way and thereby simplify the work procedures for workers.

In consideration of the above third object, according to the present invention, there is provided a method of detection of a welding workpiece position detecting a surface position of a welding workpiece which a movable electrode contacts in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and move away from each other and clamp the welding workpiece between the counter electrode and the movable electrode of the spot welding gun for spot welding the welding workpiece, which method comprises making the movable electrode and the welding workpiece move relative to each other so as to approach each other from a separated state, monitoring at least one of the speed of movement and acceleration of the movable electrode with respect to the counter electrode during the relative movement of the movable electrode and the welding workpiece, judging that the movable electrode has contacted the welding workpiece when the speed of movement or acceleration of the movable electrode with respect to the counter electrode has changed, and finding the surface position of the welding workpiece from the position of the movable electrode and the position of the multiarticulated robot when the speed of movement or acceleration changed.

In the above method of detection of the welding workpiece position, it is preferable to set the servo motor driving the movable electrode with a torque limit and in that state make the movable electrode and the welding workpiece move relative to each other so that they approach each other from a separated state.

Note that, monitoring of the speed of movement and acceleration of the movable electrode with respect to the counter electrode is equivalent to monitoring the rotational speed and rotational acceleration of the servo motor for driving the movable electrode. Monitoring the speed of movement and acceleration of the movable electrode with respect to the counter electrode is therefore deemed to include monitoring of the rotational speed and rotational acceleration of the servo motor for driving the movable electrode.

The above method of detection of the welding workpiece position by the movable electrode does not monitor the current or torque of the servo motor driving the movable electrode, but monitors at least one of the speed of movement and acceleration of the movable electrode with respect to the counter electrode. Fluctuation of the current or torque of the servo motor driving the movable electrode when the movable electrode contacts the welding workpiece is due to the reaction force received by the movable electrode from the welding workpiece. The method is affected by the characteristics of the servo motor and mechanical properties of the spot welding gun and fluctuation and variation due to the same. As opposed to this, the speed of movement or acceleration of the movable electrode with respect to the counter electrode is controlled by speed control of the servo motor so as to become constant, so the method does not depend on the characteristics of the servo motor or the mechanical properties of the spot welding gun and is resistant to effects of fluctuation or variation due to the mechanical properties of the spot welding gun. Furthermore, if providing the servo motor with a torque limit, when the movable electrode contacts the welding workpiece, even under speed control, the speed of movement of the movable electrode with respect to the counter electrode will remarkably drop. Therefore, the change of the speed of movement or acceleration of the movable electrode with respect to the counter electrode when the movable electrode contacts the welding workpiece becomes more marked than the change of the current or torque of the servo motor and the method becomes resistant to the effects of fluctuation or variation of the mechanical properties of the spot welding gun, so the point of time of contact of the movable electrode and welding workpiece can be accurately detected.

In the above method of detection of the welding workpiece position, the relative movement of the movable electrode and the welding workpiece may be performed by using the servo motor to drive the movable electrode so as to make the movable electrode approach the counter electrode or by using the multiarticulated robot to make the welding workpiece and the spot welding gun move relatively to each other so as to make the welding workpiece and the movable electrode approach each other. In particular, according to the latter, the operation of the movable electrode is kept to a minimum and the effects due to fluctuation or variation due to the mechanical properties of the spot welding gun are reduced, so the point of time of contact of the movable electrode and welding workpiece can be detected more accurately.

If the relative movement of the movable electrode and welding workpiece is performed by using a multiarticulated robot to make the welding workpiece and spot welding gun move relative to each other, when using the multiarticulated robot to make the welding workpiece and the spot welding gun move relative to each other so as to make the welding workpiece and the movable electrode approach each other, it is preferable to simultaneously use the servo motor to drive the movable electrode with respect to the counter electrode at a speed Vg. By driving the movable electrode to move in this way, it becomes possible to eliminate the effects of static friction present in a mechanism for the movable electrode of the spot welding gun drive. Further, the speed Vg is more preferably made a speed of an extent enabling elimination of static friction of the mechanism for driving the movable electrode. In this way, by keeping operation of the movable electrode to the minimum extent, it becomes possible to eliminate the effects of static friction present at the drive part of the spot welding gun while suppressing fluctuation or variation due to the mechanical properties of the spot welding gun and thereby enable detection of contact by a higher precision.

Further, in the above method of detection of the welding workpiece position, it is preferable that the torque limit of the servo motor be set to at least a value of a torque required for maintaining the relative speed of movement of the movable electrode with respect to the counter electrode at a constant level and it is more preferable that it be set based on the value of the torque of the servo motor when the movable electrode is moving in a preparatory operation zone after the start of relative movement of the movable electrode and the welding workpiece and before contact of the movable electrode and the welding workpiece. By setting the torque limit in this way, it is possible to make the decrease in the speed of movement of the movable electrode when the movable electrode contacts the welding workpiece more marked and raise the detection precision of contact. Further, if setting the torque limit based on the value of the torque of the servo motor in the preparatory operation zone, there is no longer a need to find in advance by experiments the setting of the torque limit of the servo motor for each spot welding gun and it becomes possible to deal with changes in the mechanical properties of the spot welding gun along with time.

In the above method of detection of the welding workpiece position, for example, when defining the direction of the movable electrode approaching the counter electrode as positive, it is possible to judge that the speed of movement or acceleration of the movable electrode with respect to the counter electrode has changed when the speed of movement of the movable electrode with respect to the counter electrode changes from a constant state to a decrease or when the acceleration of the movable electrode with respect to the counter electrode changes from 0 to a negative value. In this case, as one example, it is possible to trace back along in time the time-series waveform of the speed of movement or acceleration of the movable electrode with respect to the counter electrode from the point of time when the value or amount of change per unit time of at least one of the speed of movement and acceleration of the movable electrode with respect to the counter electrode becomes less than a negative threshold value and judge that the speed of movement of the movable electrode with respect to the counter electrode has change from a constant state to a decrease or the acceleration of the movable electrode with respect to the counter electrode has changed from 0 to negative at the point of time when the amount of change per unit time of the speed of movement or acceleration of the movable electrode with respect to the counter electrode changes from a negative value to 0 or a positive value.

Furthermore, in the above method of detection of the welding workpiece position, it is possible to execute welding program instructions so as to detect the welding workpiece position by the movable electrode. It is possible to perform all of the above steps of detection of the welding workpiece position by the movable electrode by running a spot welding program stored in advance in the robot control device in this way and thereby simplify the work procedures for workers.

BRIEF DESCRIPTION OF THE DRAWINGS

These and other objects, features and advantages of the present invention will be more apparent in light of the detailed description of exemplary embodiments thereof as illustrated by the drawings, wherein:

FIG. 17 are graphs showing changes along with time of a torque of a servo when making a servo motor rotate or when making a movable electrode move;

FIG. 18 are graphs showing a case of changes along with time in a case where a torque of a servo motor is overshot when the servo motor is made to rotate or the movable electrode is made to move;

FIG. 21 is a flowchart of a method, according to a B1-th embodiment of the present invention, of maintaining a state when a movable electrode is made to contact the surface of a welding workpiece and in that state using a multiarticulated robot to make a counter electrode of a spot welding gun approach the welding workpiece and thereby detecting the surface position of the welding workpiece to which the counter electrode contacts;

FIG. 24 is an explanatory view of a method of detecting a decrease in a speed of a servo motor or a speed of movement of a movable electrode based on an amount of change per unit time of a rotational speed of the servo motor or a speed of movement of the movable electrode;

FIG. 25 is an explanatory view of a method of finding a point of change analytically from a time-series waveform of a rotational speed of a servo motor or a speed of movement of a movable electrode;

FIG. 29 is a flowchart of a method, according to a B2-th embodiment of the present invention, of maintaining a state when a movable electrode is made to contact the surface of a welding workpiece and in that state using a multiarticulated robot to make a counter electrode of a spot welding gun approach the welding workpiece and thereby detecting the surface position of the welding workpiece which the counter electrode contacts;

FIG. 33 is an explanatory view showing use of a servo motor to make a movable electrode of a spot welding gun approach a welding workpiece according to a C1-th embodiment of a method of detection of the welding workpiece position of the present invention;

FIG. 34 are explanatory views showing a timing of setting a torque limit of a servo motor when using a servo motor to make a movable electrode of a spot welding gun approach a welding workpiece;

FIG. 47 are graphs showing changes along with time in a torque of a servo motor and a rotational speed and rotational acceleration of a servo motor (or speed of movement and acceleration of the movable electrode) when using a servo motor to drive a movable electrode of a spot welding gun to make it move in a direction separating from a welding workpiece while using a multiarticulated robot to make a welding workpiece and spot welding gun move relative to each other to make the movable electrode approach the welding workpiece according to a C3-th embodiment of a method of detection of the welding workpiece position of the present invention.

DETAILED DESCRIPTION

Figure 1:
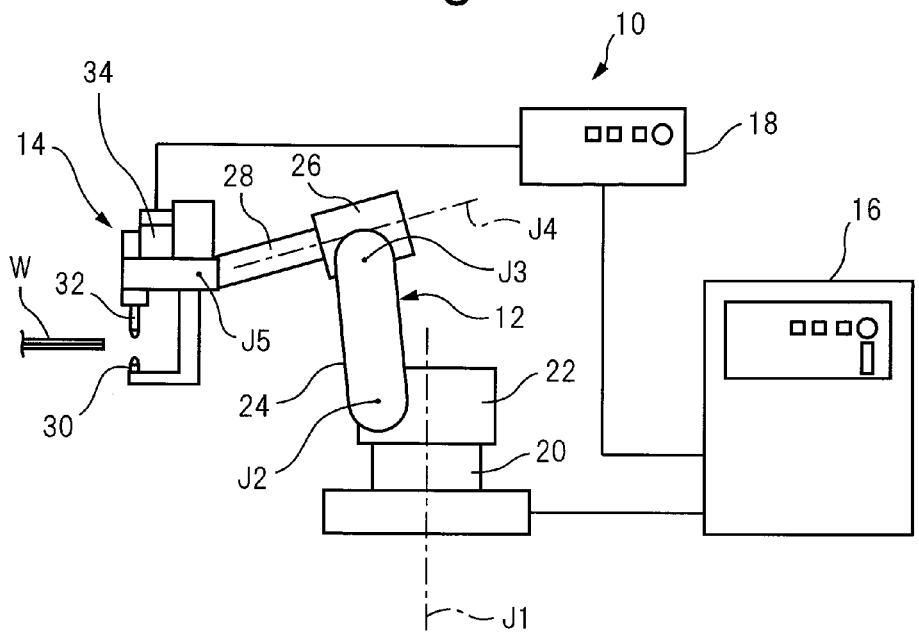
FIG. 1 is a view of the overall configuration of a spot welding system using a multiarticulated robot to hold a spot welding gun and make it move relative to a fixed welding workpiece.

Below, referring to the drawings, several embodiments of the present invention will be explained. In the figures, the same parts are assigned the same reference notations.

First, referring to FIG. 1 and FIG. 2, the overall configuration of a spot welding system 10 to which the present invention can be applied will be explained.

A spot welding system 10 to which a method of detection of the welding workpiece position of the present invention can be applied is provided with a multiarticulated robot 12, a spot welding gun 14, a robot control device 16 which controls the operation of the multiarticulated robot 12, and a spot welding gun control device 18 which controls the operation of the spot welding gun 14. The multiarticulated robot 12 can be used to make the welding workpiece W and the spot welding gun 14 move relative to each other.

The multiarticulated robot 12 is for example a four-axis vertical multiarticulated type and includes a pedestal 20 placed on a floor, a turret 22 supported on the pedestal 20 to be able to rotate about a vertical axial line J1, a bottom arm 24 supported at one end on the turret 22 to be able to rotate about a horizontal axial line J2, a top arm 26 supported at the other end of the bottom arm 24 to be able to rotate about a horizontal axial line J3, and a wrist element 28 supported with respect to the top arm 26 to be able to rotate about an axial line J4 perpendicular to the horizontal axial line J3. However, the multiarticulated robot 12 does not have to be the above such four-axis vertical multiarticulated type. So long as able to make the spot welding gun 14 and welding workpiece W move relative to each other, it may also be made a six-axis vertical multiarticulated robot or other type of multiarticulated robot.

The spot welding gun 14 includes a pair of electrodes comprising a movable electrode 30 and a counter electrode 32 arranged facing it. The movable electrode 30 is designed to be driven by a servo motor 34 to approach or separate from the counter electrode 32. The movable electrode 30 and counter electrode 32 are closed to clamp the welding workpiece W between them. In this state, voltage is applied across the movable electrode 30 and counter electrode 32 to perform spot welding. The counter electrode 32 is generally a fixed electrode arranged on a gun arm, but may also, like the movable electrode 30, be driven by a servo motor.

Figure 2:
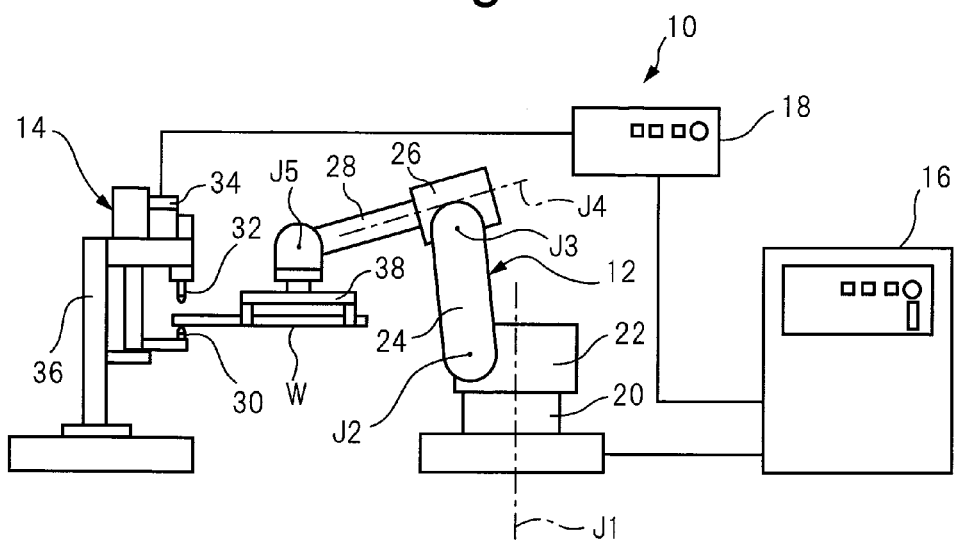
FIG. 2 is a view of the overall configuration of a spot welding system using a multiarticulated robot to hold a welding workpiece and make it move relative to a fixed spot welding gun.

In FIG. 1 and FIG. 2, the robot control device 16 and the spot welding gun control device 18 are provided separately, but the robot control device 16 and spot welding gun control device 18 may also be provided integrally. Further, if the spot welding gun 14 and welding workpiece W can be moved relative to each other, as shown in FIG. 1, the welding workpiece W may also be fixed on a workpiece table (not shown) and the spot welding gun 14 may be supported at the front end of the multiarticulated robot 12 rotatably about a horizontal axial line J5 or, as shown in FIG. 2, the spot welding gun 14 may be fixed to a gun stand 36 set on the floor and the welding workpiece W may be held at the front end of the multiarticulated robot 12. Like in the latter case, when holding welding workpiece W at the front end of the multiarticulated robot 12, as shown in FIG. 2, the front end of the wrist element 28 is fit with a robot hand 38 for holding the welding workpiece W in a manner able to rotate about the horizontal axial line J5.

The method of detection of the welding workpiece position according to the present invention is used when using the movable electrode 30 or counter electrode 32 to detect the position of the surface of the welding workpiece W at the movable electrode side or the surface at the counter electrode side when positioning the movable electrode 30 or counter electrode 32 at a predetermined position (hereinafter referred to as the "strike position") on a welding workpiece W in teaching work of the spot welding system 10, when measuring the plate thickness of a strike position, etc. Further, it is possible to correct the strike teaching position data of the spot welding program or prepare new strike teaching position data based on the detected position of the surface of the welding workpiece W at the movable electrode side or the surface at the counter electrode side.

First, an aspect A will be explained.

Figure 3:
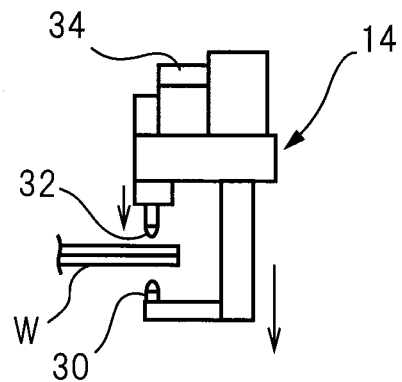
FIG. 3 is an explanatory view showing use of a multiarticulated robot to make a movable electrode of a spot welding gun approach a welding workpiece.
Figure 4:
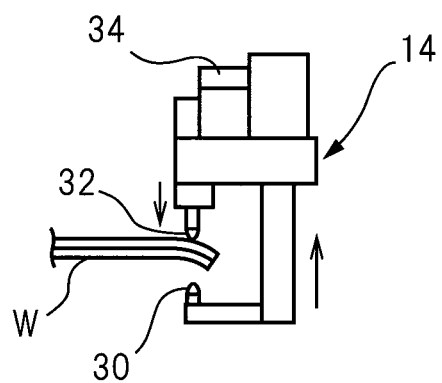
FIG. 4 is an explanatory view showing use of a multiarticulated robot to make a movable electrode of a spot welding gun separate from a welding workpiece.

The method of detection of the welding workpiece position according to the present invention uses the servo motor 34 to drive the movable electrode 30 at the speed Vg while using the multiarticulated robot 12 to make the spot welding gun 14 and welding workpiece W move relative to each other so that, as shown in FIG. 3, the movable electrode 30 of the spot welding gun 14 and welding workpiece W are made to approach each other from a separated state or that, as shown in FIG. 4, the movable electrode 30 of the spot welding gun 14 and welding workpiece W are made to separate from each other from a pressed state, while doing so, monitors the torque or current of the servo motor 34 for driving the movable electrode 30 and, when the trend of change of the torque or current changes, judges that the movable electrode 30 has contacted the welding workpiece W or the movable electrode 30 has completely separated from the welding workpiece W, and detects the position of the surface of the welding workpiece W based on the position data of the front end of the wrist element 28 of the multiarticulated robot 12 and the relative position data of the movable electrode 30 with respect to the counter electrode 32 of the spot welding gun 14 at this time. Therefore, there is no need for a worker to confirm the position of the welding workpiece W and the time required for the robot teaching work etc. can be shortened.

Here, in the present application, "when a trend of change . . . changes" means when a trend of decrease or constant state changes to a monotonic increase, when a trend of gentle increase changes to a relatively sharp increase with a larger amount of increase per unit time, when a trend of monotonic decrease changes to a gentle, steady increase or constant state, or when a trend of monotonic decrease changes to a gentle decrease with a smaller amount of decrease per unit time.

The position of the surface of the welding workpiece W is found as the position of the front end of the movable electrode 30 when the movable electrode 30 contacts the welding workpiece W or the movable electrode 30 completely separates from the welding workpiece W. The position data of the front end of the movable electrode 30 is found, for example, as follows, based on the position data of the front end of the wrist element 28 of the multiarticulated robot 12 and the relative position data of the movable electrode 30 with respect to the counter electrode 32 in the spot welding gun 14.

The distance from the floor surface to the horizontal axial line J2 of the turret 22 supported on the pedestal 20, the interaxial distance between the vertical axial line J1 and horizontal axial line J2, the interaxial distance between the horizontal axial line J2 and horizontal axial line J3, and the interaxial distance between the horizontal axial line J3 and the axial line J4 are constant, so the position of the front end of the wrist element 28 of the multiarticulated robot 12 can be found from the rotational angles of each of the axes of the multiarticulated robot 12. Further, the relative position of the front end of the movable electrode 30 with respect to the front end of the counter electrode 32 of the spot welding gun 14 can be found from the rotational angle of the servo motor 34 driving the movable electrode 30, while the position from the front end of the wrist element 28 of the multiarticulated robot 12 to the front end of the counter electrode 32 of the spot welding gun 14 is fixed. Therefore, the position data of the front end of the counter electrode 32 of the spot welding gun 14 can be found from the position data of the front end of the wrist element 28 of the multiarticulated robot 12 and the positional relationship between the front end of the wrist element 28 of the multiarticulated robot 12 and the front end of the counter electrode 32 of the spot welding gun 14, while the position data of the front end of the movable electrode 30 can be found from the found position data of the front end of the counter electrode 32 of the spot welding gun 14 and the relative position data of the front end of the movable electrode 30 with respect to the front end of the counter electrode 32 of the spot welding gun 14.

Figure 5:
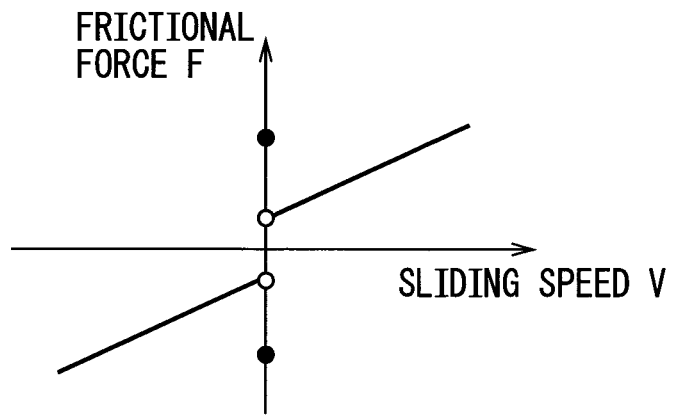
FIG. 5 is a graph showing a correlative relationship between a sliding speed and frictional force generated from the same.

Inside of the drive mechanism (not shown) of the movable electrode 30 of the spot welding gun 14, there are various parts contacting each other. Friction occurs between two contacting objects. The friction generated between such two contacting objects includes static friction occurring between objects when objects stationary with respect to each other start to be moved and dynamic friction occurring between objects moving with respect to each other. As shown in FIG. 5, when the relative sliding speed of two objects is near 0, the static friction becomes dominant. If the absolute value of the relative sliding speed becomes larger, the region of dominance of the static friction is left and a region of dominance of dynamic friction where the frictional force is proportional to the relative sliding speed is reached. Therefore, if making the movable electrode 30 move faster to shorten the time required for detection of the surface position of the welding workpiece W by the movable electrode 30, the dynamic frictional force of the movable electrode drive mechanism also becomes larger and the variation of the dynamic friction also becomes larger. Further, the variation of the dynamic friction of the movable electrode drive mechanism is included in the current or torque of the servo motor 34 as noise, so if the variation of the dynamic friction becomes larger, the variation of the current or torque of the servo motor 34 also becomes larger and as a result the fluctuation of the current or torque of the servo motor 34 due to contact of the movable electrode 30 and the welding workpiece W is difficult to accurately detect.

Therefore, in the present invention, instead of using the servo motor 34 to move the movable electrode 30 with respect to the counter electrode 32, the multiarticulated robot 12 is used to make the spot welding gun 14 and welding workpiece W move relative to each other and thereby make the movable electrode 30 and the welding workpiece W approach and separate to perform at least part of an operation of making the movable electrode 30 and the welding workpiece W contact each other or an operation of making them completely separate (be isolated from each other) from a contact state and thereby keep down the speed of the movement of the movable electrode 30 due to the servo motor 34 and reduce variation of the current or torque of the servo motor 34 due to dynamic friction in the movable electrode drive mechanism. By reducing the variation of the current or torque of the servo motor 34 in this way, it is made possible to more accurately detect the change of the trend of change of the current or torque of the servo motor 34 due to contact of the movable electrode 30 and the welding workpiece W and more accurately detect the surface position of the welding workpiece W.

In particular, if making the speed Vg by which the servo motor 34 drives the movable electrode 30 "0" and performing all of an operation for making the movable electrode 30 and the welding workpiece W contact or making them separate completely from the contact state by movement of the multi-articulated robot 12, when using the movable electrode 30 to detect the position of the surface of the welding workpiece W, since the movable electrode 30 is not driven by the servo motor 34, the fluctuation of the current or torque of the servo motor 34 due to the dynamic friction in the movable electrode drive mechanism almost completely disappears. Therefore, it becomes possible to accurately detect the change of the trend of change of the current or torque of the servo motor 34 when the movable electrode 30 and the welding workpiece W contact or the movable electrode 30 completely separates from the welding workpiece W, and the surface position of the welding workpiece can be accurately detected.

On the contrary, if making the speed Vg by which the servo motor 34 drives the movable electrode 30 "0" and making the movable electrode 30 stationary with respect to the counter electrode 32, as explained above, due to the static friction in the movable electrode drive mechanism, when the movable electrode 30 contacts the welding workpiece W, the reaction force received from the welding workpiece W will be lost and not be transmitted to the servo motor 34 resulting in an insensitive zone where the current or torque of the servo motor 34 does not fluctuate much at all regardless of existence of any reaction force. Such an insensitive zone, when the static friction is large, exerts a detrimental effect on the precision of detection of the surface of the welding workpiece W by the movable electrode 30. Therefore, when the effect of the static friction present in the movable electrode of spot welding gun drive mechanism cannot be ignored, to eliminate such an insensitive zone, it is preferable to drive the movable electrode 30 by the servo motor 34 at an extremely low speed Vg of an extent where the static friction can be eliminated. In this way, even if the movable electrode 30 is made to move with respect to the counter electrode 32 at the extremely low speed Vg of an extent where the static friction can be eliminated, the dynamic friction in the movable electrode drive mechanism becomes small, so variation of the current or torque of the servo motor 34 due to the dynamic friction can be suppressed to the minimum extent. Note that, this operation of the movable electrode 30 has as its object the elimination of the effect of static friction, so the movement of the movable electrode 30 with respect to the counter electrode 32 may also be performed in the opening direction or closing direction and by repeated opening and closing.

Further, in the above, the explanation was given of using the current or torque of the servo motor 34 provided at the spot welding gun 14 as the basis to detect the welding workpiece position, but it is also possible to convert this current or torque to a pressing force and use the converted pressing force to similarly detect the welding workpiece position. Spot welding guns come in various mechanisms and shapes. Furthermore, the deceleration mechanisms (deceleration ratios) also differ. Therefore, even if the current or torque of the servo motor is the same, the pressing force generated at the front end of the movable electrode 30 when pressing against the welding workpiece W will differ. The method does not use the current or torque as the basis to detect the welding workpiece position, but uses the pressing force generated at the front end of the movable electrode 30 as the basis to detect the welding workpiece position because the pressing force on the welding workpiece W can be made constant and the conditions for use for judgment of detection can be made the same in all sorts of types of spot welding guns, so a uniform detection precision can be obtained. Here, the current or torque of the servo motor 34 is converted to a pressing force by using a sensor device able to measure pressing force to find in advance the correspondence between the current or torque of the servo motor 34 and the pressing force. By storing this correspondence in the robot control device 16 or spot welding gun control device 18, it becomes possible to convert to a pressing force in any case.

Further, in the method of detection of the welding workpiece position of the present invention, a worker may proceed step by step by manual operation, but the spot welding system 10 may also automatically execute a series of steps. For example, in a spot welding program in which all welding strike positions and program instructions for spot welding are already taught, by activating the mode where the above steps are automatically executed and playing the spot welding program and by executing program instructions automatically making the multiarticulated robot 12 move to near the welding strike positions and perform spot welding, it is possible to automatically perform the above steps and detect the surface position of the welding workpiece W, use the detected position as the basis to correct the strike teaching position data for the welding workpiece W, and, furthermore, record the amount of correction (amount of deviation) in the robot control device 16. It is also possible to display the recorded amount of correction on a teaching control panel provided at the robot control device 16. Further, when the recorded amount of correction is excessively large, it is possible to deem this as an abnormality of the position of the welding workpiece W, raise an alarm at the teaching control panel provided at the robot control device 16, or raise an alarm at a line control console or computer or other external control device able to communicate with the robot control device 16.

In the method of detection of the welding workpiece position of the present invention, so long as the multiarticulated robot 12 can be used to make the spot welding gun 14 and welding workpiece W move relative to each other, the same advantageous effects can be obtained, but below, for simplification of the explanation, as shown in FIG. 1, the explanation will be given of holding the spot welding gun 14 by the multiarticulated robot 12 and making the gun move relatively with respect to the welding workpiece W. However, as shown in FIG. 2, it is also possible to have the welding workpiece W held by the multiarticulated robot 12 and make it move with respect to the spot welding gun 14. In this case, in the following explanation, the multiarticulated robot 12 may be used to make the welding workpiece W move instead of making the spot welding gun 14 move.

Embodiment A1

Figure 6:
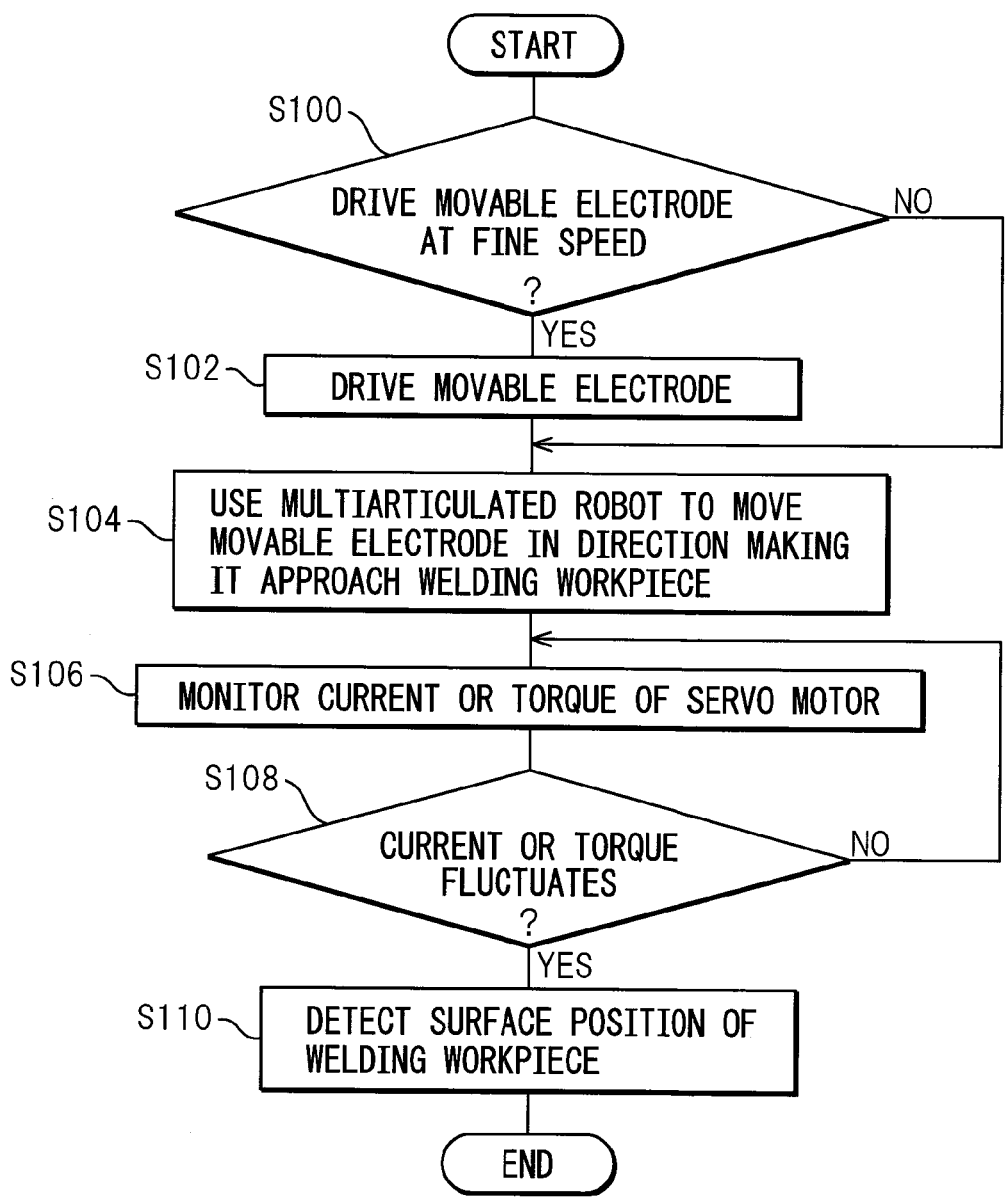
FIG. 6 is a flowchart of a method for making a movable electrode of a spot welding gun approach a welding workpiece to detect a surface position of the welding workpiece.

Referring to FIG. 6, an A1-th embodiment of a method of detection of the welding workpiece position of the present invention will be explained. In the A1-th embodiment, in the spot welding system 10 shown in FIG. 1, the speed Vg by which the servo motor 34 drives the movable electrode 30 is made "0" and the movable electrode 30 is made stationary with respect to the counter electrode 32. In that state, the multiarticulated robot 12 is used to hold the spot welding gun 14 and make it move relative to the welding workpiece W fixed to the workpiece table (not shown) by a speed Vr.

Further, the servo motor 34 for driving the movable electrode 30 is set with a torque limit, so the torque will never increase over a certain value. To suppress deformation of the welding workpiece W due to pressing by the movable electrode 30, the torque limit is preferably set to as low a value as possible.

In this embodiment, first, the welding workpiece W is made to move between the movable electrode 30 and the counter electrode 32 of the spot welding gun 14 and the spot welding gun 14 is positioned at a position so as to contact the welding location (strike position) on the workpiece W when the movable electrode 30 and counter electrode 32 are closed. Note that, at this time, to prevent the movable electrode 30 and the welding workpiece W from approaching too much, it is preferable to position the movable electrode 30 at a position a certain extent of distance from the surface of the welding workpiece W to secure a preparatory operation zone where the movable electrode 30 does not contact the welding workpiece W. Further, it is also possible to position the movable electrode 30 at the welding location on the welding workpiece W, then make the movable electrode 30 separate from the welding workpiece W by exactly any desired distance.

Then, by selecting no driving of the movable electrode 30 at step S100, keeping the movable electrode 30 stationary with respect to the counter electrode 32, and, as shown in FIG. 3, driving the multiarticulated robot 12 to make the spot welding gun 14 move relative to the welding workpiece W at the speed Vr, the movable electrode 30 is made to approach toward the welding workpiece W from a state when the movable electrode 30 and the welding workpiece W are separated (step S104). Simultaneously, the current or torque of the servo motor 34 for driving the movable electrode 30 is monitored (step S106). At this time, the information of the current or torque of the servo motor 34 and the position data of the front end of the wrist element 28 of the multiarticulated robot 12 and the relative position data of the movable electrode 30 with respect to the counter electrode 32 are successively recorded. Furthermore, in accordance with need, as the value or amount of change per unit time of the current or torque of a comparison-use reference state (that is, state at the time of no contact), the value or amount of change per unit time of the current or torque of the servo motor 34 when assuming that the current or torque of the servo motor 34 has the same trend of change as the preparatory operation zone is determined from the current or torque of the servo motor 34 successively required in the preparatory operation zone after the start of the relative movement between the spot welding gun 14 and welding workpiece W and before the contact of the movable electrode 30 and the welding workpiece W.

If the movable electrode 30 contacts the welding workpiece W, the welding workpiece W is pressed by the movable electrode 30 causing bending, denting, and other elastic deformation, and a reaction force acts from the welding workpiece W to the movable electrode 30. As a result, to maintain the state of the movable electrode 30 being stationary with respect to the counter electrode 32, the torque of the servo motor 34 increases and the current also increases. Utilizing this, the current or torque of the servo motor 34 is successively checked (step S108). When the current or torque of the servo motor 34 changes to a trend of increase compared with a predetermined reference state, it is judged that the movable electrode 30 has contacted the welding workpiece W. Note that, "when . . . changes to a trend of increase compared with a predetermined reference state" means when the actual value or amount of change per unit time of the current or torque of the servo motor 34 becomes larger than the value or amount of change per unit time of the current or torque of the servo motor 34 when assuming a reference state (in this case, when changing to an increase from a substantially constant state). The method of judgment will be explained later. If judging that the movable electrode 30 has contacted the welding workpiece W, the operation of the multiarticulated robot 12 is made to stop and the position data of the front end of the wrist element 28 of the multiarticulated robot 12 and the relative position data of the movable electrode 30 with respect to the counter electrode 32 in the spot welding gun 14 when it has been judged that the movable electrode 30 has contacted the welding workpiece W are used as the basis to detect the position of the surface of the welding workpiece W, then the process of detection of the surface position of the welding workpiece W is ended (step S110).

Figure 7:
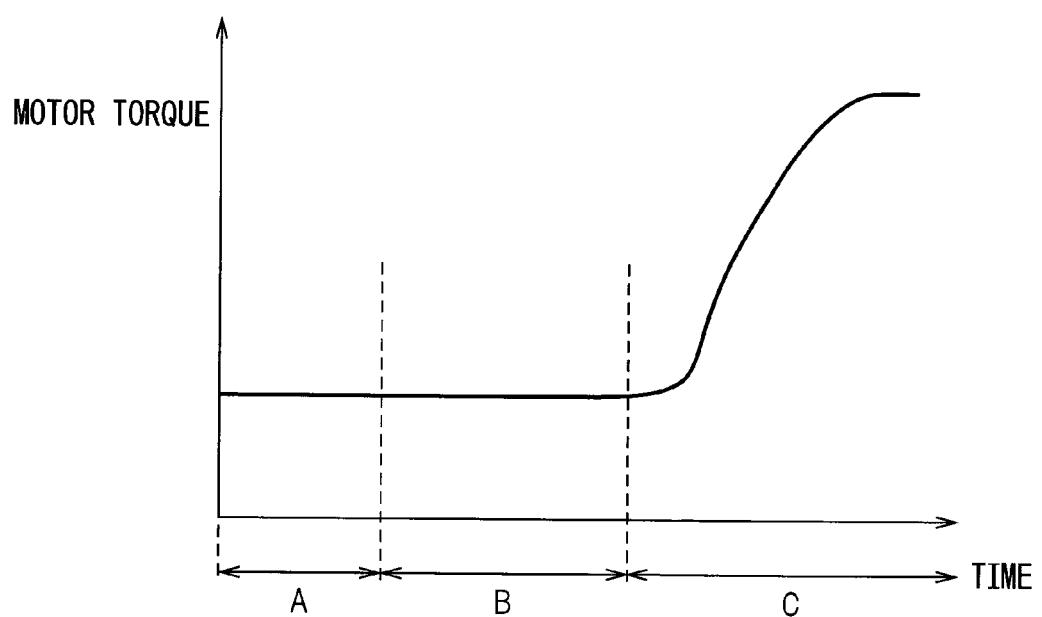
FIG. 7 is a graph showing changes along with time of a motor torque when working an A1-th embodiment of a method of detection of the welding workpiece position of the present invention.

FIG. 7 is a graph showing by a time series the change in the torque of the servo motor 34 when using the movable electrode 30 to detect the surface of the welding workpiece W according to the present embodiment. In FIG. 7, the zone A shows the state when no detection operation is being performed, the zone B shows the state during the detection operation when the movable electrode 30 does not contact the welding workpiece W, and the zone C shows the state during the detection operation when the movable electrode 30 contacts the welding workpiece W. Note that, in the present embodiment as well, vibration of the multiarticulated robot 12 etc. causes fine variation in the current or torque of the servo motor 34, but FIG. 7, for simplification of the explanation, is drawn omitting this variation.

In this embodiment, the movable electrode 30 is stationary with respect to the counter electrode 32. The movable electrode 30 is not driven by the servo motor 34, so the movable electrode drive mechanism does not experience dynamic friction and until the movable electrode 30 contacts the welding workpiece W, the current and torque of the servo motor 34 do not fluctuate much at all. Therefore, in the zone A before the detection operation and the zone B during the detection operation when the movable electrode 30 does not contact the welding workpiece W, almost no rapid change appears in the current and torque of the servo motor 34, so the current and torque of the servo motor 34 are in a substantially constant state. On the contrary, at the zone C, when the movable electrode 30 contacts the welding workpiece W, the welding workpiece W elastically deforms and a reaction force acts from the welding workpiece W to the movable electrode 30, so the current and torque of the servo motor 34 increase. If making the movement of the movable electrode 30 toward the welding workpiece W continue even after the movable electrode 30 has contacted the welding workpiece W, the amount of elastic deformation of the welding workpiece W increases, the reaction force acting from the welding workpiece W to the movable electrode 30 also increases, and finally the value of the torque of the servo motor 34 reaches the torque limit whereupon the torque of the servo motor 34 again becomes constant. By setting the servo motor 34 with a torque limit in this way, the movable electrode 30 of the spot welding gun 14 made to move by the multiarticulated robot 12 can be prevented from causing the welding workpiece W to excessively deform. This is particularly effective when detecting the surface position of a soft welding workpiece W which easily plastically deforms. Note that, the movement of the multiarticulated robot 12 may also be stopped when it is determined that the reaction force acting from the welding workpiece W to the movable electrode 30 has increased by a certain extent. If the movement of the multiarticulated robot 12 is stopped, the increase of the torque of the servo motor 34 will stop.

By recording the current or torque of the servo motor 34 at the zone B, it is possible to find the value or amount of change per unit time of the current or torque of the servo motor 34 at the zone B, make it the value or amount of change per unit time of the current or torque of the servo motor 34 in the reference state, and use this for comparison with the value or amount of change per unit time of the current or torque of the servo motor 34 in the zone C. Further, if providing a distance between the movable electrode 30 and the welding workpiece W in advance before the start of operation, the zone B can be lengthened and a sufficient preparatory operation zone can be secured, so the current or torque of the servo motor 34 when the movable electrode 30 and the welding workpiece W do not contact can be reliably recorded.

If, in this way, making the movable electrode 30 stationary with respect to the counter electrode 32 and in that state using the multiarticulated robot 12 to make the spot welding gun 14 move relatively in a direction making it approach the welding workpiece W, when the movable electrode 30 contacts the welding workpiece W, the current and torque of the servo motor 34 for driving the movable electrode 30 changes to a monotonic increase. Therefore, if monitoring the current or torque of the servo motor 34, it is possible to judge the time when the current or torque changes to a trend of increase compared with the reference state recorded in the zone B of FIG. 7, that is, the substantially stable state, as the point of time when the movable electrode 30 contacted the welding workpiece W. Furthermore, it is possible to find the position data of the front end of the movable electrode 30 when it is judged that the movable electrode 30 has contacted the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has contacted the welding workpiece W. If deeming the found position data of the front end of the movable electrode 30 to be the position of the surface of the welding workpiece W data, it is possible to detect the position of the surface of the welding workpiece W.

The point of time when the current or torque of the servo motor 34 changes to a trend of increase compared with the reference state is identified by analyzing the time-series curve, that is, waveform, of the current or torque of the servo motor 34 and finding the point where the current or torque changed from a substantially constant state to an increase (hereinafter referred to as the "point of change"). The following three examples of the method of analysis of the waveform of the current or torque for finding the point of change may be mentioned.

(i) The point where the current or torque of the servo motor 34 increases from the value of the current or torque of the servo motor 34 of the reference state by a predetermined threshold value α or more is deemed to be the point of change. The value of the current or torque of the servo motor 34 of the reference state may be made a value determined in advance by experiments or may be made the value of the current or torque of the servo motor 34 when assuming that the current or torque of the servo motor 34 is in a reference state determined from the current or torque of the servo motor 34 recorded at any time in the zone B of FIG. 7. The current or torque of the servo motor 34 may be recorded at any time in the zone B of FIG. 7, but in general, if right after entering the zone B, the movable electrode 30 and the workpiece W will not yet be in contact, so it is preferable to record the current or torque of the servo motor 34 at this time and make this the current or torque of the servo motor 34 in the reference state. Further, when there has been no increase in torque due to contact between the movable electrode 30 and workpiece W for a certain time in the zone B, it is also possible to redetermine the reference state from the previous information. Note that even when the movable electrode 34 is stationary with respect to the counter electrode 32, due to the effect of movement of the spot welding gun 14 by the multiarticulated robot 12, the current or torque of the servo motor 34 fluctuates slightly, so the threshold value α has to be set to a value larger the amplitude of this fluctuation.

(ii) The point where the amount of change per unit time of the current or torque of the servo motor 34, that is, the slant of the time-series waveform of the current or torque of the servo motor 34, increases from the amount of change per unit time of the current or torque of the servo motor 34 of the reference state by a predetermined threshold value β or more is deemed the point of change. The amount of change per unit time of the current or torque of the servo motor 34 of the reference state may be made a predetermined value (for example, zero) or may be made the value of the current or torque of the servo motor 34 when assuming a standard state determined from the amount of change of the current or torque of the servo motor 34 recorded in the zone B. If the movable electrode 30 contacts the welding workpiece W, as shown in FIG. 7, the current or torque of the servo motor 34 monotonously increases, so the threshold value β becomes a positive value. Further, when the movable electrode 30 is stationary with respect to the counter electrode 32, until the movable electrode 30 contacts the welding workpiece W, the current or torque of the servo motor 34 remains almost completely constant and the amount of change per unit time of the current or torque is also extremely small, so the threshold value β can be made a value close to "0".

(iii) When the movable electrode 30 contacts the welding workpiece W, the current or torque of the servo motor 34 monotonically increases, so when the movable electrode 30 contacts the welding workpiece W, the slant of the waveform of the current or torque of the servo motor 34 becomes positive. Therefore, first, the method of (i) or (ii) is used to find the point of change of the current or torque of the servo motor 34, this is used as the provisional point of change, and the time-series waveform of the current or torque of the servo motor 34 is traced back along in time from the provisional point of change to find the amount of change per unit time of the current or torque of the servo motor 34 (that is, the slant of the time-series waveform of the current or torque) is found. Further, the point where the slant of the time-series waveform of the current or torque of the servo motor 34 becomes substantially 0 is made the true point of change, and it is deemed that the current or torque of the servo motor 34 changed from a substantially constant state to an increase at the true point of change. Note that, the time-series waveform of the current or torque of the servo motor 34 is a set of discrete sampling points, so there will not necessarily be a point where the slant becomes 0. Therefore, in practice, it is sufficient to trace back along in time the time-series waveform of the current or torque from the provisional point of change, identify the point where the slant of the time-series waveform of the current or torque changes from a positive value to a negative value, and make the sampling point right before that as the true point of change. According to such a method, it is possible to accurately identify the time right after the current or torque has changed from a constant state to an increase and possible to accurately find the surface position of the welding workpiece W.

When, like in the present embodiment, making the movable electrode 30 stationary with respect to the counter electrode 32, the movable electrode 30 is not driven by the servo motor 34 and dynamic friction does not occur at the movable electrode drive mechanism, so almost no variation of the current or torque of the servo motor 34 occurs, judgment of the point of time when the current or torque of the servo motor 34 changes from a substantially constant state to an increase becomes easy, and, in (i) and (ii), the threshold values α and β can be set to small values. Therefore, the point of time of contact of the movable electrode 30 and the welding workpiece W can be accurately identified and the amount by which the welding workpiece W can be deformed by the movable electrode 30 from when the movable electrode 30 and the welding workpiece W actually contact to when that contact is detected is reduced, so it becomes possible to more accurately detect the surface position of the welding workpiece W.

Note that, in this embodiment, to keep deformation of the welding workpiece W by the movable electrode 30 to a minimum extent, when it is judged that the movable electrode 30 has contacted the welding workpiece W, the robot control device 16 makes the operation of the multiarticulated robot 12 stop and detects the position of the surface of the welding workpiece W from the position data of the front end of the wrist element 28 of the multiarticulated robot 12 and the relative position data of the movable electrode 30 with respect to the counter electrode 32 in the spot welding gun 14 when judging that the movable electrode 30 has contacted the welding workpiece W. However, when employing the method of analysis (iii), the time-series data of the current or torque of the servo motor 34 required for analysis at the point of time of identification of the provisional point of change is readied for use, but after that, the detection operation does not have to be continued, so the operation of the multiarticulated robot 12 may also be stopped not after judging that the movable electrode 30 has contacted the welding workpiece W, but at the point of time of identifying the provisional point of change.

Further, even if judging that the movable electrode 30 and the welding workpiece W have contacted, sometimes the multiarticulated robot 12 will end up running on inertia and the position of the front end of the wrist element 28 of the multiarticulated robot 12 when making the operation of the multiarticulated robot 12 stop and the position of the front end of the wrist element 28 of the multiarticulated robot 12 when judging that the movable electrode 30 and the welding workpiece W have contacted will end up differing. Therefore, when positioning of the movable electrode 30 of the spot welding gun 14 is the final object, to correct this continued running of the multiarticulated robot 12, the multiarticulated robot 12 may be made to move to the position when it is judged that the movable electrode 30 and the welding workpiece W have contacted each other.

Embodiment A2

In the A2-th embodiment, in the spot welding system 10 shown in FIG. 1, the speed Vg by which the servo motor 34 drives the movable electrode 30 is not 0, the servo motor 34 is used to make the movable electrode 30 move, and, while doing so, the multiarticulated robot 12 is used to hold the spot welding gun 14 and make it move relative to a welding workpiece W fixed to the workpiece table (not shown) at a speed Vr. In this point, this differs from the A1-th embodiment. The rest of the points are similar to the A1-th embodiment. Therefore, here, the different parts will basically be explained and explanations of similar parts will be omitted.

In the A1-th embodiment, the speed Vg by which the servo motor 34 drives the movable electrode 30 is made "0" and the movable electrode 30 is made stationary with respect to the counter electrode 32, so there are the advantages that almost no variation of the current or torque of the servo motor 34 due to the dynamic friction of the movable electrode drive mechanism occurs and the point of change of the current or torque of the servo motor 34 to a trend of increase when the movable electrode 30 contacts the welding workpiece W can be easily detected. On the other hand, the movable electrode 30 is stationary with respect to the counter electrode 32, so due to the static friction in the movable electrode drive mechanism, when the movable electrode 30 contacts the welding workpiece W, the reaction force received by the movable electrode 30 from the welding workpiece W is lost and not transmitted to the servo motor 34 resulting in an insensitive zone where the current or torque of the servo motor 34 does not fluctuate much at all regardless of the movable electrode 30 contacting the welding workpiece W. Even if the movable electrode 30 contacts the welding workpiece W, fluctuation of the current or torque of the servo motor 34 does not immediately occur. Therefore, when the static friction of the movable electrode drive mechanism is small, the effect due to the elimination of the variation of the current or torque of the servo motor 34 due to the dynamic friction of the movable electrode drive mechanism overcomes the detrimental effect due to the existence of the insensitive zone, do the A1-th embodiment becomes effective, but when the static friction of the movable electrode drive mechanism is large, the detrimental effect due to the existence of the insensitive zone ends up exceeding the effect due to the elimination of the variation of the current or torque of the servo motor 34 occurring due to the dynamic friction of the movable electrode drive mechanism.

Therefore, in the A2-th embodiment, the servo motor 34 can be used to make the movable electrode 30 with respect to the counter electrode 32 at a low speed Vg ($\neq 0$) so as to eliminate such an insensitive zone and enable application even in a case where the static friction of the movable electrode drive mechanism is large. In practice, it is sufficient to test out by the methods of the A1-th embodiment and the A2-th embodiment and employ the one with the higher detection precision. Further, it is also possible to measure in advance the effect of the static friction and determine the method to employ by the extent of the effect.

Note that, if the speed Vg by which the servo motor 34 is used to make the movable electrode 30 move with respect to the counter electrode 32 is too high, the dynamic friction of the movable electrode drive mechanism causes variation in the current or torque of the servo motor 34 and has a detrimental effect on the precision of detection of the surface position of the welding workpiece W, while if too low, the static friction of the movable electrode drive mechanism can no longer be sufficiently removed. Therefore, the speed Vg of using the servo motor 34 to make the movable electrode 30 move with respect to the counter electrode 32 preferably is made an extremely low speed removing the static friction and keeping to a minimum extent the variation of the current or torque of the servo motor 34 due to the dynamic friction.

Referring to FIG. 6, the procedure of the method of detection of the welding workpiece position according to the A2-th embodiment will be explained.

First, in the same way as the A1-th embodiment, this makes the welding workpiece W move between the movable electrode 30 and the counter electrode 32 of the spot welding gun 14 and positions the spot welding gun 14 at a position contacting the welding location (strike position) on the welding workpiece W when the movable electrode 30 and counter electrode 32 are closed. Note that, at this time, it is preferable to position the movable electrode 30 at a positive certain distance away from the surface of the welding workpiece W so that the movable electrode 30 and the welding workpiece W do not approach each other too much and secure a preparatory operation zone where the movable electrode 30 does not contact the welding workpiece W. Further, it is also possible to position the movable electrode 30 at the welding location on the welding workpiece W, then make the movable electrode 30 move so as to separate from the welding workpiece W by exactly any distance.

Then, at step S100, driving of the movable electrode 30 is selected and the servo motor 34 is used to drive the movable electrode 30 by a slight speed Vg (step S102). The speed Vg by which the servo motor 34 makes the movable electrode 30 move with respect to the counter electrode 32, as explained above, is made an extremely low speed which eliminates the static friction while keeping to a minimum extent the fluctuation of the current or torque of the servo motor 34 due to the dynamic friction. Further, the movable electrode 30 is made to move with respect to the counter electrode 32 for the purpose of eliminating the effect of the static friction of the movable electrode drive mechanism, so the movement of the movable electrode 30 with respect to the counter electrode 32 may be performed in the opening direction or closing direction and by repeated opening and closing. Note that, when making the movable electrode 30 move in a direction away from the counter electrode 32, that is, when making the movable electrode 30 move in a direction away from the welding workpiece W, the multiarticulated robot 12 has to make the spot welding gun 14 move in a direction approaching the welding workpiece W at a speed Vr of the speed of movement of the movable electrode 30 Vg with respect to the counter electrode 32 or more.

Then, by making the movable electrode 30 move at the speed Vg with respect to the counter electrode 32 and, as shown in FIG. 3, driving the multiarticulated robot 12 to make the spot welding gun 14 move relative to the welding workpiece W at the speed Vr, the movable electrode 30 is made to approach toward the welding workpiece W from the state when the movable electrode 30 and counter electrode 32 are separated from each other (step S104) and, simultaneously, the current or torque of the servo motor 34 for driving the movable electrode 30 is monitored (step S106). At this time, the information of the current or torque of the servo motor 34 and the position data of the front end of the wrist element 28 of the multiarticulated robot 12 and the relative position data of the movable electrode 30 with respect to the counter electrode 32 are successively recorded. Furthermore, in the preparatory operation zone after the start of the relative movement between the spot welding gun 14 and welding workpiece W and before the contact of the movable electrode 30 and the welding workpiece W, as the value or amount of change per unit time of the current or torque of the reference state for comparison (that is, the state at the time of no contact), the value or amount of change per unit time of the current or torque of the servo motor 34 when assuming the current or torque of the servo motor 34 has the same trend of change as the preparatory operation zone is determined from the successively recorded current or torque of the servo motor 34.

If the movable electrode 30 contacts the welding workpiece W, the welding workpiece W is pressed against the movable electrode 30 causing bending, denting, and other elastic deformation, and a reaction force acts from the welding workpiece W on the movable electrode 30. As a result, to maintain the state when the movable electrode 30 moves with respect to the counter electrode 32 by the speed Vg, the torque of the servo motor 34 increases and the current also increases. By utilizing this and successively checking the fluctuation of the current or torque of the servo motor 34 (step S108), it is judged that the movable electrode 30 contacts the welding workpiece W when the current or torque of the servo motor 34 changes to a trend of increase compared with the predetermined reference state. Note that, "changes to a trend of increase compared with the . . . reference state" means when the actual value or amount of change per unit time of the current or torque of the servo motor 34 becomes larger than the value or amount of change per unit time of the current or torque of the servo motor 34 when assuming the reference state. The method of judgment will be explained later. If judging that the movable electrode 30 has contacted the welding workpiece W, the method stops the operation of the multiarticulated robot 12. It detects the position of the surface of the welding workpiece W based on the position data of the front end of the wrist element 28 of the multiarticulated robot 12 and the relative position data of the movable electrode 30 with respect to the counter electrode 32 in the spot welding gun 14 when judging that the movable electrode 30 contacts the welding workpiece W and ends the process of detection of the surface position of the welding workpiece W (step S110).

Figure 8A:
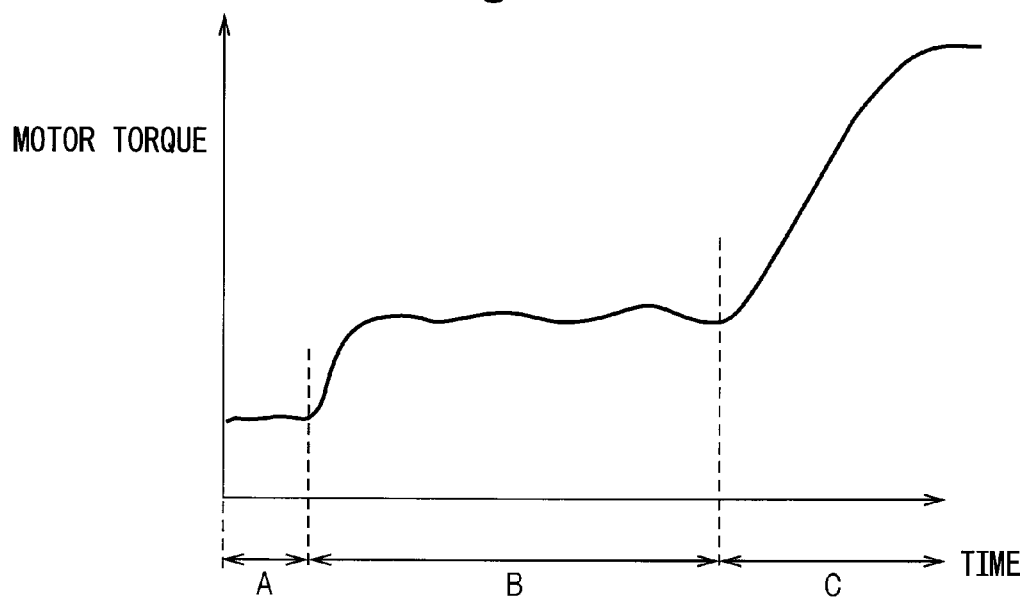
FIG. 8 are graphs showing changes along with time of a motor torque when working an A2-th embodiment of a method of detection of the welding workpiece position of the present invention.
Figure 8B:
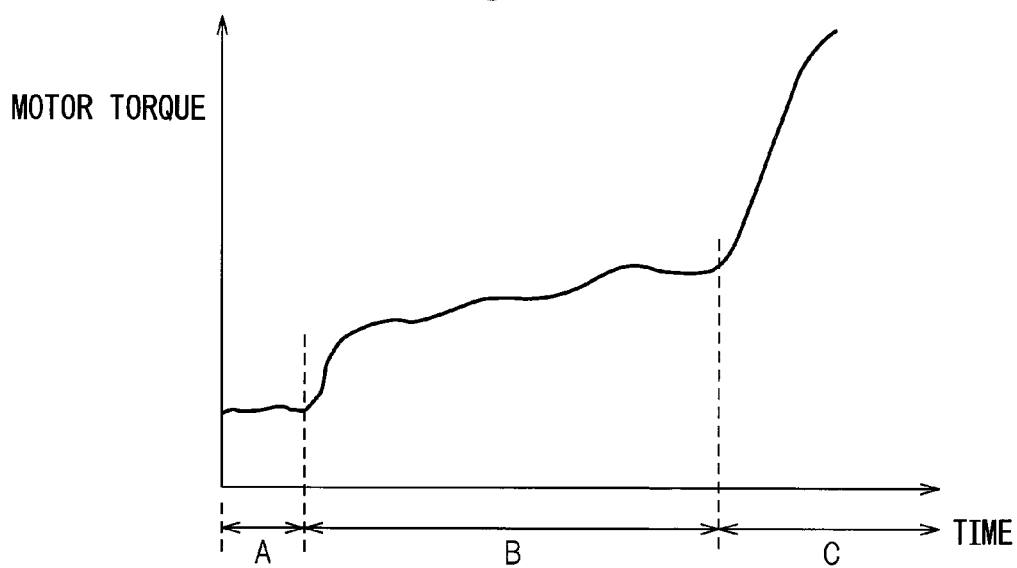

FIG. 8A and FIG. 8B are graphs showing by time series the change in the torque of the servo motor 34 when using the movable electrode 30 to detect the surface of the welding workpiece W according to the present embodiment. In FIG. 8A and FIG. 8B, the zone A indicates the state when the detection operation is not being performed, the zone B indicates the state during the detection operation when the movable electrode 30 does not contact the welding workpiece W, and the zone C indicates the state during the detection operation when the movable electrode 30 contacts the welding workpiece W.

In this embodiment, during the detection operation, the movable electrode 30 moves with respect to the counter electrode 32 by the speed Vg, so, as shown in FIG. 8A, when entering the zone B and starting the drive of the movable electrode 30, the current or torque of the servo motor 34 increases until the speed of the movable electrode 30 reaches the predetermined speed Vg, after this, the current or torque of the servo motor 34 becomes a substantially constant state accompanied with variation due to the dynamic friction of the movable electrode drive mechanism until the movable electrode 30 contacts the welding workpiece W. Note that, the speed of movement Vg of the movable electrode 30 Vg is extremely small, so the variation due to the dynamic friction of the movable electrode drive mechanism becomes small. On the contrary, at the zone C, if the movable electrode 30 contacts the welding workpiece W, the welding workpiece W elastically deforms and a reaction force acts from the welding workpiece W to the movable electrode 30, so the current and torque of the servo motor 34 increase. If continuing the movement of the movable electrode 30 toward the welding workpiece W even after the movable electrode 30 has contacted the welding workpiece W, the amount of elastic deformation of the welding workpiece W increases, the reaction force acting from the welding workpiece W to the movable electrode 30 also increases and finally the value of the torque of the servo motor 34 reaches the torque limit and the torque of the servo motor 34 becomes constant. By setting the servo motor 34 with a torque limit in this way, it is possible to prevent the movable electrode 30 of the spot welding gun 14 made to move by the multiarticulated robot 12 from causing the welding workpiece W to excessively deform in the same way as in the A1-th embodiment. Further, at the point of time when it is judged that the reaction force acting from the welding workpiece W to the movable electrode 30 has increased by a certain extent, it is possible to stop movement of the multiarticulated robot 12 in the same way as in the A1-th embodiment.

Further, in this embodiment, during the detection operation, the movable electrode 30 moves with respect to the counter electrode 32 by the speed Vg, so, as shown in FIG. 8B, in the zone B, if the drive of the movable electrode 30 is started, the current or torque of the servo motor 34 increases until the speed of the movable electrode 30 reaches the predetermined speed Vg. After this, until the movable electrode 30 contacts the welding workpiece W, it sometimes gently changes due to the mechanical resistance of the spot welding gun 14 (for example, elastic deformation of conductive parts connecting the removable electrode drive mechanism and welding transformer (not shown)) etc. along with variation due to the dynamic friction of the movable electrode drive mechanism. Note that, the speed of movement Vg of the movable electrode 30 is extremely small, so the variation due to the dynamic friction of the movable electrode drive mechanism becomes small. Note that, in FIG. 8B, a mode is adopted where, in the zone B, the current or torque of the servo motor 34 gradually rises, but a mode where it gradually falls may also be adopted. On the contrary, in the zone C, if the movable electrode 30 contacts the welding workpiece W, the welding workpiece W elastically deforms and a reaction force acts from the welding workpiece W to the movable electrode 30, so the current and torque of the servo motor 34 increase. If continuing the movement of the movable electrode 30 toward the welding workpiece W even after the movable electrode 30 has contacted the welding workpiece W, the amount of elastic deformation of the welding workpiece W increases and the reaction force acting from the welding workpiece W to the movable electrode 30 also increases. Note that, between the change in the zone B and the change in the zone C, in general the latter is sharper.

In the present embodiment as well, by recording the current and torque of the servo motor 34 in the zone B, it is possible to find the value and amount of change per unit time of the current and torque of the servo motor 34 in the zone C, make this the value or amount of change per unit time of the current or torque of the servo motor 34 when assuming the reference state, and use this for comparison with the value or amount of change per unit time of the current or torque of the servo motor 34 in the zone C. The current and torque of the servo motor 34 may be recorded at any time so long as in the zone B, but in general, if right after entry into the zone B, the movable electrode 30 and the workpiece W have still not contacted each other, so it is suitable to record the current or torque of the servo motor 34 at this time and use this as the reference state. Note that, if providing a distance between the movable electrode 30 and welding workpiece W in advance before the start of operation, it is possible to lengthen the zone B and secure a sufficient preparatory operation zone, so it becomes possible to reliably record the current or torque of the servo motor 34 when the movable electrode 30 and the workpiece W do not contact. Further, in the zone B, when there is no increase in torque due to contact of the movable electrode 30 and workpiece W for a certain period, it is also possible to redetermine the reference state from the previous information. In particular, in this embodiment, the movable electrode 30 moves by the speed of movement Vg, so it is hard for the current or torque of the servo motor 34 in the zone B to become a constant value, so determination of this reference value state is important.

Figure 9:
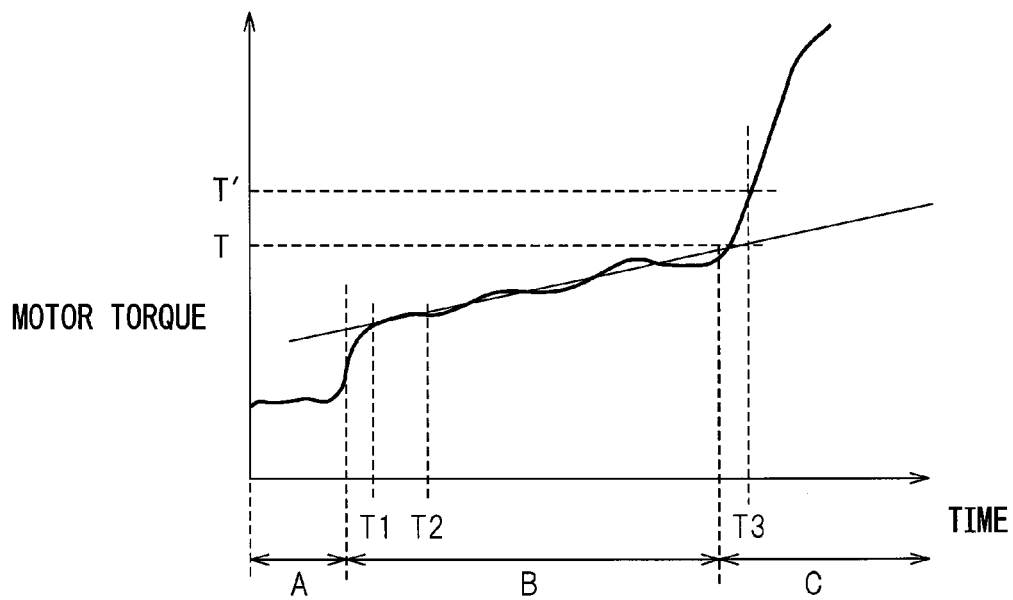
FIG. 9 is an explanatory view of a method for finding a point of change from a waveform of a torque of a servo motor when working the A1 or the A2-th embodiment of a method of detection of the welding workpiece position of the present invention.

Further, it is also possible to determine, by an estimate, the value of the current or torque of the servo motor 34 when assuming the reference state for comparison purposes from the value or amount of change per unit time of the current and torque of the servo motor 34 at the zone B. An example will be explained below with reference to torque. FIG. 9 is a graph showing, by time series, an example of change of the torque of the servo motor 34 when using the movable electrode 30 to detect the surface of the welding workpiece W. The meanings of the zone A to the zone C are similar to in FIG. 8. First, by monitoring the torque of the servo motor 34 from the time T1, which is the start of the zone B, to the time T2, it is understood that the torque of the servo motor 34 is increasing gradually when viewed overall at the zone B. It is possible to make this state the reference state and estimate the value of the torque of the servo motor 34 after the time T2 on when assuming the reference state from the amount of change per unit time at this time (that is, the amount of increase) and the value of the torque of the servo motor 34 at the time T2 by the linear approximation method. For example, it is possible to estimate the value of the torque T of the servo motor 34 at the time T3 after the time T2 when assuming the reference state. By comparing the torque T at the time T3 estimated assuming the reference state and the actually observed torque T' at the time T3, it is possible to judge if the torque of the servo motor 34 has changed to a trend of increase compared with the reference state.

In this way, even when making the movable electrode 30 move with respect to the counter electrode 32 by a low speed Vg while using the multiarticulated robot 12 to make the spot welding gun 14 move relatively in a direction making it approach the welding workpiece W, in the same way as the A1-th embodiment, the current and torque of the servo motor 34 for driving the movable electrode 30 change to trends of increase compared with the reference state when the movable electrode 30 contacts the welding workpiece W. Therefore, if monitoring the current or torque of the servo motor 34, it is possible to judge that the movable electrode 30 has contacted the welding workpiece W when the current or torque changes to a trend of increase compared with the reference state. Furthermore, it is possible to find the position data of the front end of the movable electrode 30 when it is judged that the movable electrode 30 has contacted the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has contacted the welding workpiece W. If deeming the found position data of the front end of the movable electrode 30 as the positional data of the surface of the welding workpiece W, it is possible to detect the position of the surface of the welding workpiece W.

The point of time when the current or torque of the servo motor 34 changes to a trend of increase compared with the reference state is identified in the same way as the three methods of analysis (i) to (iii) explained in the A1-th embodiment by analyzing the time-series curve, that is, waveform, of the current or torque of the servo motor 34 and finding the point where the value or amount of change per unit time of the current or torque increases (hereinafter referred to as "the point of change").

However, in the A2-th embodiment, the movable electrode 30 is made to move with respect to the counter electrode 32 at a low speed Vg, and the dynamic friction of the movable electrode drive mechanism causes fine fluctuation in the current or torque of the servo motor 34, so with the method of analysis (i), the threshold value α is set to a value larger than the amplitude of this fluctuation. Further, when the state before the movable electrode 30 contacts the welding workpiece W becomes a non-constant, changing state, it is sufficient to determine, by an estimate, the value of the current or torque of the servo motor 34 when assuming the reference state from the current or torque of the servo motor 34 recorded after the start of the relative movement between the spot welding gun 14 and welding workpiece W and before the contact of the movable electrode 30 and the welding workpiece W and use this as the reference value. For example, as shown in FIG. 9, it is possible to compare the torque T of the servo motor at the time T3 after the time T2 estimated, assuming the reference state, from the value of the torque of the servo motor 34 obtained at the time T1 and the time T2 by the linear approximation method and the torque T' actually observed at the time T3 and deem the point where the torque T' actually observed at the time T3 increases over the torque of the servo motor 34 at the time T3 estimated assuming the reference state by a threshold value α or more as the point of change.

With the method of analysis (ii), if the movable electrode 30 contacts the welding workpiece W as shown in FIG. 8A, the current or torque of the servo motor 34 monotonously increases, so the threshold value β may also be made a positive value. However, the movable electrode 30 is made to move with respect to the counter electrode 32 at a low speed Vg, so compared with the A1-th embodiment, the variation in the zone B is large. Therefore, it is necessary to make the threshold value β a larger value than the case of the A1-th embodiment. Further, when the state before the movable electrode 30 contacts the welding workpiece W becomes a nonconstant, changing state, in the same way as the case of the method of analysis (i), it is sufficient to determine, by an estimate, the amount of change per unit time of the current or torque of the servo motor 34 when assuming the reference state from the current or torque of the servo motor 34 recorded after the start of the relative movement between the spot welding gun 14 and welding workpiece W and before the contact of the movable electrode 30 and the welding workpiece W and use this as the amount of change per unit time of the current or torque of the servo motor 34 of the reference state. For example, as shown in FIG. 9, if assuming the reference state even at the time T3 after the time T2, the torque of the servo motor 34 at the time T3 can be estimated as becoming the same amount of change per unit time as the amount of change per unit time in the reference state found from the value of the torque of the servo motor 34 obtained at the time T1 and the time T2. Therefore, it is sufficient to compare the amount of change per unit time of the torque of the servo motor 34 estimated assuming the reference state and the actually observed amount of change per unit time of the servo motor 34 and deem the point where the actually observed amount of change per unit time of the servo motor 34 increases over the amount of change per unit time of the torque of the servo motor 34 estimated assuming the reference state by a threshold value β or more as the point of change.

Figure 10:
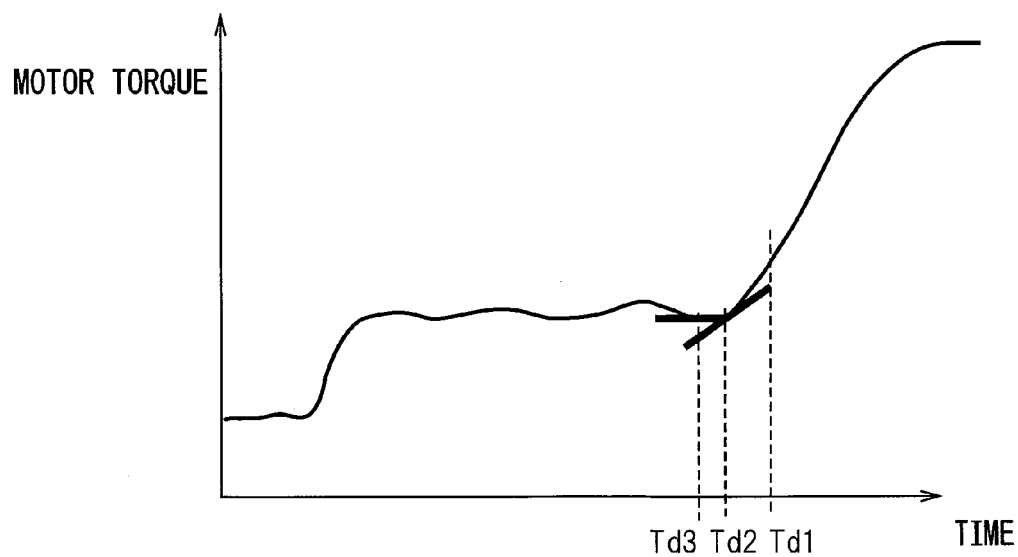
FIG. 10 is an explanatory view of another method for finding a point of change from a waveform of a torque of a servo motor when working the A1 or the A2-th embodiment of a method of detection of the welding workpiece position of the present invention.

The method of analysis (iii) is almost the same as the case of the A1-th embodiment. The method of (i) or (ii) is used, as shown in FIG. 10, to find the point of change of the current or torque of the servo motor 34, this is made the provisional point of change Td1, the time-series waveform of the current or torque is traced back along in time from the provisional point of change Td1 to find the amount of change per unit time of the current or torque of the servo motor 34 (that is, the slant of the time-series waveform of the current or torque), the point where the slant of the time-series waveform current or torque becomes substantially 0 is made the true point of change, and it is deemed that the current or torque of the servo motor 34 changes from a substantially constant state to an increase or changes from a gently changing state to a relatively sharply changing state at the true point of change. Note that, the time-series waveform of the current or torque of the servo motor 34 is a set of discrete sampling points, so there is not necessarily any point on the time-series waveform where the slant becomes 0. Therefore, in practice, it is possible to identify the point Td3 where the slant of the time-series waveform of the current or torque changes from a positive value to a negative value and define the sampling point right after that the true point of change Td2. Further, in the method of analysis (iii), the time-series waveform of the current or torque is traced back along in time from the state when the movable electrode 30 contacts the welding workpiece W to evaluate the slant of the current or torque, so like in the A2-th embodiment, even when using the servo motor 34 to drive the movable electrode 30 and perform a detection operation, it is possible to use the part of the time-series waveform where variation due to the dynamic friction of the movable electrode drive mechanism does not appear much at all as the time-series waveform of the current or torque of the servo motor 34 so as to evaluate the slant of the current or torque. Identification of the point where the slant of the time-series waveform of the current or torque becomes 0 or a negative value becomes easy.

If, like in the present embodiment, making the movable electrode 30 move with respect to the counter electrode 32 at the speed Vg while using the multiarticulated robot 12 to make the spot welding gun 14 move relatively in a direction making it approach the welding workpiece W, compared with the A1-th embodiment, the variation of the current or torque of the servo motor 34 will become slightly larger and detection of the contact of the movable electrode 30 and welding workpiece W will become slightly more difficult, but advantageous effects almost the same as the case of the A1-th embodiment are obtained. Furthermore, as explained above, it is possible to eliminate the insensitive zone due to the static friction in the movable electrode drive mechanism, so when the movable electrode 30 contacts the welding workpiece W, immediately the current or torque of the servo motor 34 changes from a substantially constant state or a gently changing state to a relatively rapidly increasing state. Therefore, the method of this embodiment is effective when the static friction of the movable electrode drive mechanism is large and the detrimental effect due to the existence of the insensitive zone exceeds the effect due to elimination of the variation of the current or torque of the servo motor 34 due to the dynamic friction of the movable electrode drive mechanism. The rest of the points are similar to the A1-th embodiment, so here the explanation will be omitted.

Embodiment A3

Figure 11:
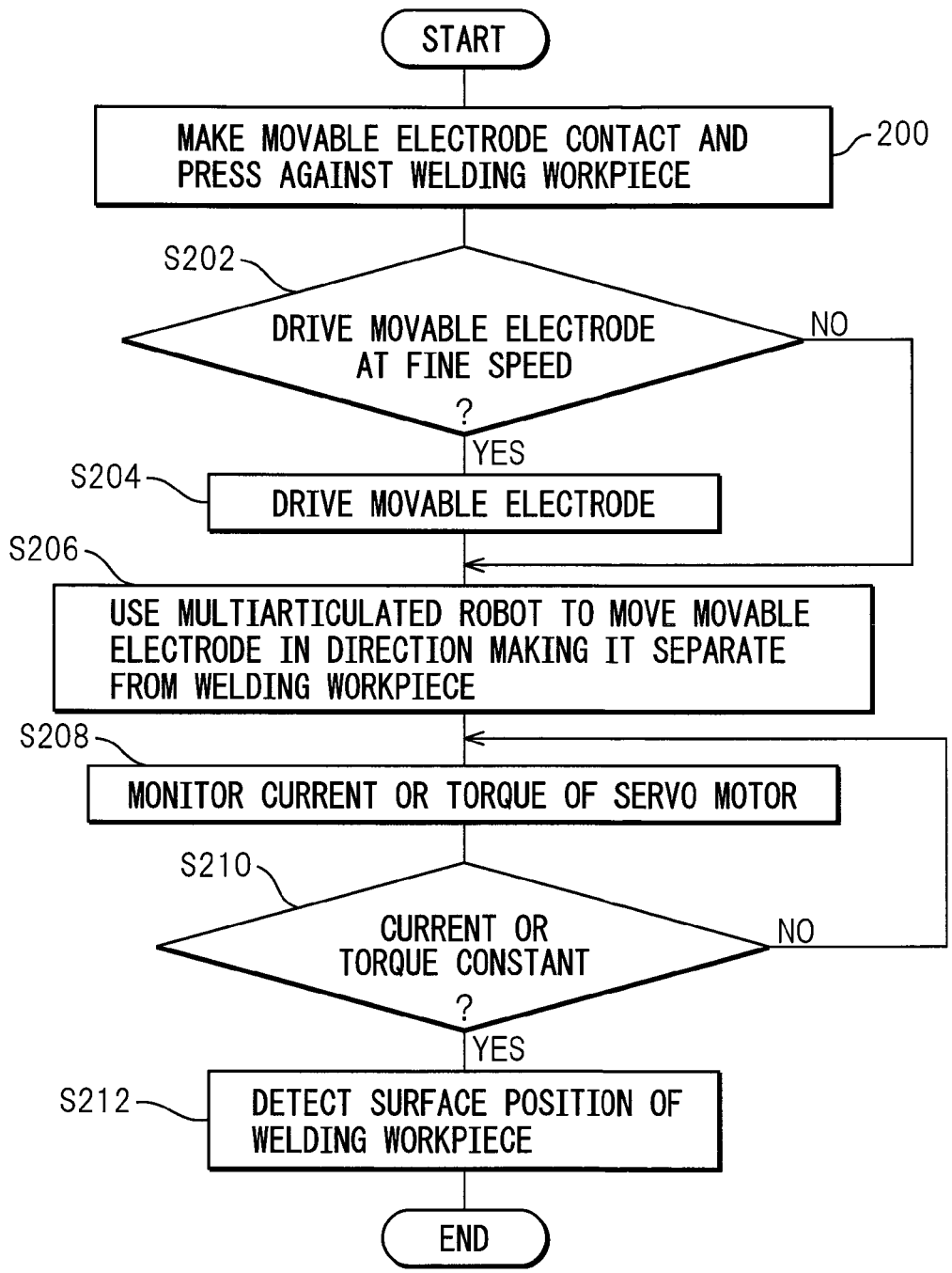
FIG. 11 is a flowchart of a method of making a movable electrode of a spot welding gun separate from a welding workpiece so as to detect the surface position of the welding workpiece.

Referring to FIG. 11, an A3-th embodiment of a method of detection of the welding workpiece position of the present invention will be explained. In the A3-th embodiment, in the spot welding system 10 shown in FIG. 1, the speed Vg by which the servo motor 34 drives the movable electrode is made "0" to make the movable electrode 30 stationary with respect to counter electrode 32 and, in that state, the multiarticulated robot 12 is used to hold the spot welding gun 14 and make it move relative to the welding workpiece W fixed to the workpiece table (not shown) at a speed Vr. Further, the servo motor 34 for driving the movable electrode 30 is set with a torque limit. The torque will therefore not increase above a constant value. To suppress deformation of the welding workpiece W due to pressing by the movable electrode 30, the torque limit is preferably set to as low a value as possible.

In this embodiment, first, the welding workpiece W is made to move between the movable electrode 30 and the counter electrode 32 of the spot welding gun 14, then the spot welding gun 14 is positioned at the welding location (strike position) on the welding workpiece W so as to contact and press against the movable electrode 30 to an extent by which the welding workpiece W is accompanied with some elastic deformation (step S200). Note that, at this time, it is preferable to press the movable electrode 30 against the welding workpiece W by exactly a sufficient distance and secure a preparatory operation zone for until the movable electrode 30 separates from the welding workpiece.

Then, at step S202, no driving of the movable electrode 30 is selected, the movable electrode 30 is kept stationary with respect to the counter electrode 32, and, as shown in FIG. 4, the multiarticulated robot 12 is driven to make the spot welding gun 14 move relative to the welding workpiece W, whereupon the movable electrode 30 is made to move in a direction separating from the welding workpiece W from a state when the movable electrode 30 and the welding workpiece W contact (step S206). Simultaneously, the current or torque of the servo motor 34 for driving the movable electrode 30 is monitored (step S208). At this time, the information of the current or torque of the servo motor 34 and the position data of the front end of the wrist element 28 of the multiarticulated robot 12 and the relative position data of the movable electrode 30 with respect to the counter electrode 32 are successively recorded. Furthermore, in accordance with need, as the value or amount of change per unit time of the current or torque of the servo motor 33 of a comparison-use reference state (that is, state when pressed), the value or amount of change per unit time of the current or torque of the servo motor 34 when assuming that the current or torque of the servo motor 34 has the same trend of change as the preparatory operation zone is determined from the current or torque of the servo motor 34 successively recorded in the preparatory operation zone after the start of the relative movement between the spot welding gun 14 and welding workpiece W and before separation of the movable electrode 30 and the welding workpiece W. Note that, reference state is the state when the spot welding gun 14 and welding workpiece W start relative movement and the current or torque of the servo motor 34 is monotonically decreasing. In the preparatory operation zone, the current or torque of the servo motor 34 for determining the value or amount of change per unit time of the current or torque of the reference state is recorded while the current or torque of the servo motor 34 is monotonically decreasing.

If using the multiarticulated robot 12 to make the movable electrode 30 move in a direction separating from the welding workpiece W, the amount of elastic deformation of the welding workpiece W due to the movable electrode 30 decreases and the reaction force acting from the welding workpiece W to the movable electrode 30 also decreases. As a result, the force for maintaining the movable electrode 30 in a state stationary with respect to the counter electrode 32 decreases, so the torque of the servo motor 34 decreases and the current also decreases. Furthermore, if the movable electrode 30 is made to move by the multiarticulated robot 12, and the movable electrode 30 completely separates from the welding workpiece W, the elastic deformation of the welding workpiece W due to the pressing force of the movable electrode 30 is eliminated, the reaction force acting from the welding workpiece W to the movable electrode 30 is eliminated, and the decrease in the torque and current of the servo motor 34 stops. Utilizing this, the current or torque of the servo motor 34 is successively checked (step S210), and it is judged that the movable electrode 30 has completely separated from the welding workpiece W when the current or torque of the servo motor 34 changes to a trend of increase compared with a predetermined reference state. Note that, "changes to a trend of increase compared with a . . . reference state" means when the actual value or amount of change per unit time of the current or torque of the servo motor 34 becomes larger than the value or amount of change per unit time of the current or torque of the servo motor 34 in the case of assuming the reference state (in this case, when the current or torque of the servo motor 34 changes from a decrease to a substantially constant state or a gentle increase or when the amount of decrease per unit time of the current or torque of the servo motor 34 becomes small (hereinafter, together described as "when the trend of decrease ends")). The method of judgment will be explained later. If judging that the movable electrode 30 has completely separated from the welding workpiece W, the method stops the operation of the multiarticulated robot 12. It detects the position of the surface of the welding workpiece W based on the position data of the front end of the wrist element 28 of the multiarticulated robot 12 and the relative position data of the movable electrode 30 with respect to the counter electrode 32 in the spot welding gun 14 when judging that the movable electrode 30 has completely separated from the welding workpiece W and ends the process of detection of the surface position of the welding workpiece W (step 212).

Figure 12:
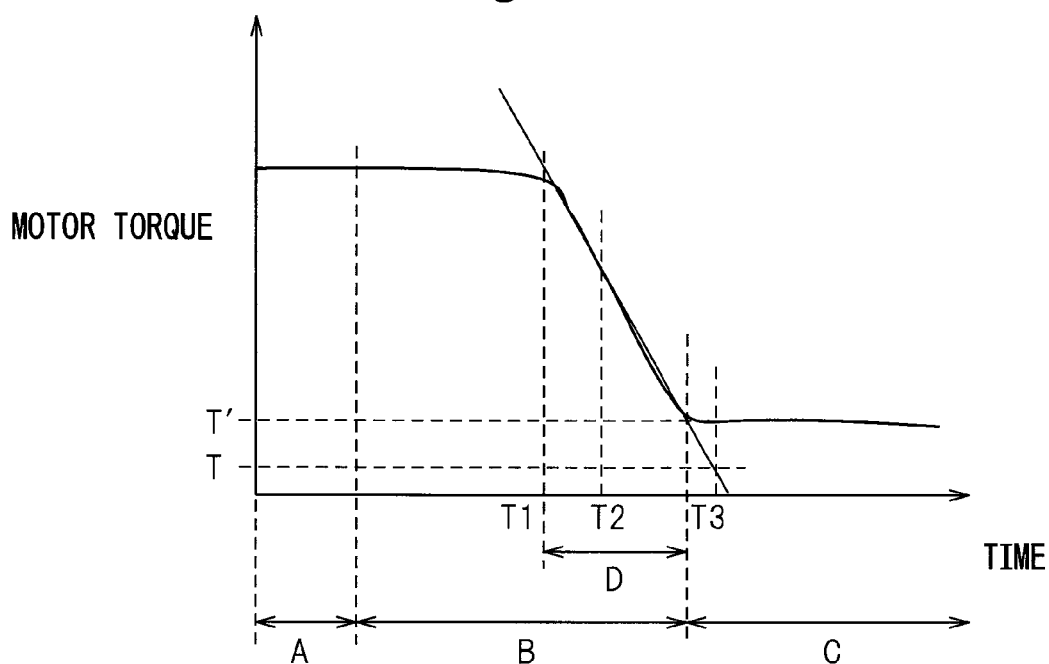
FIG. 12 is a graph showing changes along with time of a motor torque when working an A3-th embodiment of a method of detection of the welding workpiece position of the present invention.

FIG. 12 is a graph showing by a time series the change in the torque of the servo motor 34 when using the movable electrode 30 to detect the surface of the welding workpiece W according to the present embodiment. In FIG. 12, the zone A shows the state when the movable electrode 30 contacts the welding workpiece W, but no detection operation is being performed, the zone B shows the state during the detection operation when the movable electrode 30 contacts the welding workpiece W, the zone C shows the state during the detection operation when the movable electrode 30 has completely separated from the welding workpiece W (that is, is isolated from it), and the zone D shows the state when the detection operation has caused the movable electrode 30 to gradually separate from the welding workpiece W and thereby the reaction force from the welding workpiece W to the movable electrode 30 has been eliminated and the torque of the servo motor 34 for driving the movable electrode 30 falls. The part of the zone B other than the zone D shows the state when the reaction force from the welding workpiece W to the movable electrode 30 is eliminated, but the decrease in the reaction force due to the static friction of the movable electrode drive mechanism is not transmitted to the servo motor 34. In the present embodiment as well, vibration of the multiarticulated robot 12 etc. causes fine variation in the current or torque of the servo motor 34, but FIG. 12, for simplification of the explanation, is drawn omitting this variation.

In this embodiment, in the initial state, the reaction force due to the elastic deformation of the welding workpiece W acts from the welding workpiece W to the movable electrode 30 and therefore a torque is generated in the servo motor 34 for maintaining a state when the movable electrode 30 is stationary. On the contrary, the servo motor 34 is set with a torque limit. Further, the movable electrode 30 is stationary with respect to the counter electrode 32, and the movable electrode 30 is not driven by the servo motor 34, so no dynamic friction is caused at the movable electrode drive mechanism, but an insensitive zone is formed due to the static friction of the movable electrode drive mechanism. For this reason, the current and torque of the servo motor 34 at the zone A before the detection operation and the start of the zone B after the start of the detection operation become substantially constant states. No particularly rapid fluctuations appear. On the contrary, due to the movement of the spot welding gun 14 due to the multiarticulated robot 12, the movable electrode 30 is made to move in a direction separating from the welding workpiece W, the reaction force acting from the welding workpiece W to the movable electrode 30 is gradually eliminated, and, as in the zone D, depending on the servo motor 34, the torque of the servo motor 34 monotonically decreases and the current also decreases. Furthermore, the multiarticulated robot 12 is used to make the movable electrode 30 move in a direction separating from the welding workpiece W. At the zone C, if the movable electrode 30 completely separates from the welding workpiece W, elastic deformation of the welding workpiece W is eliminated and the reaction force due to the elastic deformation no longer acts from the welding workpiece W to the movable electrode 30, so the decrease in the torque and current of the servo motor 34 also stops.

By recording the current or torque of the servo motor 34 in the zone D, it is possible to determine the value or amount of change per unit time of the current or torque of the servo motor 34 when assuming the reference state from the amount of change per unit time of the current or torque of the servo motor 34 in the zone D. This may be used for comparison with the value or amount of change per unit time of the current or torque of the servo motor 34 in the zone C. Further, if pressing the movable electrode 30 against the welding workpiece W by exactly a sufficient distance before the start of operation, the zone B can be lengthened and a sufficient preparatory operation zone can be secured, so it becomes possible to reliably record the current or torque of the servo motor 34 when the movable electrode 30 contacts the welding workpiece W.

In this way, if making the movable electrode 30 stationary with respect to the counter electrode 32 and in that state using the multiarticulated robot 12 to make the spot welding gun 14 move relatively in a direction separating from the welding workpiece W, the current and torque of the servo motor 34 for driving the movable electrode 30 when the movable electrode 30 has completely separated from the welding workpiece W changes to a trend of increase compared with the reference state. Therefore, if monitoring the current or torque of the servo motor 34, it can be judged that the movable electrode 30 has completely separated from the welding workpiece W (become isolated from it) when the current or torque changes to a trend of increase compared with the reference state. Furthermore, it is possible to find the position data of the front end of the movable electrode 30 when it is judged that the movable electrode 30 has completely separated from the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has completely separated from the welding workpiece W. If deeming the found position data of the front end of the movable electrode 30 as the positional data of the surface of the welding workpiece W, it is possible to detect the position of the surface of the welding workpiece W.

The point of time when the current or torque of the servo motor 34 changes to a trend of increase compared with a predetermined reference state is identified by analyzing the time-series curve, that is, waveform, of the current or torque of the servo motor 34 and finding the point where the trend of decrease of the current or torque ends (hereinafter referred to as the "point of change"). The following four examples of the method of analysis of the waveform of the current or torque for finding the point of change may be mentioned.

(i) If the movable electrode 30 moves in a direction separating from the welding workpiece W, as shown in FIG. 12, the current or torque of the servo motor 34 will monotonically decrease and, when the movable electrode 30 completely separates from the welding workpiece W, the decrease in the current or torque of the servo motor 34 will end and a substantially constant state will result. Therefore, the point where the amount of change per unit time of the current or torque of the servo motor 34, that is, the slant of the waveform of the current or torque of the servo motor 34, becomes a negative value and exhibits a trend of decrease, then the slant of the waveform becomes 0 or a positive value is deemed the point of change.

(ii) If the movable electrode 30 moves in a direction separating from the welding workpiece W, as shown in FIG. 12, the current or torque of the servo motor 34 monotonically decreases. If the movable electrode 30 completely separates from the welding workpiece W, the amount of change per unit time of the current or torque of the servo motor 34 increases compared with the time of monotonic decrease of the reference state and the trend of decrease ends. Therefore, the amount of change per unit time of the current or torque of the servo motor 34 when assuming the reference state is determined from the value of the current or torque of the servo motor 34 observed at the time of monotonic decrease in the reference state, the actually observed amount of change per unit time of the current or torque of the servo motor 34 and the amount of change per unit time of the current or torque of the servo motor 34 when assuming the reference state are compared, and, if the former increases over the latter by a predetermined threshold value or more, it is judged that the trend of decrease has ended and that is deemed the point of change. For example, as shown in FIG. 12, if assuming the reference state even at the time T3 after the time T2, the torque of the servo motor 34 at the time T3 can be estimated to become the same amount of change per unit time as the amount of change per unit time found from the value of the torque of the servo motor 34 observed at the time T1 and the time T2 of the time of monotonic decrease. Therefore, the time when the actually observed amount of change per unit time of the torque of the servo motor 34 increases over the amount of change per unit time of the torque of the servo motor 34 at the time of monotonic decrease of the reference state by a predetermined threshold value or more may be deemed the point of change.

(iii) As explained above, if the movable electrode 30 moves in a direction separating from the welding workpiece W, as shown in FIG. 12, the current or torque of the servo motor 34 monotonically decreases. If the movable electrode 30 completely separates from the welding workpiece W, the amount of change per unit time of the current or torque of the servo motor 34 increases compared with the time of monotonic decrease of the reference state and the trend of decrease ends. In other words, the actually observed value of the current or torque of the servo motor 34 also increases over the value of the current or torque of the servo motor 34 when assuming the reference state. Therefore, the value of the current or torque of the servo motor 34 when assuming the reference state is determined by an estimate from the value of the current or torque of the servo motor 34 observed at the time of monotonic decrease of the reference state, the actually observed the value of the current or torque of the servo motor 34 and the value of the current or torque of the servo motor 34 determined by estimate when assuming the reference state are compared, it is judged that the trend of decrease has ended if the former increases from the latter by a predetermined threshold value or more, and this is deemed the point of change. For example, as shown in FIG. 12, the value T of the torque of the servo motor 34 at the time T3 after the time T2 when assuming the reference state can be estimated from the monotonically decreasing amount of change per unit time of the torque of the servo motor 34 between the time T1 and the time T2 of the monotonically decreasing zone D and the value of the torque of the servo motor 34 at the time T2. The time when the value T' of the torque of the actually observed torque of the servo motor 34 increases over the value T of the torque of the servo motor 34 determined by estimate assuming the reference state by a predetermined threshold value or more may be deemed the point of change.

Figure 13:
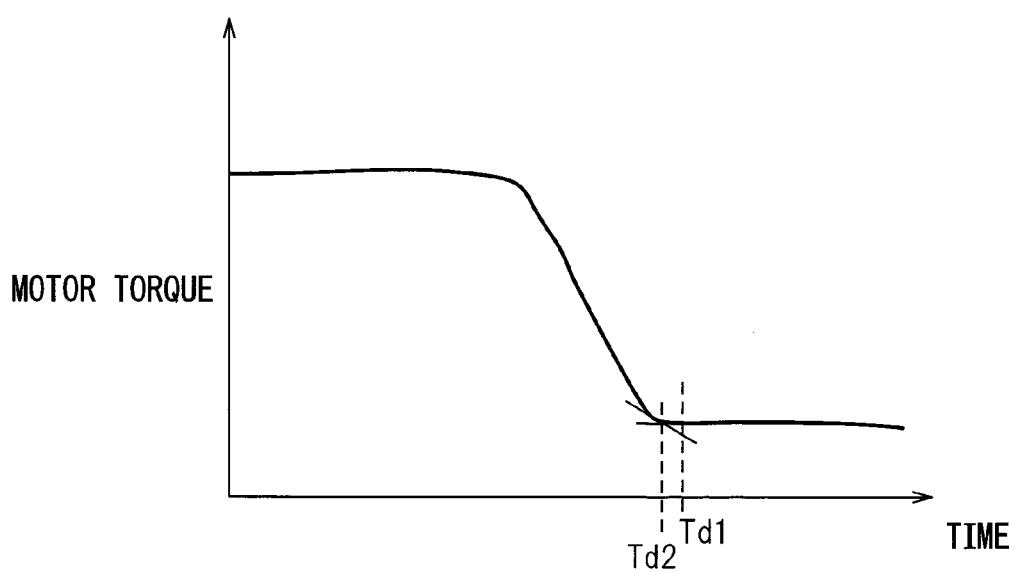
FIG. 13 is an explanatory view of a method of finding a point of change analytically from a waveform of a torque of a servo motor when working an A3-th embodiment of a method of detection of the welding workpiece position of the present invention.

(iv) If the movable electrode 30 moves in direction separating from the welding workpiece W, as shown in FIG. 12, the current or torque of the servo motor 34 monotonically decreases. If the movable electrode 30 completely separates from the welding workpiece W, the trend of decrease ends, that is, the amount of change per unit time becomes 0 or positive. Therefore, first, the method of (ii) or (iii) is used to find the point of change of the current or torque of the servo motor 34, this is made the provisional point of change, and the time-series waveform of the current or torque of the servo motor 34 is traced back along in time from the provisional point of change to find the amount of change per unit time of the servo motor 34 (that is, the slant of the time-series waveform of the current or torque). Further, the point where the slant of the waveform of the current or torque of the servo motor 34 changes to negative is made the true point of change and it is deemed that the trend of decrease of the current or torque of the servo motor 34 has ended at the true point of change. In FIG. 13, Td1 indicates the provisional point of change found by the method of analysis (ii) or (iii), while Td2 indicates the true point of change found by tracing back along in time the time-series waveform of the torque of the servo motor 34. Alternatively, further, it is possible to find the slant of the time-series waveform of the current or torque of the servo motor 34 at the point near the provisional point of change, make this the reference slant (after the movable electrode 30 has separated from the welding workpiece W), similarly trace back along in time the time-series waveform of the current or torque of the servo motor 34 from the provisional point of change to find the slant of the time-series waveform of the current or torque of the servo motor 34, make the point where the difference of the found slant of the time-series waveform of the current or torque of the servo motor 34 from the reference slant exceeds a predetermined allowable value the true point of change, and deem that the trend of decrease of the current or torque ended at this true point of change. Note that, in the latter case, if using the method of analysis (ii) for finding the provisional point of change, between the predetermined threshold value for finding the provisional point of change and the predetermined allowable value for finding the true point of change, preferably the former is made larger and the latter is made smaller. Due to this, it is possible to first roughly identify the provisional point of change, then identify in detail the true point of change.

When, like in the present embodiment, the movable electrode 30 is made stationary with respect to the counter electrode 32, the movable electrode 30 is not driven by the servo motor 34 and dynamic friction is not generated at the movable electrode drive mechanism, so almost no fluctuation of the current or torque of the servo motor 34 occurs and judgment of the point of time when the trend of decrease of the current or torque of the servo motor 34 ends becomes easy. Therefore, it is possible to accurately identify the point of time when the movable electrode 30 has completely separated from the welding workpiece W and possible to more accurately detect the surface position of the welding workpiece W.

Further, the surface position of the welding workpiece W is detected from the position of the movable electrode 30 at the time when the movable electrode 30 has completely separated from the welding workpiece W, so the welding workpiece W is not accompanied with elastic deformation due to the movable electrode 30 and the surface position of the welding workpiece W can be accurately detected.

Furthermore, in this embodiment, if it is judged that the movable electrode 30 has completely separated from the welding workpiece W, the robot control device 16 makes the operation of the multiarticulated robot 12 stop and detects the position of the surface of the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has completely separated from the welding workpiece W. However, even after it is judged that the movable electrode 30 and the welding workpiece W have completely separated, sometimes the multiarticulated robot 12 will end up running on inertia and the position of the front end of the wrist element 28 of the multiarticulated robot 12 when making the operation of the multiarticulated robot 12 stop and the position of the front end of the wrist element 28 of the multiarticulated robot 12 when judging that the movable electrode 30 and the welding workpiece W have completely separated will end up differing. Therefore, when positioning of the movable electrode 30 of the spot welding gun 14 is the final object, to correct this continued running of the multiarticulated robot 12, the multiarticulated robot 12 may be made to move to the position when it is judged that the movable electrode 30 has completely separated from the welding workpiece W.

Embodiment A4

In the A4-th embodiment, in a spot welding system 10 shown in FIG. 1, the speed Vg by which the servo motor 34 drives the movable electrode 30 is not 0 and the servo motor 34 is used to make the movable electrode 30 move while the multiarticulated robot 12 is used to hold the spot welding gun 14 and make it move relative to the welding workpiece W fixed to the workpiece table (not shown) by a speed Vr. The embodiment differs in this point from the A3-th embodiment. The rest of the points are similar to the A3-th embodiment. Therefore, here, the different parts will basically be explained and explanations of similar parts will be omitted.

In the A3-th embodiment, the speed Vg by which the servo motor 34 drives the movable electrode 30 is made "0" to make the movable electrode 30 stationary with respect to the counter electrode 32, so there is the advantage that almost no fluctuation of the current or torque of the servo motor 34 due to the dynamic friction of the movable electrode drive mechanism occurs and the point of time when the trend of decrease of the current or torque of the servo motor 34 ends when the movable electrode 30 completely separates from the welding workpiece W can be easily detected. On the contrary, the movable electrode 30 is stationary with respect to the counter electrode 32, so an insensitive zone is formed due to the static friction in the movable electrode drive mechanism, loss of the reaction force transmitted from the welding workpiece W to the servo motor 34 occurs, and the current or torque of the servo motor 34 no longer changes before the movable electrode 34 completely separates from the welding workpiece W and the reaction force no longer acts from the welding workpiece W to the movable electrode 30. As a result, the possibility arises of the point of time when the movable electrode 30 has completely separated from the welding workpiece W being erroneously detected. Therefore, when the static friction of the movable electrode drive mechanism is small, the effect due to the elimination of the variation of the current or torque of the servo motor 34 arising due to the dynamic friction of the movable electrode drive mechanism overcomes the detrimental effect due to the existence of the insensitive zone, but when the static friction of the movable electrode drive mechanism is large, the detrimental effect due to the existence of the insensitive zone ends up exceeding the effect caused by the elimination of the variation of the current or torque of the servo motor 34 caused by the dynamic friction of the movable electrode drive mechanism.

Therefore, in the A4-th embodiment, the servo motor 34 is used to make the movable electrode 30 move with respect to the counter electrode 32 by a low speed Vg (≠0) so as to eliminate such an insensitive zone and enable application even in cases of a large static friction of the movable electrode drive mechanism. In practice, it is sufficient to try out both methods of the A3-th embodiment and the A4-th embodiment and employ the one with the higher detection precision. Further, it is also possible to measure the effects of static friction in advance and determine the method to employ by the extent of the effects.

Note that, if the speed Vg by which the servo motor 34 is used to make the movable electrode 30 move with respect to the counter electrode 32 is too high, the dynamic friction of the movable electrode drive mechanism causes variation in the current or torque of the servo motor 34 and has a detrimental effect on the precision of detection of the surface position of the welding workpiece W, while if it is too low, the static friction of the movable electrode drive mechanism is no longer sufficiently removed. Therefore, the speed Vg by which the servo motor 34 is used to make the movable electrode 30 move with respect to the counter electrode 32 is preferably made an extremely low speed which eliminates the static friction while suppressing to a minimum extent the variation of the current or torque of the servo motor 34 due to dynamic friction.

Referring to FIG. 11, the procedure of a method of detection of the welding workpiece position according to the A4-th embodiment will be explained. First, in the same way as the A3-th embodiment, the welding workpiece W is made to move to between the movable electrode 30 and the counter electrode 32 of the spot welding gun 14, and the spot welding gun 14 is positioned at a position so as to contact the welding location (strike position) on the workpiece W and press it to an extent where the welding workpiece W is accompanied with some elastic deformation (step S200). Note that, at this time, it is preferable to press the movable electrode 30 against the welding workpiece W by exactly a sufficient distance to secure a preparatory operation zone up to when the movable electrode 30 separates from the welding workpiece W.

Then, at step S202, driving of the movable electrode 30 is selected and the servo motor 34 is used to drive the movable electrode 30 by a fine speed Vg (step S204). The speed Vg by which the servo motor 34 is used to make the movable electrode 30 move with respect to the counter electrode 32, as explained above, is made an extremely low speed eliminating the static friction while keeping the fluctuation of the current or torque of the servo motor 34 due to the dynamic friction to a minimum extent. Further, the movable electrode tip 30 is made to move with respect to the counter electrode 32 for the purpose of eliminating the effects of the static friction of the movable electrode drive mechanism, so the movement of the movable electrode 30 with respect to the counter electrode 32 may be performed in the opening direction or closing direction or by repeated opening and closing. Note that, when making the movable electrode 30 move in a direction making it approach the counter electrode 32, that is, when making the movable electrode 30 move toward the welding workpiece W, the multiarticulated robot 12 has to make the spot welding gun 14 move by a speed Vr of at least the speed of movement Vg of the movable electrode 30 with respect to the counter electrode 32 in a direction separating from the welding workpiece W.

Then, while making the movable electrode 30 move with respect to the counter electrode 32 at the speed Vg while, as shown in FIG. 4, driving the multiarticulated robot 12 to make the spot welding gun 14 move relative to the welding workpiece W at the speed Vr, the movable electrode 30 is made to move in a direction separating from the welding workpiece W from a state when the movable electrode 30 and counter electrode 32 contact each other (step S206) and, simultaneously, the current or torque of the servo motor 34 for driving the movable electrode 30 is monitored (step S208). At this time, the information of the current or torque of the servo motor 34 and the position data of the front end of the wrist element 28 of the multiarticulated robot 12 and the relative position data of the movable electrode 30 with respect to the counter electrode 32 are successively recorded for each sampling time. Furthermore, in accordance with need, as the value or amount of change per unit time of the current or torque of the servo motor 34 of a reference state for comparison use (that is, a pressing state), the value or amount of change per unit time of the current or torque of the servo motor 34 when assuming the current or torque of the servo motor 34 has the same trend of change as in a preparatory operation zone is determined from the current or torque of the servo motor 34 successively recorded in a preparatory operation zone after the start of the relative movement between the spot welding gun 14 and welding workpiece W and before separation of the movable electrode 30 from the welding workpiece W. Note that, the reference state is made the state when the spot welding gun 14 and welding workpiece W have started relative movement and the current or torque of the servo motor 34 is monotonically decreasing. In the preparatory operation zone, the current or torque of the servo motor 34 for determining the value or amount of change per unit time of the current or torque of the reference state is recorded while the current or torque of the servo motor 34 is monotonically decreasing.

Further, the fluctuation of the current or torque of the servo motor 34 is successively checked (step S210) and, when the current or torque of the servo motor 34 changes to a trend of increase compared with the predetermined reference state, it is judged that movable electrode 30 has completely separated from the welding workpiece W. Note that, "changes to a trend of increase compared with a . . . reference state" means when the actual value or amount of change per unit time of the current or torque of the servo motor 34 increases over the value or amount of change per unit time of the current or torque of the servo motor 34 in the case of assuming the reference state (in this case, when the current or torque of the servo motor 34 changes from a decrease to a substantially constant state or a gentle increase or when the amount of decrease per unit time of the current or torque of the servo motor 34 becomes small (hereinafter, together described as when the trend of decrease ends)). The method of judgment will be explained later. When judging that the movable electrode 30 has completely separated from the welding workpiece W, the operation of the multiarticulated robot 12 is made to stop, the position of the surface of the welding workpiece W is detected based on the position data of the front end of the wrist element 28 of the multiarticulated robot 12 and the relative position data of the movable electrode 30 with respect to the counter electrode 32 in the spot welding gun 14 when it is judged that the movable electrode 30 has completely separated from the welding workpiece W, and the process of detection of the surface position of the welding workpiece W is ended (step S212).

Figure 14:
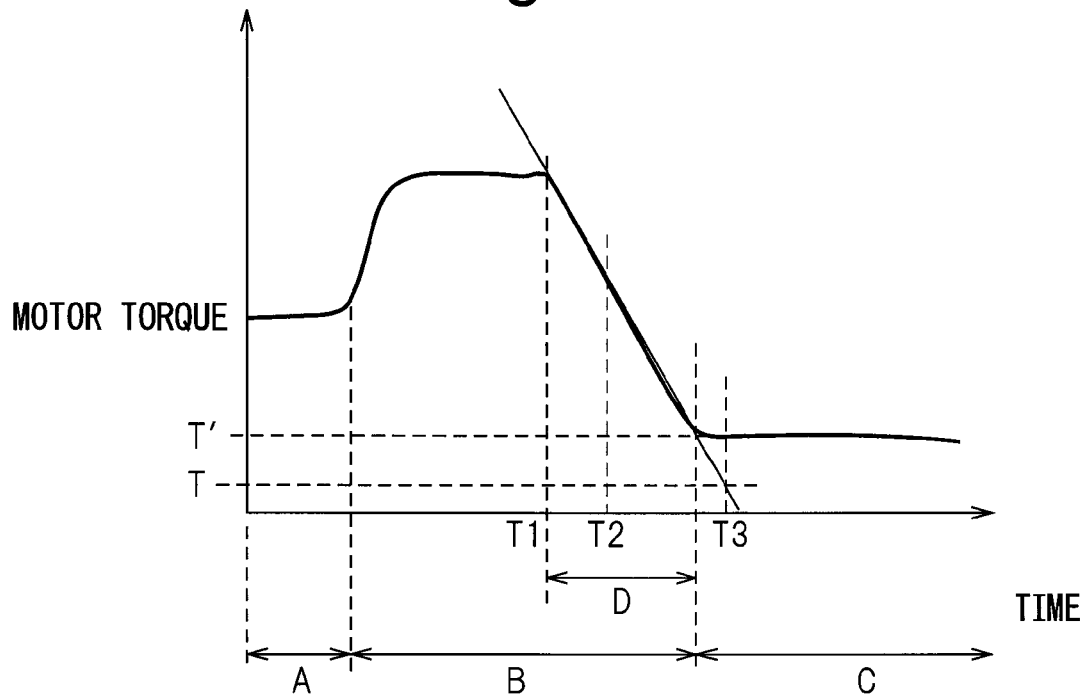
FIG. 14 is a graph showing changes along with time of a motor torque when working an A4-th embodiment of a method of detection of the welding workpiece position of the present invention.

FIG. 14 is a graph showing by a time series the change in the torque of the servo motor 34 when using the movable electrode 30 to detect the surface of the welding workpiece W according to the present embodiment. In FIG. 14, the zone A shows the state when the movable electrode 30 contacts the welding workpiece W, but no detection operation is being performed, the zone B shows the state during the detection operation when the movable electrode 30 contacts the welding workpiece W, the zone C shows the state during the detection operation when the movable electrode 30 has completely separated from the welding workpiece W (that is, is isolated from it), and the zone D shows the state when the detection operation has caused the movable electrode 30 to gradually separate from the welding workpiece W and thereby the reaction force from the welding workpiece W to the movable electrode 30 has been eliminated and the torque of the servo motor 34 for driving the movable electrode 30 falls. In the present embodiment as well, fine variation of the current or torque of the servo motor 34 due to vibration of the multiarticulated robot 12 etc. occurs, but FIG. 14, for simplification of the explanation, is drawn omitting the variation.

In this embodiment, during the detection operation, the movable electrode 30 moves with respect to the counter electrode 32 by the speed Vg, so in the zone B, if starting the drive of the movable electrode 30, the current or torque of the servo motor 34 increases until the speed of the movable electrode 30 reaches a predetermined speed Vg. When the speed of the movable electrode 30 reaches Vg, the servo motor 34 no longer requires torque for acceleration, so the current and torque of the servo motor 34 become substantially constant. On the contrary, due to the movement of the spot welding gun 14 by the multiarticulated robot 12, the movable electrode 30 is made to move in a direction separating from the welding workpiece W, the reaction force acting from the welding workpiece W to the movable electrode 32 is gradually eliminated, and, as in the zone D, the torque of the servo motor 34 monotonically decreases and the current also decreases. Furthermore, if the multiarticulated robot 12 is used to make the movable electrode 30 move in a direction separating from the welding workpiece W and, in the zone C, the movable electrode 30 completely separates from the welding workpiece W, the elastic deformation of the welding workpiece W is eliminated and the reaction force due to the elastic deformation no longer acts on the movable electrode 30, so the decrease of the torque and current of the servo motor 34 also stops.

By recording the current or torque of the servo motor 34 at the zone D, it becomes possible to determine the value or amount of change per unit time of the current or torque of the servo motor 34 when assuming the reference state from the amount of change per unit time of the current or torque of the servo motor 34 at the zone D and use this for comparison with the value or amount of change per unit time of the current or torque of the servo motor 34 at the zone C. Further, if pressing the movable electrode 30 against the welding workpiece W by exactly a sufficient distance before the start of operation, it is possible to lengthen the zone B and secure a sufficient preparatory operation zone, so it becomes possible to reliably record the current or torque of the servo motor 34 when the movable electrode 30 contacts the welding workpiece W.

In this way, even when making the movable electrode 30 move with respect to the counter electrode 32 at a low speed Vg while using the multiarticulated robot 12 to make the spot welding gun 14 move relatively in a direction separating from the welding workpiece W, in the same way as the A3-th embodiment, the current or torque of the servo motor 34 for driving the movable electrode 30 changes to a trend of increase compared with the reference state when the movable electrode 30 has completely separated from the welding workpiece W. Therefore, if monitoring the current or torque of the servo motor 34, it is possible to judge that the movable electrode 30 has completely separated from the welding workpiece W when the current or torque changes to a trend of increase compared with a reference state. Furthermore, it is possible to find the position data of the front end of the movable electrode 30 when the movable electrode 30 has completely separated from the welding workpiece W from the position data of the front end of the wrist element 28 of the multiarticulated robot 12 and the relative position data of the movable electrode 30 with respect to the counter electrode 32 in the spot welding gun 14 when the movable electrode 30 has completely separated from the welding workpiece W. If deeming the position data of the front end of the movable electrode 30 as the positional data of the surface of the welding workpiece W, it is possible to detect the position of the surface of the welding workpiece W.

The point of time when the current or torque of the servo motor 34 changes to a trend of increase compared with a predetermined reference state, in the same way as the four methods of analysis (i) to (iv) explained in the A3-th embodiment, is identified by analyzing the time-series curve, that is, the waveform, of the current or torque of the servo motor 34 and finding the point where the trend of decrease of the current or torque ends (hereinafter referred to as "the point of change"). The examples of the method of analysis of the waveform of the current or torque for finding the point of change are the same as the A3-th embodiment, so the explanation will be omitted here. Note that, in this embodiment, during the detection operation, the movable electrode 30 moves with respect to the counter electrode 30 at the speed Vg, so after the movable electrode 30 separates from the welding workpiece W, the current or torque of the servo motor 34 sometimes gradually changes due to the mechanical resistance of the spot welding gun 14 (for example, the elastic deformation of the conductive parts connecting the movable electrode drive mechanism and the welding transformer (not shown)). In this way, if, after the movable electrode 30 separates from the welding workpiece W, the current or torque of the servo motor 34 gradually decreases, sometimes the current or torque of the servo motor 34 does not enter a constant state or does not increase, so with the method of analysis (i), the point of change is difficult to find. In such a case, it is effective to employ the methods of analysis (ii) to (iv).

If, like in the present embodiment, making the movable electrode 30 move with respect to the counter electrode 32 at the speed Vg while using the multiarticulated robot 12 to make the spot welding gun 14 move relatively in a direction separating from the welding workpiece W, the fluctuation of the current or torque of the servo motor 34 becomes slightly larger compared with the A3-th embodiment and detection of contact of the movable electrode 30 and the welding workpiece W becomes slightly more difficult, but substantially the same advantageous effects can be obtained as the case of the A3-th embodiment. Furthermore, as explained above, the insensitive zone due to the static friction in the movable electrode drive mechanism can be eliminated and it is possible to prevent the current or torque of the servo motor 34 from no longer changing before the movable electrode 34 completely separates from the welding workpiece W and the reaction force no longer acts from the welding workpiece W to the movable electrode 30 and possible to reduce the possibility of erroneous detection that movable electrode 30 has completely separated from the welding workpiece W. Therefore, the method of the present embodiment becomes effective when the static friction of the movable electrode drive mechanism is large and the detrimental effect due to the existence of the insensitive zone exceeds the effect caused by the elimination of variation of the current or torque of the servo motor 34 arising due to the dynamic friction of the movable electrode drive mechanism. The rest of the points are similar to the A3-th embodiment, so the explanations will be omitted here.

Above, the illustrated embodiments were used as the basis to explain the present invention, but the present invention is not limited to the above-mentioned embodiments. For example, the above embodiments monitored the current or torque of the servo motor 34 and simultaneously recorded the position data of the front end of the wrist element 28 of the multiarticulated robot 12 and the relative position data of the movable electrode 30 with respect to the counter electrode 32. However, the multiarticulated robot 12 and movable electrode 30 operate based on operating instructions on a time series from the robot control device 16 and spot welding gun control device 18, so it is also possible to find the position data of the front end of the wrist element 28 of the multiarticulated robot 12 and the relative position data of the movable electrode 30 with respect to the counter electrode 32 at a past time from the executed operating instructions of the multiarticulated robot 12 and movable electrode 30.

Next, the aspect B will be explained.

In the method of detection of the welding workpiece position according to the present invention, first, the movable electrode 30 has to be positioned so as to be contiguous with the surface of the welding workpiece W at the movable electrode side. Therefore, the method of positioning the movable electrode 30 so as to be contiguous with the surface of the welding workpiece W at the movable electrode side will be explained.

As the most basic method, there is also the method of having a worker operate the spot welding gun 14 and the multiarticulated robot 12, visually confirm the surface of the welding workpiece W at the movable electrode side and the position of the movable electrode 30, and position the movable electrode 30 to be contiguous with the surface of the welding workpiece W at the movable electrode side, but it is also possible to use various other methods to position the movable electrode 30 so as to be contiguous with the surface of the welding workpiece W at the movable electrode side. For example, like in the prior art, it is possible to operate the multiarticulated robot 12 to make the spot welding gun 14 move to a position where the movable electrode 30 and counter electrode 32 contact a strike position on the welding workpiece W when closing the movable electrode 30 and the counter electrode 32 of the spot welding gun 14, then drive the servo motor 34 to make the movable electrode 30 move toward the counter electrode 32, judge that the movable electrode 30 and the welding workpiece W have contacted when the current or torque of the servo motor 34 reaches a predetermined threshold value, and make the drive operation of the servo motor 34 stop so as to position the movable electrode 30 to be contiguous with the surface of the welding workpiece W at the movable electrode side.

Further, instead of using the servo motor 34 to move the movable electrode 30 with respect to the counter electrode 32, it is also possible to use the multiarticulated robot 12 to make the spot welding gun 14 and welding workpiece W move relative to each other to thereby make the movable electrode 30 and the welding workpiece W approach each other or separate. Then, it is also possible to perform at least part of the operation for making the movable electrode 30 and the welding workpiece W contact each other from the state when the movable electrode 30 is separated from the welding workpiece W or the operation for making the movable electrode 30 and the welding workpiece W completely separate from the state when they are in contact, while monitoring the current or torque of the servo motor 34, judge that the movable electrode 30 contacts the welding workpiece W or the movable electrode 30 has completely separated from the welding workpiece W when the trend of change of the current or torque of the servo motor 34 changes, and position the movable electrode 30 at the position when judging contact or separation.

As an example of the latter method, for example, the multiarticulated robot 12 is operated to make the spot welding gun 14 move to a position where the movable electrode 30 and counter electrode 32 contact at a strike position on the welding workpiece W when closing the movable electrode 30 and the counter electrode 32 of the spot welding gun 14, then the servo motor 34 is used to drive the movable electrode 30 at the speed Vg while the multiarticulated robot 12 is used to make the spot welding gun 14 and welding workpiece W move relative to each other in a direction making the movable electrode 30 and the welding workpiece W approach each other from the separated state and, simultaneously, the current or torque of the servo motor 34 is monitored. If the movable electrode 30 contacts the welding workpiece W, the welding workpiece W is pressed by the movable electrode 30 causing elastic deformation. That reaction force thereof acts from the welding workpiece W to the movable electrode 30, so the state of the movable electrode 30 moving with respect to the counter electrode 32 at the speed Vg is maintained, thus, the torque and current of the servo motor 34 increase. By utilizing this and monitoring the current or torque of the servo motor 34, it is judged that the movable electrode 30 contacts the welding workpiece W when the current or torque of the servo motor 34 changes to a trend of increase compared with a predetermined reference state. The position at this time is deemed the position where the movable electrode 30 is contiguous with the welding workpiece W. The movable electrode 30 is positioned at that position. The change of the current or torque of the servo motor to a trend of increase compared with a predetermined reference state can be detected, for example, by detecting that the current or torque of the servo motor 34 has increased over the value of the current or torque of the servo motor 34 of a reference state by a predetermined threshold value or more or by detecting that the amount of change per unit time of the current or torque of the servo motor 34 has increased over the amount of change per unit time of the current or torque of the servo motor 34 of the reference state by a predetermined threshold value or more.

Note that, "when . . . changes to a trend increasing compared with reference state" means when the actual value or amount of change per unit time of the current or torque of the servo motor 34 increases over the value or amount of change per unit time of the current or torque of the servo motor 34 in the case of assuming a reference state. Further, the reference state is determined from the value or amount of change per unit time of the current or torque of the servo motor 34 in a preparatory operation zone after the start of relative movement between the spot welding gun 14 and welding workpiece W and before the contact of the movable electrode 30 and the welding workpiece W.

Further, as another method, it is possible to operate the multiarticulated robot 12 to make the spot welding gun 14 move to a position where the movable electrode 30 and counter electrode 32 contact at a strike position on the welding workpiece W when closing the movable electrode 30 and the counter electrode 32 of the spot welding gun 14, then use the servo motor 34 to drive the movable electrode 30 at the speed Vg while using the multiarticulated robot 12 to make the spot welding gun 14 and welding workpiece W move relatively in a direction where the movable electrode 30 and the welding workpiece W separate from the pressed state and simultaneously monitor the current or torque of the servo motor 34. If using the multiarticulated robot 12 to move the movable electrode 30 in a direction separating from the welding workpiece W from a state where the movable electrode 30 and the welding workpiece W are pressed against each other, the amount of elastic deformation of the welding workpiece W due to the movable electrode 30 decreases, so the reaction force acting from the welding workpiece W to the movable electrode 30 also decreases and the current and torque of the servo motor 34 decreases. Furthermore, if the movable electrode 30 completely separates from the welding workpiece W, the elastic deformation of the welding workpiece W due to the pressing of the movable electrode 30 is eliminated, the reaction force acting from the welding workpiece W to the movable electrode 30 is eliminated, and the decrease in the torque and current of the servo motor 34 ends and the values become substantially constant. By utilizing this and monitoring the current or torque of the servo motor 34, when the current or torque of the servo motor 34 has changed to a trend of increase compared with a predetermined reference state (when the trend of decrease of the current or torque of the servo motor 34 has ended), it is judged that movable electrode 30 has completely separated from the welding workpiece W. The position at this time is deemed the position where the movable electrode 30 is contiguous with the welding workpiece W. The movable electrode 30 is positioned at this position. The fact of the current or torque of the servo motor 34 changing to a trend of increase compared with a predetermined reference state (the fact of the trend of decrease of the current or torque of the servo motor 34 ending) can be detected by, for example, analyzing the time-series data of the current or torque of the servo motor 34, detecting the fact of the actual value or amount of change per unit time of the current or torque of the servo motor 34 increases over the value of the current or torque of the servo motor 34 when assuming the reference state by a predetermined threshold value or more or the fact of the amount of change per unit time of the current or torque of the servo motor 34 becoming 0 or a positive value from a negative value expressing a monotonic decrease of the reference state and analytically finding the point of change of the trend of change of the time-series waveform of the current or torque of the servo motor 34.

Note that, "when . . . changes to a trend increasing compared with a . . . reference state" means when the actual value or amount of change per unit time of the current or torque of the servo motor 34 increases over the value or amount of change per unit time of the current or torque of the servo motor 34 when assuming a reference state. Further, the reference state is determined from the value or amount of change per unit time of the current or torque of the servo motor 34 in a preparatory operation zone after the start of relative movement between the spot welding gun 14 and welding workpiece W and before the separation of the movable electrode 30 and the welding workpiece W.

In this way, instead of using the servo motor 34 to move the movable electrode 30 with respect to the counter electrode 32, by using the multiarticulated robot 12 to make the spot welding gun 14 and welding workpiece W move relatively to make the movable electrode 30 and the welding workpiece W approach and separate and perform at least part of the operation of making the movable electrode 30 and the welding workpiece W contact each other from the state where the movable electrode 30 is separated from the welding workpiece W or the operation of making the movable electrode 30 and the welding workpiece W completely separate from the state where they are in contact. Thus, it is possible to suppress the speed of movement of the movable electrode 30 due to the servo motor 34 and reduce the variation in the current or torque of the servo motor 34 due to the dynamic friction in the movable electrode drive mechanism. As a result, it becomes possible to more accurately detect the change of the trend of change of the current or torque of the servo motor 34 due to contact of the movable electrode 30 and the welding workpiece W and more accurately detect the surface position of the welding workpiece W.

In particular, if making the speed Vg by which the servo motor 34 drives the movable electrode 30 "0" and performing all of the operation for making the movable electrode 30 and the welding workpiece W contact or the operation for making them completely separate from a contact state by movement by the multiarticulated robot 12, when detecting the position of the surface of the welding workpiece W by the movable electrode 30, since the movable electrode 30 is not driven by the servo motor 34, the variation of the current or torque of the servo motor 34 due to the dynamic friction in the movable electrode drive mechanism is almost completely eliminated. Therefore, the change of the trend of change of the current or torque of the servo motor 34 when the movable electrode 30 and the welding workpiece W contact or the movable electrode 30 has completely separated from the welding workpiece W can be accurately detected, and the surface position of the welding workpiece W can be accurately detected.

Further, the speed Vg by which the servo motor 34 drives the movable electrode 30 may also be made an extremely low speed of an extent enabling elimination of static friction. If making the speed Vg by which the servo motor 34 drives the movable electrode 30 "0" and making the movable electrode 30 completely stationary with respect to the counter electrode 32, due to the static friction in the movable electrode drive mechanism, when the movable electrode 30 contacts the welding workpiece W, the reaction force received from the welding workpiece W is lost and not transmitted to the servo motor 34 resulting in an insensitive zone where the current or torque of the servo motor 34 does not fluctuate much at all regardless of a reaction force being received. Such an insensitive zone may have a detrimental effect on the precision of detection of the surface of the welding workpiece W by the movable electrode 30 when the static friction is large. As opposed to this, if driving the movable electrode 30 by the servo motor 34 at an extremely low speed of an extent able to eliminate the static friction, such an insensitive zone can be eliminated. Further, even if making the movable electrode 30 move with respect to the counter electrode 32 by an extremely low speed Vg of an extent able to eliminate the static friction, since the dynamic friction in the movable electrode drive mechanism becomes smaller, so it is possible to suppress to a minimum the variation of the current or torque of the servo motor 34 due to the dynamic friction.

Figure 15:
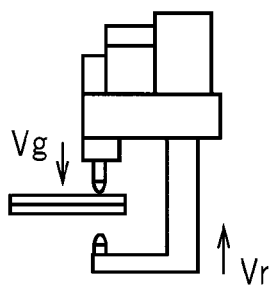
FIG. 15 is an explanatory view showing using a servo motor to make a movable electrode approach a counter electrode by a speed Vg from a state when the movable electrode has been made to contact the surface of the welding workpiece and simultaneously using a multiarticulated robot to make the counter electrode of the spot welding gun approach the welding workpiece at a same speed Vr as the speed Vg.

Then, the method of detection of the welding workpiece position which detects the surface position of the welding workpiece which the counter electrode 32 contacts will be explained. First, the multiarticulated robot 12 is operated to make the spot welding gun 14 move to a position where the movable electrode 30 and counter electrode 32 contact at a strike position on the welding workpiece W when closing the movable electrode 30 and the counter electrode 32 of the spot welding gun 14, then any method is used to position the movable electrode 30 so as to be contiguous with the surface of the welding workpiece W at the movable electrode side. Note that, when setting the servo motor 34 driving the movable electrode 30 with a torque limit, it is also possible to position the movable electrode 30 so as to be contiguous with the surface of the welding workpiece W at the movable electrode side, then further position the movable electrode 30 at a position offset from this position by exactly a predetermined distance. The reasons will be explained later. Then, as shown in FIG. 15, the servo motor 34 is used to make the movable electrode 30 move at a predetermined speed Vg in a direction making it approach the counter electrode 32 from the state contiguous with the surface of the welding workpiece W at the movable electrode side, simultaneously the multiarticulated robot 12 is used to make the spot welding gun 14 and welding workpiece W move relatively at a speed Vr equal to the speed Vg in a direction making the counter electrode 32 and welding workpiece W approach from a separated state, and at least one of the speed of movement and acceleration of the movable electrode 30 with respect to the counter electrode 32 is monitored. Further, if monitoring at least one of the speed of movement and acceleration of the movable electrode 30 with respect to the counter electrode 32 and detecting contact of the counter electrode 32 and the welding workpiece W, the counter electrode side surface position of the welding workpiece W is found from the detected position of the front end of the counter electrode 32. The speed of movement and acceleration of the movable electrode 30 with respect to the counter electrode 32 may be directly measured or may be found from the servo motor 34 driving the movable electrode 30.

Note that, monitoring the speed of movement and acceleration of the movable electrode with respect to the counter electrode is equivalent to monitoring the rotational speed and rotational acceleration of a servo motor for driving the movable electrode. Monitoring the speed of movement and acceleration of the movable electrode with respect to the counter electrode is therefore deemed to include monitoring the rotational speed and rotational acceleration of a servo motor for driving the movable electrode.

Here, the position data of the position of the front end of the counter electrode 32 when the counter electrode 32 contacts the welding workpiece W can be found for example as follows based on the position data of the front end of the wrist element 28 of the multiarticulated robot 12.

The distance from the floor surface to the horizontal axial line J2 of the turret 22 supported on the pedestal 20, the interaxial distance between the vertical axial line J1 and horizontal axial line J2, the interaxial distance between the horizontal axial line J2 and horizontal axial line J3, and the interaxial distance between the horizontal axial line J3 and the axial line J4 are constant, so the position of the front end of the wrist element 28 of the multiarticulated robot 12 can be found from the rotational angles of the axes of the multiarticulated robot 12. Further, the position from the front end of the wrist element 28 of the multiarticulated robot 12 to the front end of the counter electrode 32 of the spot welding gun 14 is predetermined and always constant. Therefore, the position data of the front end of the counter electrode 32 of the spot welding gun 14 can be found from the position data of the front end of the wrist element 28 of the multiarticulated robot 12 and the positional relationship between the front end of the wrist element 28 of the multiarticulated robot 12 and the front end of the counter electrode 32 of the spot welding gun 14.

The above method of detection of the welding workpiece position is characterized by monitoring not the current or torque of the servo motor driving the multiarticulated robot 12 or the current or torque of the servo motor 34 driving the movable electrode 30, but at least one of the speed of movement and acceleration of the movable electrode 30 with respect to the counter electrode 32. Until the counter electrode 32 contacts the welding workpiece W, the speed of movement of the movable electrode 30 with respect to the counter electrode 32 is a constant Vg. On the contrary, if the counter electrode 32 contacts the welding workpiece W in the state where the movable electrode 30 is contiguous with the welding workpiece W, the movable electrode 30 and counter electrode 32 clamp the welding workpiece W between them, so the movement of the movable electrode 30 with respect to the counter electrode 32 is obstructed, and the speed of movement of the movable electrode 30 with respect to the counter electrode 32 decreases from the predetermined value Vg and finally becomes 0. At this time, the acceleration of the movable electrode with respect to the counter electrode 32 changes from 0 to a negative value and finally again to 0. Therefore, if monitoring the speed of movement or acceleration of the movable electrode 30 with respect to the counter electrode 32, it is possible to detect the counter electrode 32 contacting the welding workpiece W without being affected much at all by the rigidity of the welding workpiece W, multiarticulated robot 12, and spot welding gun 14. Further, since the counter electrode side surface position of the welding workpiece W is detected from the position of the counter electrode 32 when the counter electrode 32 contacts the welding workpiece W, there is no need to measure the thickness of the welding workpiece W at the strike position before positioning the counter electrode 32 at the strike position on the surface of the welding workpiece W.

In the method of detection of the surface of the welding workpiece of the present invention, preferably the servo motor 34 for driving the movable electrode 30 with respect to the counter electrode 32 is set with a torque limit. If setting the servo motor 34 with a torque limit in this way, when the counter electrode 32 contacts the welding workpiece W, the torque of the servo motor 34 will immediately reach the torque limit. As a result, operation of the movable electrode 30 by the servo motor 34 is limited and the rotational speed and rotational acceleration of the servo motor 34 when the counter electrode 32 contacts the welding workpiece W, that is, the speed of movement and acceleration of the movable electrode 30, can be made to decrease more markedly, so detection of contact becomes easier.

The value of the torque limit of the servo motor 34 is preferably determined based on the torque of the servo motor 34 during the operation where relative movement between the spot welding gun 14 and welding workpiece W is used to make the counter electrode 32 contact the welding workpiece W from the state separated from the welding workpiece W, that is, when the counter electrode 32 is separated from the welding workpiece W and in that state the movable electrode 30 is being made to move with respect to the counter electrode 32 at the speed Vg. When the movable electrode 30 is moving at the speed of movement Vg, the servo motor 34 outputs a torque necessary for making the movable electrode 30 move at the speed Vg. If measuring the torque required for moving this move at the speed Vg during the above operation and setting this as the value of the torque limit of the servo motor 34, when clamping the welding workpiece W between the counter electrode 32 and movable electrode 30, the servo motor 34 cannot use the movable electrode 30 to push back the counter electrode 32 and welding workpiece W, and the movable electrode 30 can no longer maintain the speed of movement Vg. In other words, the speed of movement of the movable electrode 30 and the acceleration of the movable electrode 30 can be made to decrease more markedly, so contact can be detected with a higher sensitivity. Note that, when actually setting, as the value of the torque limit of the servo motor 34, the torque required for making the movable electrode 30 move at the speed Vg, it is preferable to add somewhat of an extra margin to prevent erroneous detection. It is possible to use this added extra margin to adjust the detection sensitivity needless to say.

The timing for determining the value of the torque limit of the servo motor 34 may be any time in the state where the counter electrode 32 is separated from the welding workpiece W when the movable electrode 30 is moving with respect to the counter electrode 32 at the speed Vg. Typically, right after the movable electrode 30 starts relative movement with respect to the counter electrode 32, the counter electrode 32 is still not contiguous with the welding workpiece, so it is sufficient to determine the value of the torque limit based on the torque output of the servo motor 34 at this time. For example, as shown in FIG. 17, it is sufficient to set the value of the torque limit based on the torque output of the servo motor 34 after the time Ta when the speed of movement of the movable electrode 30 with respect to the counter electrode 32 becomes Vg. However, right after the start of movement, the servo motor 34 has just started the acceleration operation. As shown in FIG. 18A and FIG. 18B, even if the speed of movement of the movable electrode 30 reaches Vg, the torque output of the servo motor 34 is unstable and overshoot sometimes occurs. Therefore, as shown in FIG. 18A and FIG. 18B, it is preferable to determine the value of the torque limit of the servo motor 34 based on the torque at the time Tb after the elapse of a predetermined time from the start of movement when the torque output of the servo motor 34 stabilizes. Note that, to prevent the counter electrode 32 from becoming contiguous with the welding workpiece before setting the value of the torque limit, it is preferable to separate the counter electrode 32 and welding workpiece W to secure a sufficient distance, then start the detection operation.

Figure 19A:
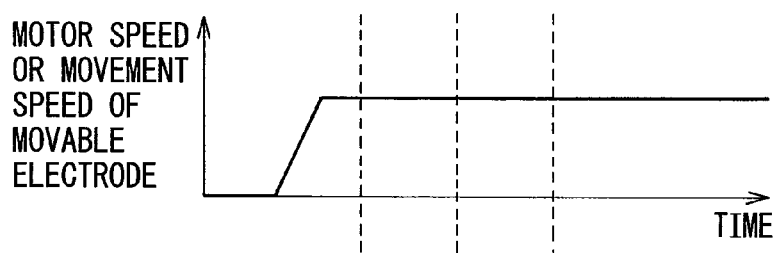
FIG. 19 are explanatory views showing various patterns of change along with time taken by a motor torque due to the mechanical resistance of the spot welding gun when making a servo motor rotate or when making a movable electrode move.
Figure 19B:
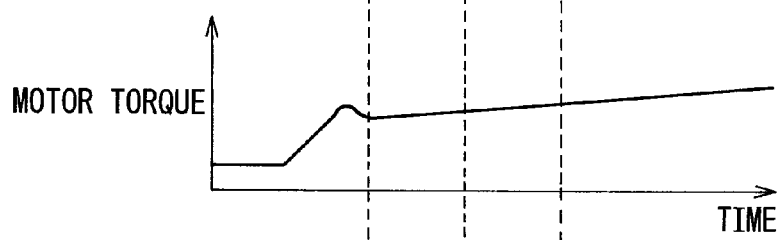
Figure 19C:
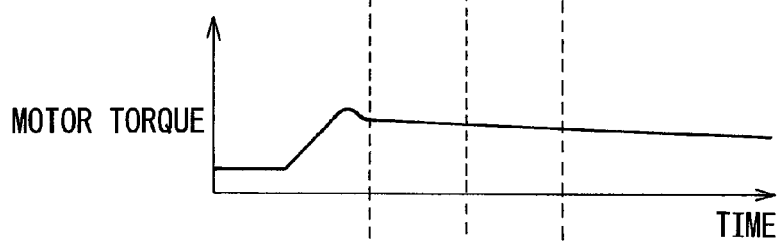
Figure 19D:
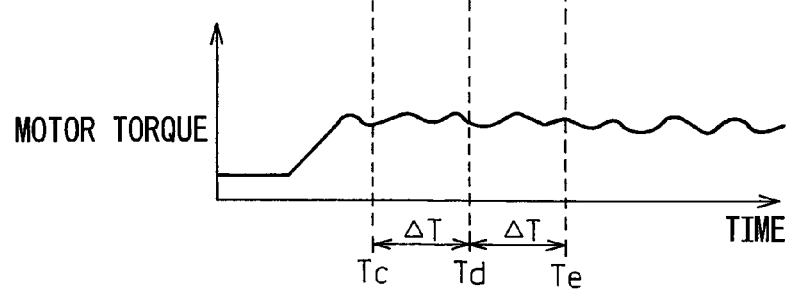

Furthermore, if it is judged that the counter electrode 32 and the welding workpiece W do not contact even after the elapse of a predetermined time when the movable electrode 30 is moving with respect to counter electrode 32 at the speed Vg, it is possible to determine the value of the torque limit based on the torque output of the servo motor 34 in that predetermined time. If shortening this predetermined time, it is possible to periodically update the set value of the torque limit every certain time period. As shown in FIG. 19A, even when the movable electrode 30 moves relative to the counter electrode 32 by a constant speed, due to the mechanical resistance present at the spot welding gun 14 (for example, internal friction of the drive parts, elastic deformation of conductive parts connecting the movable electrode and the welding transformer (not shown), etc.), the torque output of the servo motor 34 will not stabilize at a constant value but will gently rise (FIG. 19B), gently fall (FIG. 19C), or vary (FIG. 19D) in some cases. When the torque output of the servo motor 34 does not stabilize at a constant value in this way, periodically updating the set value of the torque limit becomes an effective means. For example, as shown in FIG. 19A to FIG. 19D, if periodically repeating updating of the set value of the torque limit based on the torque of the servo motor 34 at the times Tc, Td, and Te at certain time intervals ΔT, it is possible to easily set a suitable torque limit.

When setting the servo motor 34 driving the movable electrode 30 with a torque limit, it is possible to position the movable electrode 30 at a position offset slightly by exactly a known distance from the position contiguous with the surface of the welding workpiece W at the movable electrode side as stated above. The reason will be explained here.

Figure 20A:
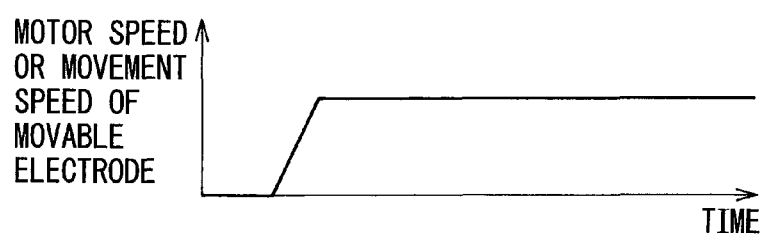
FIG. 20 are explanatory views showing various patterns of change along with time taken by a motor torque due to the positional relationship of the movable electrode and welding workpiece when making the servo motor rotate at a predetermined rotational speed or making the movable electrode move by a predetermined speed of movement.
Figure 20B:
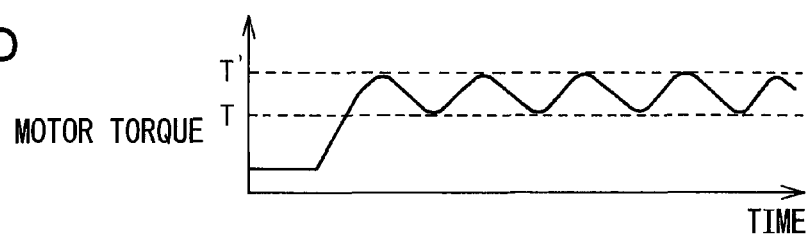

If actually performing an operation for detecting contact between the counter electrode 32 and welding workpiece W in the state where the movable electrode 30 is made contiguous with the surface of the welding workpiece W at the movable electrode side, the fine vibration occurring when the multiarticulated robot 12 operates will cause the movable electrode 30 to be pressed slightly against the welding workpiece W or separate from the welding workpiece W, so an unstable state where the reaction force from the welding workpiece W is received and not received will easily result. The torque of the servo motor 34 is controlled to maintain the speed of movement of the movable electrode 30 constant, so if receiving a reaction force from the welding workpiece W, a torque of the amount pushing back the welding workpiece W becomes extra necessary. Therefore, even if the rotational speed of the servo motor 34 or the speed of movement of the movable electrode 30 are constant as shown in FIG. 20A, in the state where the movable electrode 30 is pressed slightly against or separated from the welding workpiece W, as shown in FIG. 20B, the torque of the servo motor 34 will vary between a value T' of a state receiving a reaction force from the welding workpiece W and a value T of a state not receiving it and will therefore become unstable. On the contrary, to improve the precision of detection of contact, the torque limit of the servo motor 34 is preferably set to a value equal to the minimum extent torque at which the movable electrode 30 can maintain movement at the speed Vg. Therefore, the effect of the unstable reaction force transmitted to the movable electrode 30 is preferably removed as much as possible.

Figure 20C:
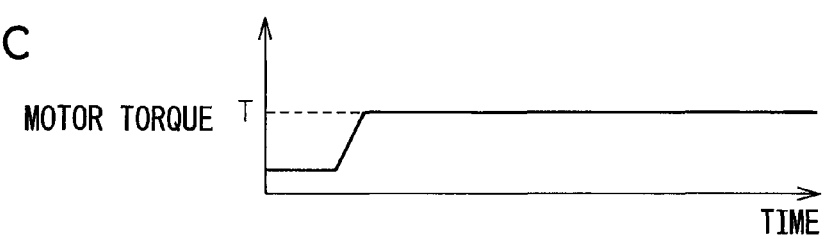
Figure 20D:
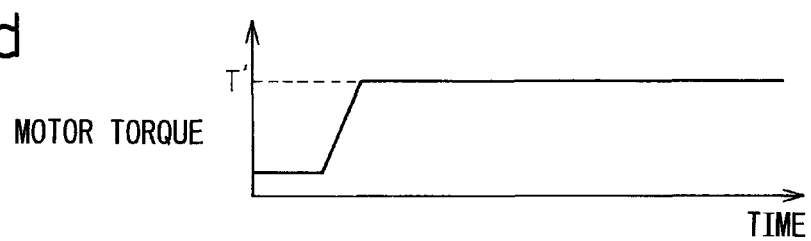

By performing an operation for detecting contact of the counter electrode 32 and the welding workpiece W in the state making the movable electrode 30 separate slightly from the welding workpiece W, it is possible to eliminate the reaction force from the welding workpiece W. As shown in FIG. 20C, the servo motor 34 can maintain the torque thereof at the value T of the state not receiving the reaction force from the welding workpiece W. Further, conversely, if performing an operation for detecting the contact of the counter electrode 32 and welding workpiece W in the state pressing the movable electrode 30 slightly against the welding workpiece W, the reaction force from the welding workpiece W is not lost, so the servo motor 34 can stably receive a substantially constant reaction force, so, as shown in FIG. 20d, the torque of the servo motor 34 can be maintained at the value T' of the state where the servo motor 34 receives the reaction force from the welding workpiece W. That is, this is equivalent to giving a certain bias to the torque output of the servo motor 34. Due to this, the torque of the servo motor 34 becomes stable, so it becomes easy to accurately and easily determine the torque for maintaining the movement of the movable electrode 30 at the speed Vg. Note that, in the case of offset, the detection position of the welding workpiece W by the counter electrode 32 is off by exactly the amount of the offset distance, but the offset distance is a predetermined known value, so if adjusting the detected surface position of the welding workpiece W by the offset distance, it is possible to obtain the accurate surface position of the welding workpiece W.

Further, it is also possible to set the servo motors (not shown) driving the axes J1 to J5 of the multiarticulated robot 12 with torque limits. Due to this, it is possible to suppress elastic deformation of the welding workpiece due to the movable electrode 30 and counter electrode 32. Both or either of the servo motor 34 driving the movable electrode 30 and the servo motors driving the axes J1 to J5 of the multiarticulated robot 12 may be set with torque limits of course.

Even when setting the servo motors (not shown) driving the axes J1 to J5 of the multiarticulated robot 12 with torque limits, it is preferable to determine the values of the torque limits based on the torques of the multiarticulated robot during the operation using relative movement between the spot welding gun 14 and welding workpiece W to make the counter electrode 32 contact the welding workpiece W from the state separated from the welding workpiece W, that is, when the multiarticulated robot 12 operates so that the counter electrode 32 is separated from the welding workpiece W and in that state the counter electrode 32 is made to move relative to the welding workpiece W at a speed Vr equal to the speed Vg of the movable electrode 30. The reasons and the method of determination of the set values of the torque limits are similar to the case of setting the servo motor 34 driving the movable electrode 30 with a torque limit, so the explanation will be omitted here.

Further, in the method of detection of the welding workpiece position of the present invention, a worker may proceed step by step by manual operation, but the spot welding system 10 may also automatically execute a series of steps. For example, in a spot welding program in which all welding strike positions and program instructions for spot welding are already taught, by activating the mode where the above steps are automatically executed and playing the spot welding program and by executing program instructions automatically making the multiarticulated robot 12 move to near each of the welding strike positions and perform the program instructions of the spot welding, it is possible to automatically perform the above steps and detect the surface position of the welding workpiece W, use the detected position as the basis to correct the strike teaching position data for the welding workpiece W, and, furthermore, record the amount of correction (amount of deviation) in the robot control device 16. It is also possible to display the recorded amount of correction on a teaching control panel provided at the robot control device 16. Further, when the recorded amount of correction is excessively large, it is possible to deem this as an abnormality of the position of the welding workpiece W, raise an alarm at the teaching control panel provided at the robot control device 16, or raise an alarm at a line control console or computer or other external control device able to communicate with the robot control device 16.

Figure 16:
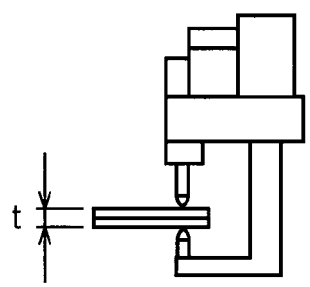
FIG. 16 is an explanatory view showing measuring of a thickness t of the welding workpiece from a surface position of the welding workpiece to which the movable electrode contacts and a surface position of the welding workpiece to which the counter electrode contacts.

Furthermore, it is possible to use the counter electrode side surface position of the welding workpiece W and the movable electrode side surface position of the welding workpiece W detected by the method of detection of the welding workpiece position according to the present invention, as shown in FIG. 16, to measure the thickness t of the welding workpiece W at a strike position. The movable electrode side surface position of the welding workpiece W, for example, can be found from the position data of the front end of the counter electrode 32 of the spot welding gun 14 and the relative position data of the front end of the movable electrode 30 with respect to the front end of the counter electrode 32 of the spot welding gun 14. The position data of the front end of the counter electrode 32 of the spot welding gun 14, in the same way as the method of finding the position data of the above-mentioned counter electrode 32, can be found from the position data of the front end of the multiarticulated robot 12 when positioning the movable electrode 30 to be contiguous with the surface of the welding workpiece W at the movable electrode side.

Note that, the movable electrode side surface position of the welding workpiece W can be detected, as explained above, by, for example, using the multiarticulated robot 12 to make the welding workpiece W and spot welding gun 14 move relative to each other so that the movable electrode 30 and welding workpiece W approach from a separated state or separate from a contact state while monitoring the current or torque of the servo motor 34, judging that the movable electrode 30 contacts the welding workpiece W or the movable electrode 30 separates from the welding workpiece W when the trend of change of the current or torque changes, and detecting the surface position of the welding workpiece W which the movable electrode 30 contacts from the position of the movable electrode 30 and the position of the multiarticulated robot 12 when the trend of change of the current or torque changes. Further, based on the surface position of the welding workpiece W detected in this way, it becomes possible to accurately position the movable electrode 30 at the detected surface position of the movable electrode side. Therefore, if positioning the movable electrode 30 at the surface position of the welding workpiece W at the movable electrode side detected in advance, as explained above, before starting the step of detecting the surface position of the welding workpiece W which the counter electrode 32 contacts, it is possible to detect the surface position of the welding workpiece W which the counter electrode 32 contacts more accurately.

The each of the found thicknesses t at the welding workpieces W at the different weld strikes can be used when it is necessary to set in advance the thicknesses of the welding workpiece W at the weld strikes when teaching a spot welding program. In actual factories, sometimes it is necessary to set accurate thicknesses of welding workpieces W at hundreds of weld strikes. In such a case, use of thicknesses of welding workpieces W at weld strikes found as explained above would be helpful. Furthermore, when correcting an already taught spot welding program, it is possible to correct the preset thickness information of the welding workpiece W to the thickness actually measured for each strike as explained above. Due to this, the worker no longer has to accurately set thicknesses when the thickness information of the welding workpiece W is preset.

In addition, when comparing a preset thickness of the welding workpiece W and the measured thickness of the welding workpiece W and the difference of the two is excessively large, this is an abnormality of the workpiece thickness. It can also be judged that there is an abnormality in the welding workpiece W or abnormality in the measurement position. For example, when the measured thickness of the welding workpiece W is too great compared with the set thickness of the welding workpiece W, it may be considered that an anchor bolt or other foreign object is present between the movable electrode 30 and counter electrode 32 and it may be judged that the detected position is not suitable as a weld strike. Furthermore, when the welding workpiece W is not suitably set, the difference between the set thickness of the welding workpiece W and the measured thickness of the welding workpiece W becomes excessively large, so this can be judged as an abnormality of the welding workpiece W. Further, when the difference between the set thickness of the welding workpiece W and the measured thickness of the welding workpiece W is excessively large yet no abnormality of the welding workpiece or abnormality of the weld strike position can be seen, it may be considered there is a possibility of the wear of the movable electrode 30 or counter electrode 32 having become large. When detecting these abnormalities, it is possible to raise an alarm at the teaching control panel provided at the robot control device 16, or raise an alarm at an external control device (line control console or computer etc.) able to communicate with the robot control device 16.

Below, several specific embodiments of the method for detecting the counter electrode side surface position of the welding workpiece W in accordance with the present invention will be explained. In the method of detection of the welding workpiece position of the present invention, if using the multiarticulated robot 12 to make the spot welding gun 14 and welding workpiece W move relative to each other, the same effect can be obtained, but below, for simplification of the explanation, as shown in FIG. 1, the explanation will be made with reference to the example of holding the spot welding gun 14 by the multiarticulated robot 12 and making it move relative to the welding workpiece W. However, as shown in FIG. 2, it is also possible to hold the welding workpiece W by the multiarticulated robot 12 and make it move relative to the spot welding gun 14. In this case, in the following explanation, the multiarticulated robot 12 may be used to make the welding workpiece W move instead of making the spot welding gun 14 move.

Embodiment B1

Referring to FIG. 21, a B1-th embodiment of the method of detection of the welding workpiece position of the present invention will be explained. In the B1-th embodiment, in a spot welding system 10 shown in FIG. 1, the servo motor 34 is used to make the movable electrode 30 move in a direction making it approach the counter electrode 32 at a predetermined speed Vg while the multiarticulated robot 12 is used to hold the spot welding gun 14 and make it move relative to the welding workpiece W fixed to a workpiece table (not shown) at the same speed Vr as the speed Vg in a direction making them approach.

In this embodiment, first, the multiarticulated robot 12 is operated to make the spot welding gun 14 move to a position contacting a welding location (strike position) on the welding workpiece W when the movable electrode 30 and counter electrode 32 close, and position the movable electrode 30 so as to be contiguous with the surface of the welding workpiece W at the movable electrode side (step S100). At this time, the counter electrode 32 is in a state completely separated from the welding workpiece W. The movable electrode 30 may be positioned at the surface of the welding workpiece W at the movable electrode side, as explained above, by any method.

Then, as shown in FIG. 15, the servo motor 34 is used to make the movable electrode 30 move from the state contiguous with the surface of the welding workpiece W at the movable electrode side in a direction making it approach the counter electrode 32 at a predetermined speed Vg and the multiarticulated robot 12 is used to make the spot welding gun 14 and welding workpiece W move relative to each other at a speed Vr equal to the speed Vg in a direction making the counter electrode 32 and the welding workpiece W approach from a separated state (step S102). In other words, the counter electrode 32 is made to approach the welding workpiece W without changing the relative position of the movable electrode 30 and the welding workpiece W while in the state when the movable electrode 30 is contiguous with the welding workpiece W. Simultaneously, at least one of the speed of movement and acceleration of the movable electrode 30 is monitored (step S104). The speed of movement and acceleration of the movable electrode 30 may be directly measured or may be found from the rotational speed and rotational acceleration of the servo motor 34 driving the movable electrode 30. Further, the speed of movement and acceleration of the movable electrode 30 with respect to the counter electrode 32 are respectively proportional to the rotational speed and rotational acceleration of the servo motor 34 for driving the movable electrode 30, so instead of the speed of movement or acceleration of the movable electrode 30, it is also possible to monitor the rotational speed or rotational acceleration of the servo motor 34 driving the movable electrode 30. When monitoring, the information of the speed of movement or acceleration of the movable electrode 30 or the rotational speed or rotational acceleration of the servo motor 34 and the position data of the front end of the wrist element 28 of the multiarticulated robot 12 and the relative position data of the movable electrode 30 with respect to the counter electrode 32 are successively recorded at each sampling time.

Then, it is determined whether to set the servo motor 34 driving the movable electrode 30 of the spot welding gun 14 and the servo motors driving the axes J1 to J5 of the multiarticulated robot 12 (not shown) with torque limits (step S106). When setting the torque limits, the routine proceeds to step S108 where a torque limit is set for the servo motor 34 driving the movable electrode 30 of the spot welding gun 14 and/or torque limits are set for the servo motors driving the axes J1 to J5 of the multiarticulated robot 12, then the routine proceeds to step S110. The torque limit for each servo motor is set to a value enabling the torque required for the operation for subsequently detecting contact of the counter electrode 32 and the welding workpiece W to be able to be sufficiently output. At step S102 on, the movable electrode moves at the speed Vg and the front end of the wrist element 28 of the multiarticulated robot 12, that is, the counter electrode 32, moves at the speed Vr, so at this time, it is preferable use the torques actually output from each of the servo motors as to basis for setting the values of the torque limits of the servo motors. Further, the set values of the torque limits may also be made predetermined values. On the contrary, when not setting torque limits, the routine proceeds from step S106 directly to step S110.

If the counter electrode 32 contacts the welding workpiece W while holding a state where the movable electrode 30 is contiguous with the welding workpiece W, the movable electrode 30 and counter electrode 32 clamp the welding workpiece W and the movement of the movable electrode 30 with respect to the counter electrode 32 is obstructed. If so, since the servo motor 34 is controlled so as to maintain the speed of movement Vg constant, it tries to output a larger torque, but the output limit of the servo motor 34 is reached and the rotational speed of the servo motor 34 driving the movable electrode 30 decreases. As a result, the set speed Vg is no longer able to be maintained, and the speed of movement of the movable electrode 30 with respect to the counter electrode 32 decreases from the predetermined value Vg. Further, the acceleration of the movable electrode 30 with respect to the counter electrode 32 changes from 0 to a negative value. Utilizing this, the speed of movement of the movable electrode 30 or the rotational speed of the servo motor 34 with respect to the counter electrode 32 or the acceleration of the movable electrode 30 or the rotational acceleration of the servo motor 34 with respect to the counter electrode 32 is successively checked (step S110). It is judged that the counter electrode 32 contacts the welding workpiece W when the speed of movement of the movable electrode 30 or the rotational speed of the servo motor 34 with respect to the counter electrode 32 decreases or the acceleration of the movable electrode 30 or the rotational acceleration of the servo motor 34 with respect to the counter electrode 32 changes from 0 to a negative value. Further, when it is judged that the counter electrode 32 does not contact the welding workpiece W, the routine returns to step S104 where at least one of the speed of movement and acceleration of the movable electrode continues to be monitored and, furthermore, at step S106, it is decided whether to reset the torque limits. When resetting the torque limits, for example, it is sufficient to redetermine and reset the values of the torque limits based on the torques output by the servo motor 34 driving the movable electrode 30 and the servo motors driving the axes of the multiarticulated robot 12 at step S108. It is also possible to update the set values of the torque limits at predetermined time intervals.

When the servo motor 34 driving the movable electrode 30 is set with a torque limit, after the counter electrode 32 contacts the welding workpiece W, the torque of the servo motor 34 reaches the torque limit earlier than the output limit, so the rotational speed of the servo motor 34 and the speed of movement of the movable electrode 30 decrease faster and simultaneously with this, the rotational acceleration of the servo motor 34 and the acceleration of the movable electrode 30 also change. In particular, when the torque limit of the servo motor 34 is set at a value substantially equal to or slightly larger than the torque of the servo motor 34 before the counter electrode 32 contacts the welding workpiece W, it is possible to immediately detect that the counter electrode 32 contacts the welding workpiece W.

When judging that the counter electrode 32 contacts the welding workpiece W, the movement of the movable electrode 30 with respect to the counter electrode 32 and the operation of the multiarticulated robot 12 are made to stop, the position of the surface of the welding workpiece W at the counter electrode side is detected based on the position data of the front end of the wrist element 28 of the multiarticulated robot 12 and relative position data of the front end of the counter electrode 32 of the spot welding gun 14 with respect to the front end of the wrist element 28 when it is judged that the counter electrode 32 contacts the welding workpiece W, then the process of detection of the surface position of the welding workpiece W is ended (step S112).

Figure 22A:
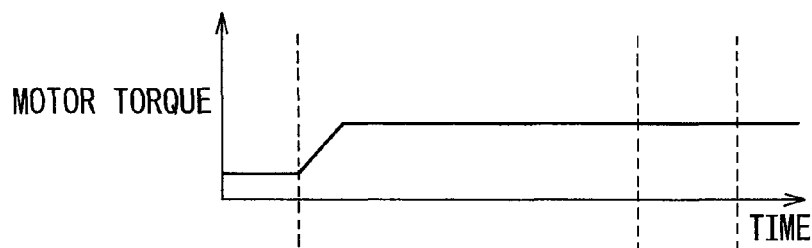
FIG. 22 are graphs showing the changes along with time in a torque of a servo motor and a rotational speed and rotational acceleration of a servo motor (or speed of movement and acceleration of the movable electrode) when working a B1-th embodiment of a method of detection of a welding workpiece position of the present invention.
Figure 22B:
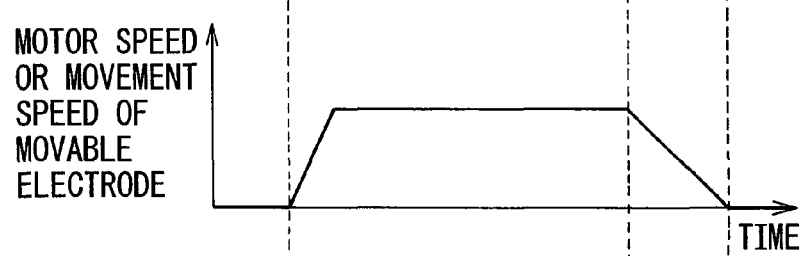
Figure 22C:
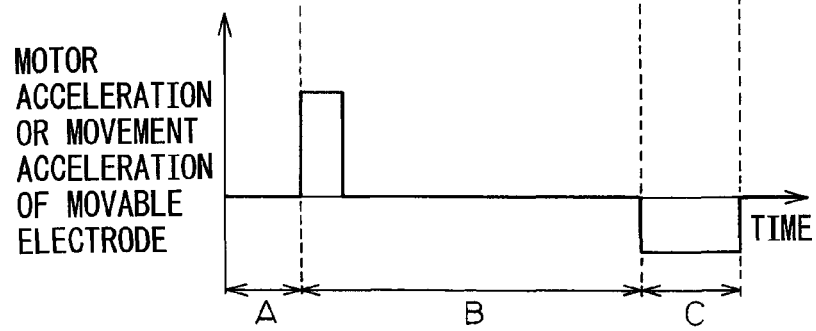

FIG. 22 show graphs expressing changes of the torque, rotational speed, and rotational acceleration of the servo motor 34 by time series when detecting the surface at the counter electrode side of the welding workpiece W which the counter electrode 32 contacts using the movable electrode 30 so as to detect the surface of the welding workpiece W in accordance with the present embodiment. FIG. 22A is a graph of the torque, FIG. 22B is a graph of the rotational speed, and FIG. 22C is a graph of the rotational acceleration. Note that, the graph showing the change of the speed of movement of the movable electrode 30 with respect to the counter electrode 32 by a time series also becomes similar to FIG. 22B, while the graph showing the change of the acceleration of the movable electrode 30 with respect to the counter electrode 32 by a time series also becomes similar to FIG. 22C. Further, in FIG. 22, the zone A shows the state when the detection operation is not being performed, the zone B shows the state during the detection operation when the movable electrode 30 still does not contact the welding workpiece W, and the zone C shows the state during the detection operation when the movable electrode 30 contacts the welding workpiece W.

Before the start of the detection operation, the movable electrode 30 is stationary with respect to the counter electrode 32 and is not driven by the servo motor 34. Therefore, at the zone A, the torque of the servo motor 34 becomes a certain constant value and the rotational speed and rotational acceleration become 0. On the contrary, when the detection operation is started, the movable electrode 30 is made to move with respect to the counter electrode 32 at the speed Vg, so at the zone B, the torque and rotational speed of the servo motor 34 increase until the speed of movement of the movable electrode 30 with respect to the counter electrode 32 reaches the speed Vg, then both become constant when it reaches Vg. Therefore, the acceleration of the movable electrode 30 and the rotational acceleration of the servo motor 34 with respect to the counter electrode 32 become positive values until the speed of movement of the movable electrode 30 with respect to the counter electrode 32 reaches Vg and both become 0 when it reaches Vg. Furthermore, at the zone C, if the counter electrode 32 contacts the welding workpiece W while maintaining a state when the movable electrode 30 contacts the welding workpiece W, the movable electrode 30 and counter electrode 32 clamp the welding workpiece W between them so movement of the movable electrode 30 with respect to the counter electrode 32 is obstructed. As a result, the servo motor 34 is controlled so as to maintain the speed of movement Vg constant, the torque of the servo motor 34 increases, and finally it reaches the output limit or torque limit of the motor and becomes constant. FIG. 22A shows the case where the torque limit of the servo motor 34 is set to a value equal to the torque of the servo motor 34 at the zone B (that is, the torque of the servo motor 34 required for making the movable electrode 30 move with respect to the counter electrode 32 at the speed Vg in the state with almost no load applied). At the zone B and the zone C, the torque of the servo motor 34 is a substantially constant value. On the contrary, the speed of movement of the movable electrode 30 with respect to the counter electrode 32 decreases from the predetermined value Vg and finally becomes 0, whereupon the movable electrode 30 stops with respect to the counter electrode 32, so the rotational speed of the servo motor 34 driving the movable electrode 30 also, as shown in FIG. 22B, decreases from a predetermined value and finally becomes 0. Further, the acceleration of the movable electrode 30 with respect to the counter electrode 32 changes along with the speed of movement of the movable electrode 30 with respect to the counter electrode 32, so, as shown in FIG. 22C, becomes 0 in the zone B, changes to a negative value in the zone C, and again becomes 0 when the movable electrode 30 stops with respect to the counter electrode 32.

As explained above, by setting the servo motor 34 with a torque limit, it is possible to prevent the welding workpiece W from being made to excessively deform when the movable electrode 30 presses the welding workpiece W. Furthermore, when the counter electrode 32 contacts the welding workpiece W, the movable electrode 30 is decelerated earlier and therefore the delay in detection of the point of time when the counter electrode 32 contacts the welding workpiece W can be reduced. Further, if setting the servo motors driving the axes J1 to J5 of the multiarticulated robot 12 with torque limits as well, it is possible to prevent the counter electrode 32 of the spot welding gun 14 made to move by the multiarticulated robot 12 from pressing against the welding workpiece W and excessively deforming it.

Further, if using the multiarticulated robot 12 to make the counter electrode 32 approach the welding workpiece W while holding the state where the movable electrode 30 is contiguous with the welding workpiece W, when the counter electrode 32 contacts the welding workpiece W, the speed of movement of the movable electrode 30 or the rotational speed of the servo motor 34 for driving the movable electrode 30 changes from a constant state and gradually decreases. Therefore, if monitoring the speed of movement of the movable electrode 30 or the rotational speed of the servo motor 34, it is possible to judge the time when the speed of movement of the movable electrode 30 or the rotational speed of the servo motor 34 changes from a substantially constant state to a decrease as the point of time when the counter electrode 32 contacts the welding workpiece W. In the same way, if using the multiarticulated robot 12 to make the counter electrode 32 approach the welding workpiece W and thereby contact the welding workpiece W while holding the state where the movable electrode 30 is contiguous with the welding workpiece W, when the counter electrode 32 contacts the welding workpiece W, the acceleration of the movable electrode 30 or the rotational acceleration of the servo motor 34 for driving the movable electrode 30 changes from 0 and becomes a negative value. Therefore, if monitoring the acceleration of the movable electrode 30 or the rotational acceleration of the servo motor 34, it is possible to judge the time when the acceleration of the movable electrode 30 or the rotational acceleration of the servo motor 34 changes from substantially 0 to a negative value as the point of time when the counter electrode 32 contacts the welding workpiece W.

Furthermore, it is possible to find the position data of the front end of the counter electrode 32 when it is judged that the counter electrode 32 contacts the welding workpiece W from the position data of the front end of the wrist element 28 of the multiarticulated robot 12 and relative position data of the front end of the counter electrode 32 of the spot welding gun 14 with respect to the front end of the wrist element 28 when it is judged that the counter electrode 32 contacts the welding workpiece W. If deeming the found position data of the front end of the counter electrode 32 to be the positional data of the surface of the welding workpiece W, it is possible to detect the position of the counter electrode side surface of the welding workpiece W.

Here, the point of time when the speed of movement of the movable electrode 30 or the rotational speed of the servo motor 34 changes from a substantially constant state to a decrease can be identified by analyzing the time-series curve, that is, waveform, of the speed of movement of the movable electrode 30 or the rotational speed of the servo motor 34 and finding the point when the speed of movement of the movable electrode 30 or the rotational speed of the servo motor 34 changed from a substantially constant state to a decrease (hereinafter referred to as "the point of change"). The following three examples of the method of analysis of the time-series waveform of the rotational speed of the servo motor 34 for finding the point of change may be mentioned. Note that, the method of analysis of the time-series waveform of the speed of movement of the movable electrode 30 for finding the point of change of the speed of movement of the movable electrode 30 is similar needless to say.

Figure 23:
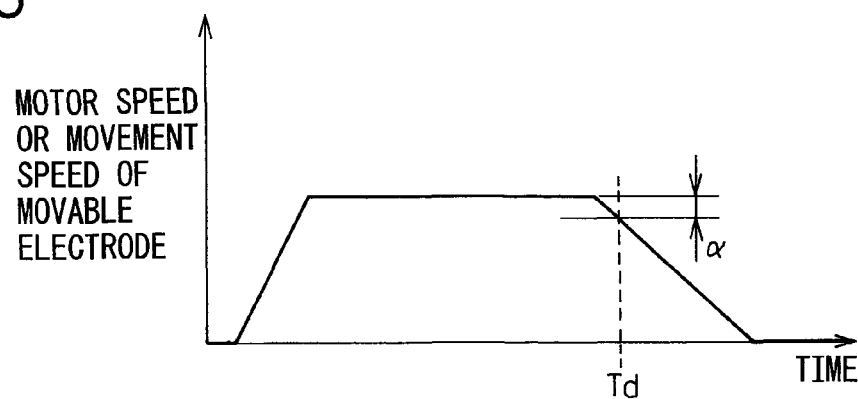
FIG. 23 is an explanatory view of a method of detecting a decrease in a rotational speed of a servo motor or a speed of movement of a movable electrode based on an amount of change of a rotational speed of a servo motor or a speed of movement of a movable electrode from a reference value.

(i) As shown in FIG. 23, the point where the amount of decrease of the rotational speed of the servo motor 34 from a reference value exceeds a predetermined threshold value α (>0) is deemed the point of change. The rotational speed of the servo motor 34 finally becomes 0 regardless of the rigidity of the welding workpiece W, so the threshold value α may be made any value in a range of the rotational speed of the servo motor 34 at the zone B to 0. The smaller the threshold value α, the earlier the time when the counter electrode 32 contacts the welding workpiece W can be detected. The threshold value α may also be determined using a ratio with respect to the rotational speed of the servo motor 34 in the zone B (for example, 10% etc.)

(ii) As shown in FIG. 24, the point where the amount of change Δv per unit time Δt of the rotational speed of the servo motor 34, that is, the slant of the time-series waveform of the rotational speed of the servo motor 34, becomes a predetermined threshold value β (≦0) or less is deemed the point of change. When the counter electrode 32 contacts the welding workpiece W, as shown in FIG. 24, the speed of movement of the servo motor 34 monotonically decreases, so the threshold value β becomes a negative value. When desiring to detect the time right after the start of decrease, the threshold value β should be made a negative value close to 0.

(iii) When the counter electrode 32 contacts the welding workpiece W, the rotational speed of the servo motor 34 monotonically decreases, so the slant of the time-series waveform of the rotational speed of the servo motor 34 becomes a negative value. Therefore, as shown in FIG. 25, first, the method of (i) or (ii) is used to find the point of change of the rotational speed of the servo motor 34, this is made the provisional point of change, the time-series waveform of the rotational speed is traced back along in time from the provisional point of change to find the amount of change per unit time of the rotational speed of the servo motor 34 (that is, the slant of the time-series waveform of the rotational speed), the point where the slant of the time-series waveform of the rotational speed becomes substantially 0 is made the true point of change, and it is deemed that the rotational speed has changed from a substantially constant state to a decrease at the true point of change. Note that, the time-series waveform of the rotational speed of the servo motor 34 is a set of discrete sampling points, so there is not necessarily any point on the time-series waveform where the slant becomes 0. Therefore, in practice, it is possible to trace back along in time the time-series waveform of the rotational speed from the provisional point of change (time Td1) to identify the point when the slant of the time-series waveform of the rotational speed becomes 0 or a positive value from a negative value (time Td3) and make the sampling point (time Td2) right before that the true point of change. According to such a method, as shown in FIG. 25, even when the rotational speed of the servo motor 34 decreases along a curve, the time right after the rotational speed of the servo motor 34 changes from a constant 0 state to a decrease can be accurately identified and the position of the surface of the welding workpiece W at the counter electrode side can be accurately found.

The speed of movement Vg of the movable electrode 30 with respect to the counter electrode 32 is any one set in advance, so there is no effect due to the rigidity of the welding workpiece W, spot welding gun 14, and multiarticulated robot and setting the above-mentioned threshold value for identifying the point of change from the speed Vg from a constant state to a decrease becomes easy.

The same basic thinking can also be applied to judgment in detection by the acceleration of the movable electrode 30 or the rotational acceleration of the servo motor 34. The point of time when the acceleration of the movable electrode 30 or the rotational acceleration of the servo motor 34 changes from a state of substantially 0 to negative is identified by analyzing the time-series curve, that is, waveform, of the acceleration of the movable electrode 30 or the rotational acceleration of the servo motor 34 and finding the point where the acceleration of the movable electrode 30 or the rotational acceleration of the servo motor 34 changes from a state of substantially 0 to negative (hereinafter referred to as "the point of change"). The following three examples of the method of analysis of the time-series waveform of the rotational acceleration of the servo motor 34 for finding the point of change may be mentioned. Note that, the method of analysis of the time-series waveform of the acceleration of the movable electrode 30 for finding the point of change of the acceleration of the movable electrode 30 is similar needless to say.

Figure 26A:
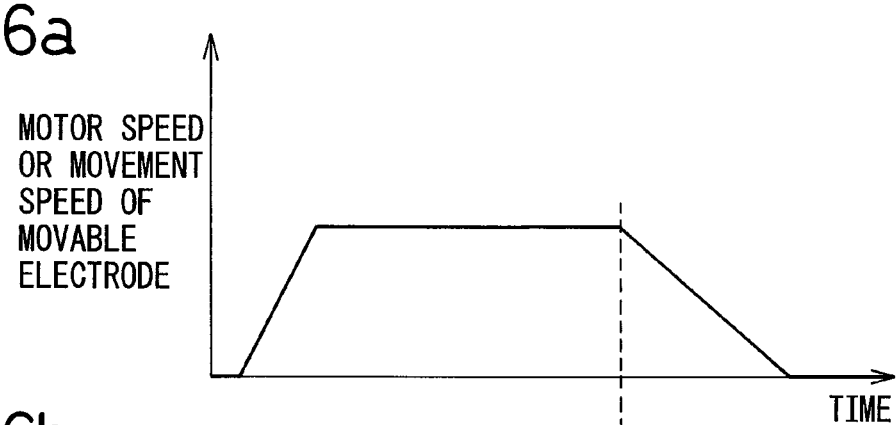
FIG. 26 are explanatory views of a method of detecting a decrease in a speed of a servo motor or a speed of movement of a movable electrode based on an amount of change of a rotational acceleration of the servo motor or acceleration of the movable electrode with respect to a reference value.
Figure 26B:
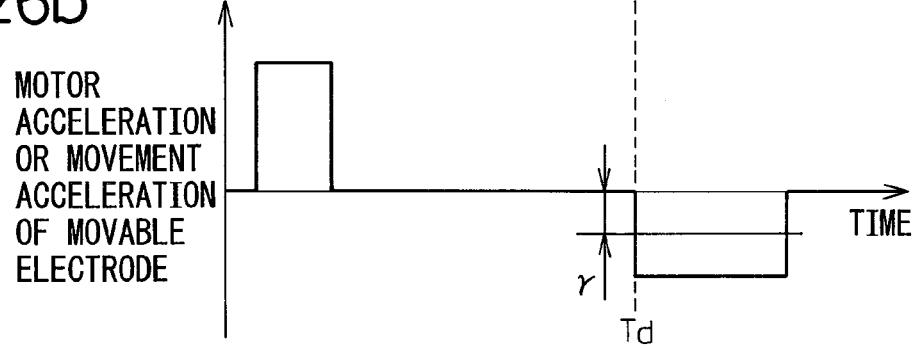

(i) As shown in FIG. 26, the point where the rotational acceleration of the servo motor 34 becomes a negative value is deemed the point of change. However, the actual rotational speed of the servo motor 34 changes slightly, so to prevent erroneous detection, rather than make the point where the rotational acceleration of the servo motor 34 becomes a negative value the point of change, it is preferable to deem the point where the rotational acceleration of the servo motor 34 is below the predetermined threshold value γ (<0) as the point of change. The threshold value γ may be made any negative value. If making the threshold value γ a negative value close to 0, it is possible to quickly detect when the counter electrode 32 contacts the welding workpiece W.

Figure 27A:
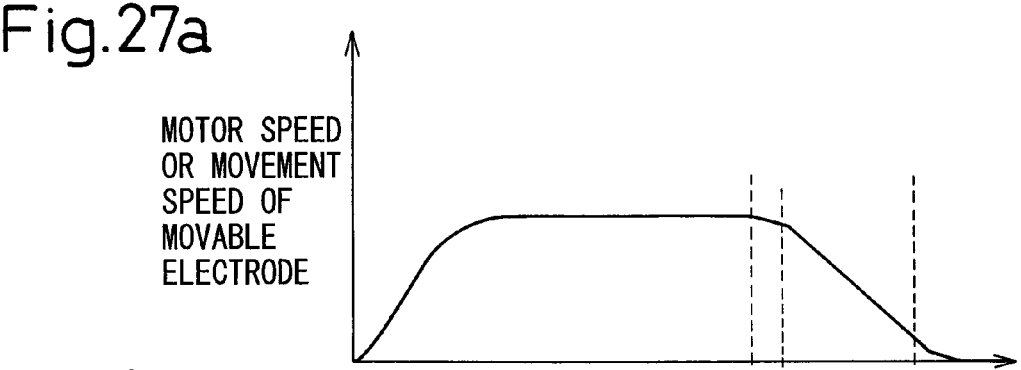
FIG. 27 are explanatory views of a method of detecting a decrease in a rotational acceleration of a servo motor or acceleration of a movable electrode based on an amount of change per unit time of the rotational acceleration of the servo motor or acceleration of the movable electrode.
Figure 27B:
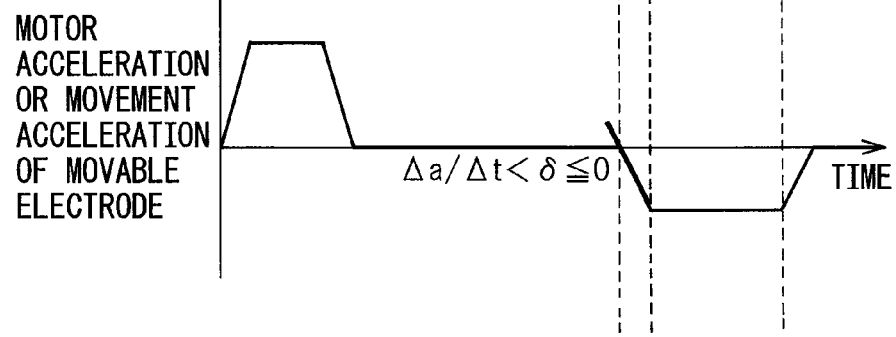

(ii) The rotational acceleration of the servo motor 34, as shown in FIG. 26, not only sometimes jumps from 0 in one step to a negative value (negative acceleration), but also, as shown in FIG. 27, gradually changes to a specific negative acceleration. In such a case, as shown in FIG. 27, if the counter electrode 32 contacts the welding workpiece W, the rotational speed of the servo motor 34 monotonically decreases. Along with this, the rotational acceleration of the servo motor 34 gradually falls from 0 to a specific negative value within an initial fine period, remains in a constant state at the specific negative value, then again rises and finally becomes 0. Therefore, the point where the amount of change Δa per unit time Δt of the rotational acceleration of the servo motor 34, that is, the slant of the time-series waveform of the rotational acceleration of the servo motor 34, becomes the predetermined threshold value δ ($\leqq$0) or less is deemed the point of change. When desiring to detect the time right after the start of decrease, the threshold value δ should be made a negative value close to 0.

Figure 28A:
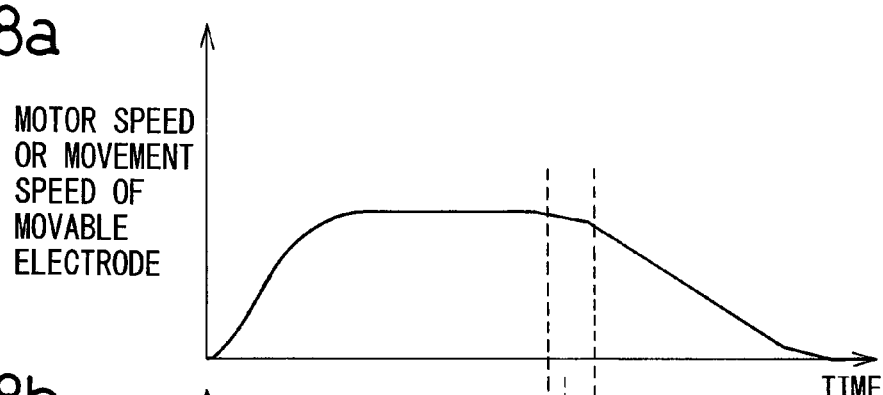
FIG. 28 are explanatory views of a method of finding a point of change analytically from a time-series waveform of rotational acceleration of a servo motor or acceleration of a movable electrode.
Figure 28B:
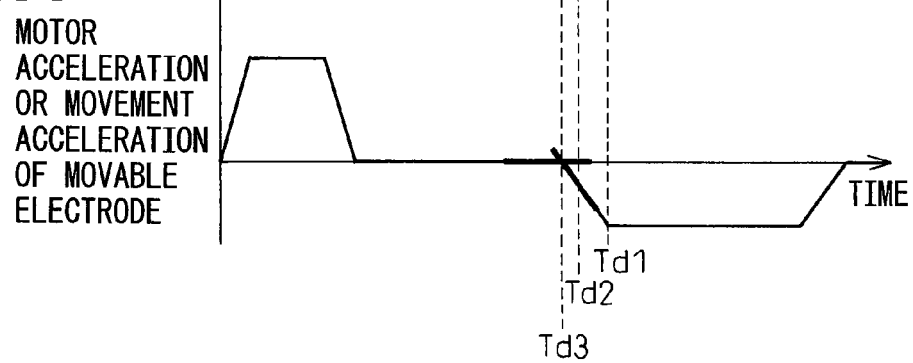

(iii) If the counter electrode 32 contacts the welding workpiece W, the rotational acceleration of the servo motor 34 decreases from 0, so the slant of the time-series waveform of the rotational acceleration of the servo motor 34 becomes a negative value. Therefore, as shown in FIG. 28, first, the method of (i) or (ii) is used to find the point of change of the rotational acceleration of the servo motor 34, this is made the provisional point of change, the time-series waveform of the rotational acceleration is traced back along in time from the provisional point of change to find the amount of change per unit time of the rotational acceleration of the servo motor 34 (that is, the slant of the time-series waveform of the rotational acceleration), the point of time when the slant of the time-series waveform of the rotational acceleration becomes substantially 0 is made the true point of change, and it is deemed that the rotational acceleration has changed from a state of substantially 0 to a decrease at the true point of change. Note that, the time-series waveform of the rotational acceleration of the servo motor 34 is a set of discrete sampling points, so there is not necessarily any point on the time-series waveform where the slant becomes 0. Therefore, in practice, it is possible to trace back along in time the time-series waveform of the rotational acceleration from the provisional point of change (time Td1) to identify the point when the slant of the time-series waveform of the rotational acceleration becomes 0 or a positive value from a negative value (time Td3) and make the sampling point (time Td2) right before that the true point of change. According to such a method, as shown in FIG. 28, even when the rotational acceleration of the servo motor 34 decreases along a curve, the time right after the rotational acceleration of the servo motor 34 changes from a constant 0 state to negative can be accurately identified and the position of the surface of the welding workpiece W at the counter electrode side can be accurately found.

Note that, in this embodiment, to keep the deformation of the welding workpiece W due to the movable electrode 30 and counter electrode 32 to the minimum extent, when it is judged that the counter electrode 32 contacts the welding workpiece W, the robot control device 16 and spot welding gun control device 18 make the operations of the multiarticulated robot 12 and servo motor 34 stop and detect the surface position of the welding workpiece W at the counter electrode side from the position data of the front end of the wrist element 28 of the multiarticulated robot 12 and the relative position data of the counter electrode 32 of the spot welding gun 14 with respect to the front end of the wrist element 28 when judging that the counter electrode 32 contacts the welding workpiece W. However, when employing the method of analysis (iii), the time-series data of the rotational speed and/or rotational acceleration of the servo motor 34 required for analysis at the point of time of identification of the provisional point of change is readied for use, but after that, the detection operation does not have to be continued, so the operations of the multiarticulated robot 12 and servo motor 34 may also be stopped not after judging that the counter electrode 32 has contacted the welding workpiece W, but at the point of time of identifying the provisional point of change.

Further, even after judging that the counter electrode 32 and the welding workpiece W have contacted, sometimes the multiarticulated robot 12 and servo motor 34 will end up running on inertia and the position of the front end of the wrist element 28 of the multiarticulated robot 12 and the relative position of the front end of the movable electrode 30 with respect to the front end of the counter electrode 32 when making the operations of the multiarticulated robot 12 and the servo motor 34 stop and the position of the front end of the wrist element 28 of the multiarticulated robot 12 and the relative position of the front end of the movable electrode 30 with respect to the front end of the counter electrode 32 when judging that the movable electrode 30 and the welding workpiece W have contacted will end up differing. Therefore, when positioning of the movable electrode 30 and the counter electrode 32 of the spot welding gun 14 is the final object, to correct this continued running of the multiarticulated robot 12, the multiarticulated robot 12 may be made to move and the servo motor 34 may be made to rotate to the position when it is judged that the movable electrode 30 and the welding workpiece W have contacted each other.

Embodiment B2

Referring to FIG. 29, a B2-th embodiment of method of detection of the welding workpiece position of the present invention will be explained. In the B2-th embodiment as well, like in the B1-th embodiment, in a spot welding system 10 shown in FIG. 1, the servo motor 34 is used to make the movable electrode 30 move in a direction making it approach the counter electrode 32 at a predetermined speed Vg while the multiarticulated robot 12 is used to hold the spot welding gun 14 and make it move relative to a welding workpiece W fixed to a workpiece table (not shown) at the same speed Vr as the speed Vg in a direction making them approach. However, the B2-th embodiment controls the speed of movement or acceleration of the spot welding gun 14 by the multiarticulated robot 12 to constantly match the speed of movement and acceleration of the movable electrode 30 to thereby automatically make the multiarticulated robot 12 stop and detects when the multiarticulated robot 12 has stopped so as to detect the point when the speed of movement of the movable electrode 30 decreases or when the acceleration of the movable electrode 30 changes from 0 to a negative value.

The steps S200 to S208 of the B2-th embodiment are respectively exactly the same as S100 to S108 of the B1-th embodiment, so here the explanations will be omitted. Only the different steps will be explained. In the B2-th embodiment as well, as shown in FIG. 15, the servo motor 34 is used to make the movable electrode 30 move in a direction making it approach the counter electrode 32 at a predetermined speed Vg from the state when the movable electrode 30 is positioned to be contiguous with the surface of the welding workpiece W at the movable electrode side, the multiarticulated robot 12 is used to make the spot welding gun 14 and welding workpiece W move relatively at a speed Vr equal to the speed Vg in a direction making the counter electrode 32 and the welding workpiece W approach from a separated state, at least one of the speed of movement and acceleration of the movable electrode is monitored, and, if necessary at this time, the servo motor 34 driving the movable electrode 30 and the servo motors driving the axes of the multiarticulated robot 12 are set with torque limits (steps S200 to S208). That is, while holding the state when the movable electrode 30 is contiguous with the welding workpiece W, the counter electrode 32 is made to approach the welding workpiece W and simultaneously at least one of the speed of movement and acceleration of the movable electrode 30 is monitored. The speed of movement and acceleration of the movable electrode 30 may be directly measured or may be found from the rotational speed and rotational acceleration of the servo motor 34 driving the movable electrode 30. At the time of monitoring, the information of the speed of movement or acceleration of the movable electrode 30 or the rotational speed or rotational acceleration of the servo motor 34 and the position data of the front end of the wrist element 28 of the multiarticulated robot 12 and the relative position data of the movable electrode 30 with respect to the counter electrode 32 are successively recorded for each sampling time.

On the contrary, in the B2-th embodiment, unlike the B1-th embodiment, the robot control device 16 controls the speed of movement or acceleration of the spot welding gun 14 due to the multiarticulated robot 12, that is, the speed of movement or acceleration of the counter electrode 32, so as to match with the speed of movement or acceleration of the movable electrode 30 with respect to the counter electrode 32 due to the servo motor 34 (step S210).

If the counter electrode 32 contacts the welding workpiece W while maintaining the state where the movable electrode 30 is contiguous with the welding workpiece W, the movable electrode 30 and counter electrode 32 clamp the welding workpiece W between them and movement of the movable electrode 30 with respect to the counter electrode 32 is obstructed. This being the case, since the servo motor 34 is controlled to maintain the speed of movement Vg constant, it tries to output a larger torque, but it reaches the output limit of the servo motor 34 whereupon the rotational speed of the servo motor 34 driving the movable electrode 30 decreases. As a result, the set speed Vg can no longer be maintained and the speed of movement of the movable electrode 30 with respect to the counter electrode 32 decreases from a predetermined value Vg and becomes 0. Further, at this time, the acceleration of the movable electrode 30 with respect to the counter electrode 32 changes from 0 to a negative value.

Furthermore, in this embodiment, the speed of movement of the spot welding gun 14 and its counter electrode 32 by the multiarticulated robot 12 is controlled so as to match the speed of movement of the movable electrode 30 with respect to the counter electrode 32, so the speed of movement of the spot welding gun 14 and its counter electrode 32 by the multiarticulated robot 12, that is, the speed of movement of the front end of the wrist element 28 of the multiarticulated robot 12, decreases from the speed Vr (=Vg) and becomes 0 along with the decrease of the speed of movement of the movable electrode 30 with respect to the counter electrode 32. Further, in the case of controlling the acceleration of the spot welding gun 14 and its counter electrode 32 by the multiarticulated robot 12 so as to match the acceleration of the movable electrode 30 with respect to the counter electrode 32 as well, along with the decrease in the acceleration of the movable electrode 30 with respect to the counter electrode 32, the acceleration of the spot welding gun 14 and its counter electrode 32 by the multiarticulated robot 12, that is, the acceleration of the front end of the wrist element 28 of the multiarticulated robot 12, decreases. That is, finally, the movable electrode 30 and counter electrode 32 clamp the welding workpiece W and stop. Therefore, it is judged if the speed of movement of the front end of the wrist element 28 of the multiarticulated robot 12 has become 0 (step S212), when becoming 0, the surface position of the welding workpiece W at the counter electrode side is detected based on the position data of the front end of the wrist element 28 of the multiarticulated robot 12 and the relative position data of the front end of the counter electrode 32 of the spot welding gun 14 with respect to the wrist element 28 when the movable electrode 30 and counter electrode 32 have stopped, and the process of detection of the surface position of the welding workpiece W is ended (step S214).

Figure 30A:
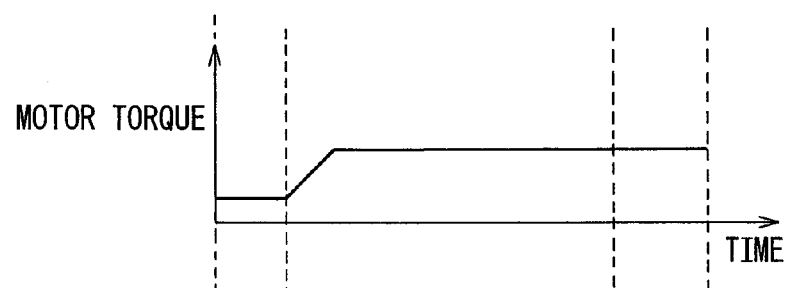
FIG. 30 are graphs showing the changes along with time of the torque of a servo motor and a rotational speed of a servo motor (or speed of movement of the movable electrode) and a speed of movement of a multiarticulated robot when working a B2-th embodiment of a method of detection of the welding workpiece position of the present invention.
Figure 30B:
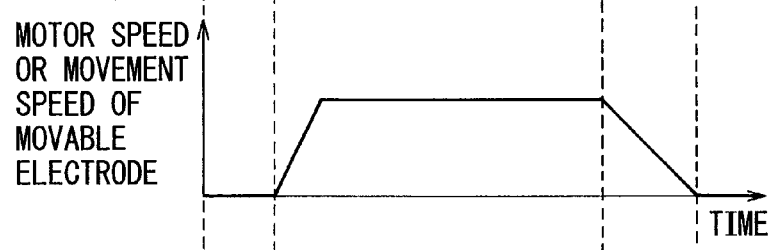
Figure 30C:
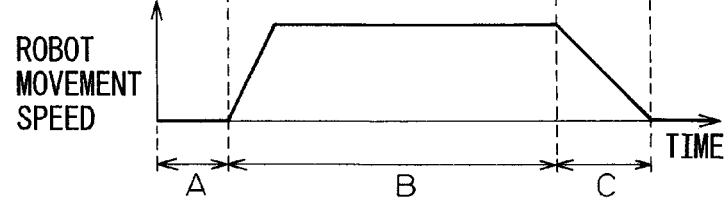
Figure 31A:
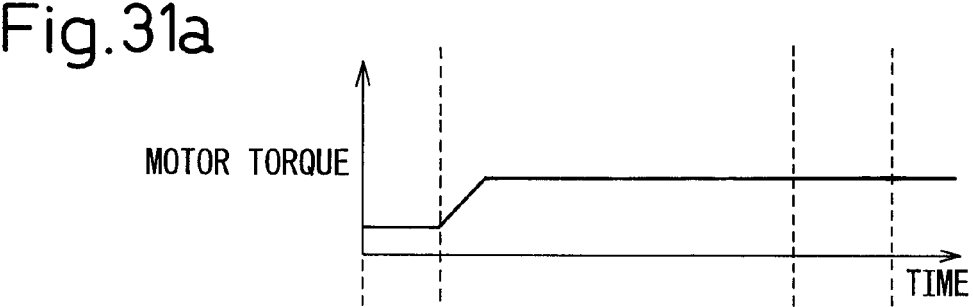
FIG. 31 are graphs showing the changes along with time of the torque of a servo motor and a rotational acceleration of a servo motor (or acceleration of the movable electrode) and an acceleration of a multiarticulated robot when working a B2-th embodiment of a method of detection of the welding workpiece position of the present invention.
Figure 31B:
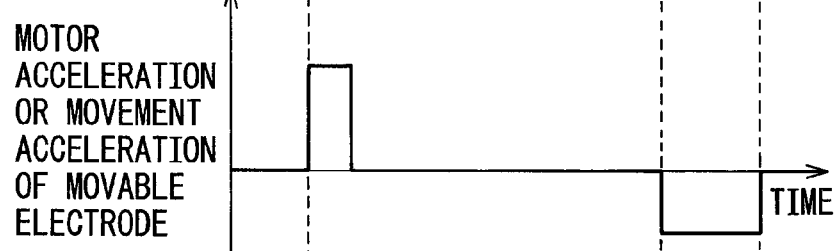
Figure 31C:
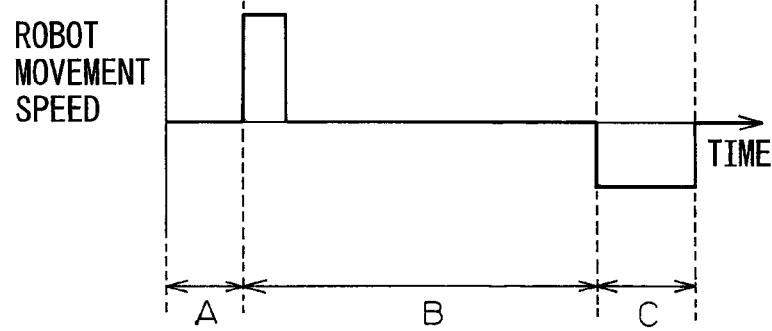

FIG. 30 show graphs expressing changes of the torque and rotational speed of the servo motor 34 and the change of the speed of movement of the front end of the write element 28 of the multiarticulated robot by time series when detecting the surface of the welding workpiece W at the counter electrode side which the counter electrode 32 contacts in accordance with the present embodiment. FIG. 30A is a graph of the torque of the servo motor 34, FIG. 30B is a graph of the rotational speed of the servo motor 34, and FIG. 30C is a graph of the speed of movement of the front end of the wrist element 28 of the multiarticulated robot 12. Furthermore, FIG. 31 show graphs expressing changes of the torque and rotational acceleration of the servo motor 34 and the change of acceleration of the front end of the write element 28 of the multiarticulated robot by time series when detecting the surface of the welding workpiece W at the counter electrode side which the counter electrode 32 contacts in accordance with the present embodiment. FIG. 31A is a graph of the torque of the servo motor 34, FIG. 31B is a graph of the rotational acceleration of the servo motor 34, and FIG. 31C is a graph of the acceleration of the front end of the wrist element 28 of the multiarticulated robot 12. Note that, the graph showing the change of the speed of movement of the movable electrode 32 with respect to the counter electrode 32 by a time series also becomes similar to FIG. 30B, while the graph showing the change of the acceleration of the movable electrode 32 with respect to the counter electrode 32 by a time series also becomes similar to FIG. 31B. Further, in FIG. 30 and FIG. 31, the zone A shows the state when the detection operation is not being performed, the zone B shows the state during the detection operation when the movable electrode 30 still does not contact the welding workpiece W, and the zone C shows the state during the detection operation when the movable electrode 30 contacts the welding workpiece W.

Before the start of the detection operation, the movable electrode 30 is stationary with respect to the counter electrode 32. It is not driven by the servo motor 34 and the multiarticulated robot 12 is not driven. Therefore, at the zone A, the torque of the servo motor 34 becomes constant, the rotational speed and rotational acceleration become 0, and the speed of movement and acceleration of the front end of the wrist element 28 of the multiarticulated robot 12 also become 0. On the contrary, when the detection operation is started, the movable electrode 30 is made to move with respect to the counter electrode 32 at the speed Vg. The multiarticulated robot 12 is used to make the spot welding gun 14 and the counter electrode 32 move with respect to the counter electrode 32 at the same speed as the speed of movement Vg of the movable electrode 30. Therefore, at the zone B, the torque and rotational speed of the servo motor 43 increase until the speed of movement of the movable electrode 30 with respect to the counter electrode 32 reaches the speed Vg, then both become constant when it reaches Vg. Further, the speed of movement of the front end of the wrist element 28 of the multiarticulated robot 12 increases up to the speed Vg then becomes constant. Therefore, the rotational acceleration of the servo motor 34 increases until the speed of movement of the movable electrode 30 with respect to the counter electrode 32 reaches Vg, then becomes 0 when it reaches Vg. Further, the acceleration of the front end of the wrist element 28 of the multiarticulated robot 12 behaves similarly. Furthermore, at the zone C, if the counter electrode 32 contacts the welding workpiece W in the state where maintaining the state when the movable electrode 30 contacts the welding workpiece W, the movable electrode 30 and counter electrode 32 clamp the welding workpiece W between them and movement of the movable electrode 30 with respect to the counter electrode 32 is obstructed. As a result, the servo motor 34 is controlled so that the servo motor 34 maintains the speed of movement Vg constant. The increase of the torque of the servo motor 34 finally reaches the output limit or torque limit of the motor, then the torque becomes constant.

FIG. 30A shows the case where the torque limit of the servo motor 34 is set to a value equal to the torque of the servo motor 34 at the zone B (that is, the torque of the servo motor 34 becoming necessary for making the movable electrode 30 move with respect to the counter electrode 32 at the speed Vg in the state with almost no load). At the zone B and the zone C, the torque of the servo motor 34 is substantially a constant value. On the contrary, the speed of movement of the movable electrode 30 with respect to the counter electrode 32 decreases from the predetermined value Vg and finally becomes 0 whereupon the movable electrode 30 stops with respect to the counter electrode 32, so the rotational speed of the servo motor 34 driving the movable electrode 30 also, as shown in FIG. 30B, decreases from a predetermined value and finally becomes 0 whereupon the servo motor 34 stops. Further, the speed of movement of the front end of the wrist element 28 of the multiarticulated robot 12 matches with the speed of movement of the movable electrode 30 with respect to the counter electrode 32, so decreases from the predetermined value Vg and finally becomes 0 whereupon the multiarticulated robot 12 also stops. Similarly, the acceleration of the movable electrode 30 with respect to the counter electrode 32 changes from 0 to a negative value and finally again becomes 0 whereupon the movable electrode 30 stops with respect to the counter electrode 32, so the rotational speed of the servo motor 34 driving the movable electrode 30, as shown in FIG. 31B, also changes from 0 to a negative value and again becomes 0 whereupon the servo motor 34 stops. Further, the speed of movement of the front end of the wrist element 28 of the multiarticulated robot 12 matches with the acceleration of the movable electrode 30 with respect to the counter electrode 32, so changes from 0 to a negative value and again becomes 0 whereupon the multiarticulated robot 12 also stops.

As explained above, by setting the servo motor 34 with a torque limit, it is possible to prevent the welding workpiece W from being excessively deformed when the movable electrode 30 presses the welding workpiece W. Further, when the counter electrode 32 contacts the welding workpiece W, the movable electrode 30 is decelerated faster and the delay in the detection of the point of time when the counter electrode 32 contacts the welding workpiece W can be reduced. Furthermore, if setting torque limits for the servo motors driving the axes J1 to J5 of the multiarticulated robot 12, it is possible to prevent the welding workpiece W from being excessively deformed when the counter electrode 32 of the spot welding gun 14 moved by the multiarticulated robot 12 presses the welding workpiece W.

Further, the speed of movement of the spot welding gun 14 and its counter electrode 32 by the multiarticulated robot 12 is controlled so as to match the speed of movement of the movable electrode 30 with respect to the counter electrode 32, so the counter electrode 32 contacts the welding workpiece W and the movable electrode 30 and counter electrode 32 clamp the welding workpiece W between them. If the movable electrode 30 stops with respect to the counter electrode 32, the operation of the multiarticulated robot 12 also stops. Therefore, it is judged that the counter electrode 32 contacts the welding workpiece W when the movement of the movable electrode 30 with respect to the counter electrode 32 or movement of the multiarticulated robot 12 stops, whereby, like in the B1-th embodiment, it is no longer necessary to detect the point of time when the speed of movement of the movable electrode 30 or the rotational speed of the servo motor 34 with respect to the counter electrode 32 changes from a substantially constant state to a decrease. As a result, it is no longer necessary to determine by experiments in advance the various threshold values required for identifying the point of time when the speed of movement of the movable electrode 30 or the rotational speed of the servo motor 34 changes from a substantially constant state to a decrease like in the B1-th embodiment. Further, it becomes possible to detect the surface position of the welding workpiece W at the counter electrode side which the counter electrode 32 contacts without depending on the rigidity of the welding workpiece W, multiarticulated robot 12, and spot welding gun 14. Furthermore, finally, the movable electrode 30 and counter electrode 32 stop in a state contacting the welding workpiece W, so it becomes easy to measure the thickness t of the welding workpiece W from the positions of the front ends of the movable electrode 30 and counter electrode 32 at this time. The same applies in the case of controlling the acceleration of the spot welding gun 14 and its counter electrode 32 by the multiarticulated robot 12 so as to match the acceleration of the movable electrode 30 with respect to the counter electrode 32.

Above, the present invention was explained based on illustrated embodiments, but the present invention is not limited to the above-mentioned embodiments. For example, in the above embodiments, the speed of movement or acceleration of the movable electrode 30 was monitored and simultaneously the position data of the front end of the wrist element 28 of the multiarticulated robot 12 and the relative position data of the movable electrode 30 with respect to the counter electrode 32 were recorded. However, the multiarticulated robot 12 and movable electrode 30 operate based on operating instructions in a time series from the robot control device 16 and spot welding gun control device 18, so it is also possible to find the position data of the front end of the wrist element 28 of the multiarticulated robot 12 and the relative position data of the movable electrode 30 with respect to the counter electrode 32 of a time in the past from the executed operating instructions of the multiarticulated robot 12 and movable electrode 30.

Next, the aspect C will be explained.

In the method of detection of the welding workpiece position according to the present invention, the servo motor 34 driving the movable electrode 30 is set with a torque limit. In that state, the servo motor 34 is used to drive the movable electrode 30 at the speed Vg or the multiarticulated robot 12 is used to make the welding workpiece W and spot welding gun 14 move relatively at the speed Vr to thereby make the welding workpiece W and the movable electrode 30 of the spot welding gun 14 move relatively to make them approach from a separated state. During the relative movement, at least one of the speed of movement and acceleration of the movable electrode 30 with respect to the counter electrode is monitored. It is judged that the movable electrode 30 contacts the welding workpiece W when the speed of movement or acceleration of the movable electrode 30 with respect to the counter electrode 32 changes. The position of the surface of the welding workpiece W is found based on the position data of the front end of the wrist element 28 of the multiarticulated robot 12 and the relative position data of the movable electrode 30 with respect to the counter electrode 32 of the spot welding gun 14 at that time.

Here, in the state of setting the servo motor 34 driving the movable electrode 30 with a torque limit, using the servo motor 34 to drive the movable electrode 30 at the speed Vg or using the multiarticulated robot 12 to make the welding workpiece W and spot welding gun 14 move relatively at the speed Vr is preferable for finding the position of the surface of the welding workpiece W.

Note that, the "torque limit" in the present application means the function of limiting the rise in the torque of the servo motor 34 in the positive direction when defining the direction of making the movable electrode 30 approach the counter electrode 32 or welding workpiece W as the positive direction. In other words, by the torque limit, at the positive direction rotation side, the rise of the absolute value of the torque of the servo motor 34 is limited, while at the negative direction rotation side, the decrease of the absolute value of the torque of the servo motor 34 is limited. Further, the speed of movement and acceleration of the movable electrode 30 with respect to the counter electrode 32 may be measured directly or may be found from the servo motor 34 driving the movable electrode 30. Furthermore, monitoring of the speed of movement and acceleration of the movable electrode 30 with respect to the counter electrode 32 is equivalent to monitoring the rotational speed and rotational acceleration of the servo motor 34 for driving the movable electrode 30. Monitoring the speed of movement and acceleration of the movable electrode 30 with respect to the counter electrode 32 is therefore deemed to include monitoring of the rotational speed and rotational acceleration of the servo motor 34 for driving the movable electrode 30.

The position of the surface of the welding workpiece W at the movable electrode side is found as the position of the front end of the movable electrode 30 when the movable electrode 30 contacts the welding workpiece W. The position data of the front end of the movable electrode 30 is for example found as follows based on the position data of the front end of the wrist element 28 of the multiarticulated robot 12 and the relative position data of the movable electrode 30 with respect to the counter electrode 32 in the spot welding gun 14.

The distance from the floor surface to the horizontal axial line J2 of the turret 22 supported on the pedestal 20, the interaxial distance between the vertical axial line J1 and horizontal axial line J2, the interaxial distance between the horizontal axial line J2 and horizontal axial line J3, and the interaxial distance between the horizontal axial line J3 and the axial line J4 are constant, so the position of the front end of the wrist element 28 of the multiarticulated robot 12 can be found from the rotational angles of the axes of the multiarticulated robot 12. Further, the relative position of the front end of the movable electrode 30 with respect to the front end of the counter electrode 32 of the spot welding gun 14 can be found from the rotational angle of the servo motor 34 driving the movable electrode 30, while the position from the front end of the wrist element 28 of the multiarticulated robot 12 to the front end of the counter electrode 32 of the spot welding gun 14 is fixed. Therefore, the position data of the front end of the counter electrode 32 of the spot welding gun 14 can be found from the position data of the front end of the wrist element 28 of the multiarticulated robot 12 and the positional relationship between the front end of the wrist element 28 of the multiarticulated robot 12 and the front end of the counter electrode 32 of the spot welding gun 14, while the position data of the front end of the movable electrode 30 can be found from the found position data of the front end of the counter electrode 32 of the spot welding gun 14 and the relative position data of the front end of the movable electrode 30 with respect to the front end of the counter electrode 32 of the spot welding gun 14.

As explained above, the method of detection of the welding workpiece position according to the present invention makes the movable electrode 30 and welding workpiece W move relative to each other from the separated state and, during the relative movement, rather than monitoring the current or torque of the servo motor driving the multiarticulated robot 12 or the current or torque of the servo motor 34 driving the movable electrode 30 like in the prior art, monitors at least one of the speed of movement and acceleration of the movable electrode 30 with respect to the counter electrode 32.

Both when using the servo motor 34 to drive the movable electrode 30 at the speed Vg and thereby make the movable electrode 30 approach the welding workpiece W and when not using the servo motor 34 to drive the movable electrode 30, but using the multiarticulated robot 12 make the spot welding gun 14 move relative to the welding workpiece W at the speed Vr and thereby make the movable electrode 30 approach the welding workpiece W, the movable electrode 30 receives a reaction force from the welding workpiece W when the movable electrode 30 contacts the welding workpiece W from a state separated from the welding workpiece W. As a result, when the movable electrode 30 is driven by the servo motor 34, if the movable electrode 30 contacts the welding workpiece W, the torque of the servo motor 34 is used to counter the reaction force from the welding workpiece W and reaches the output limit of the servo motor 34, the speed of movement of the movable electrode 30 decreases from Vg, and the acceleration of the movable electrode 30 changes from 0 to a negative value. Further, when the spot welding gun 14 is moved by the multiarticulated robot 12 relative to the welding workpiece W and the movable electrode 30 is not driven by the servo motor 34, if the movable electrode 30 contacts the welding workpiece W, to maintain the movable electrode 30 in the stationary state against the reaction force from the welding workpiece W, it is attempted to make the torque increase in the positive direction (direction making the movable electrode 30 approach the counter electrode 32), but the torque of the servo motor 34 reaches the output limit of the servo motor 34, the stationary state of the movable electrode 30 can no longer be maintained, the movable electrode 30 is pressed back from the welding workpiece W by the speed of movement Vr of the multiarticulated robot 12, and the movable electrode 30 moves in a direction separating from the counter electrode 32 (negative direction). In other words, the speed of movement of the movable electrode 30 decreases from 0 to change to a negative value and the acceleration of the movable electrode 30 changes from 0 to a negative value. Therefore, if monitoring the speed of movement or acceleration of the movable electrode 30 with respect to the counter electrode 32 and detecting when the speed of movement of the movable electrode 30 with respect to the counter electrode 32 changes from a constant value to a decrease or when the acceleration of the movable electrode 30 with respect to the counter electrode 32 changes from 0 to a negative value, it is possible to detect that the movable electrode 30 contacts the welding workpiece W.

Further, if setting the servo motor 34 with a torque limit, in the above-mentioned case, when the movable electrode 30 contacts the welding workpiece W, the torque of the servo motor 34 will reach the torque limit before reaching the output limit of the servo motor 34, so the change of the speed of movement and acceleration of the movable electrode 30 with respect to the counter electrode 32 will become more marked. Therefore, detection of contact will become easier. Furthermore, at least one of the speed of movement and acceleration of the movable electrode 30 with respect to the counter electrode 32 is monitored to detect contact of the welding workpiece W and movable electrode 30. The speed of movement and acceleration of the movable electrode 30 with respect to the counter electrode 32 become resistant to the effects of fluctuation or variation of the current or torque of the servo motor 34 due to the mechanical resistance of the spot welding gun 14 due to speed control, so it becomes possible to suppress the influence of the mechanical resistance of the spot welding gun 14 on the precision of detection of contact and to detect the contact with a high precision. In this way, it is preferable to set the servo motor 34 with a torque limit, so below the explanation will be given with reference to the case of setting the servo motor 34 with a torque limit.

The set value of the torque limit of the servo motor 34 is preferably determined based on the torque of the servo motor 34 during an operation using the servo motor 34 to drive the movable electrode 30 or using the multiarticulated robot 12 to make the welding workpiece W and spot welding gun 14 move relatively and thereby make the movable electrode 30 approach the welding workpiece W from a state when the welding workpiece W and movable electrode 30 are separated (that is, when the movable electrode 30 approaches the welding workpiece W in a state separated from the welding workpiece W).

The timing of determining the set value of the torque limit of the servo motor 34 may be any time while performing an operation making the movable electrode 30 approach the welding workpiece W in a state separated from the welding workpiece W, that is, in a zone after the start of relative movement between the welding workpiece W and movable electrode 30 and before contact of the welding workpiece W and movable electrode 30 (hereinafter referred to as the "preparatory operation zone"). Typically, right after the start of the operation for making the movable electrode 30 approach the welding workpiece W, the movable electrode 30 is still not contiguous with the welding workpiece W, so it is sufficient to determine the value of the torque limit based on the torque output of the servo motor 34 at that time. Further, before setting the value of the torque limit, to prevent the movable electrode 30 from contacting the welding workpiece W, preferably the movable electrode 30 and the welding workpiece W are separated to secure a sufficient distance of the preparatory operation zone, then the detection operation is started.

Furthermore, when it is judged that the movable electrode 30 does not contact the welding workpiece W even if a predetermined time elapses when performing an operation where the movable electrode 30 is made to approach the welding workpiece W in the preparatory operation zone, it is possible to reset the value of the torque limit of the servo motor 34 based on the torque output of the servo motor 34 within that predetermined time. If shortening this predetermined time, it is possible to periodically update the set value of the torque limit.

Further, inside of the drive mechanism (not shown) for the movable electrode of the spot welding gun 14, there are various parts contacting each other. Friction occurs between two contacting objects. The friction generated between such two contacting objects includes static friction occurring between objects when objects stationary with respect to each other start to be moved and dynamic friction occurring between objects moving with respect to each other. As shown in FIG. 5, when the relative sliding speed of two objects is near 0, the static friction becomes dominant. If the absolute value of the relative sliding speed becomes larger, the region of dominance of the static friction is left and a region of dominance of dynamic friction where the frictional force is proportional to the relative sliding speed is reached. Further, in general, the static friction when making objects stationary with respect to each other start to move becomes larger than the dynamic friction when the objects start to move.

The characteristics of these frictions have an effect on the behavior of the movable electrode 30, the setting of the torque limit, and the precision of detection of contact. That is, dynamic friction becomes mechanical resistance when using the servo motor 34 to make the movable electrode 30 move, and causes variation in the torque of the servo motor 34, and causes instability of the torque of the servo motor 34. Due to such variation of the torque, the torque when maintaining the speed of movement of the movable electrode 30 constant does not become completely constant, but fluctuates somewhat. Therefore, to make it possible to make the movable electrode 30 move at a constant speed, it is necessary to consider the fluctuation of the torque and set the value of the torque of the servo motor 34 measured in the preparatory operation zone plus somewhat of an extra margin as the value of the torque limit of the servo motor 34. However, such an extra margin delays the time when the torque reaches a set value of the torque limit when the welding workpiece W and movable electrode 30 contact, so delays the time when the contact of the welding workpiece W and the movable electrode 30 appears as a change of the speed of movement and acceleration of the movable electrode 30 and becomes a cause of deterioration of the sensitivity of the contact detection. Further, static friction becomes mechanical resistance when the movable electrode 30 contacts the welding workpiece W and starts to move. It becomes a cause whereby when the movable electrode 30 contacts the welding workpiece W, the reaction force received from the welding workpiece W is lost and is no longer transmitted to the servo motor 34. This forms an insensitive zone where the torque of the servo motor 34 will not fluctuate much at all regardless of the movable electrode 30 contacting the welding workpiece W and delays the time when torque of the servo motor 34 reaches the set value of the torque limit and the movable electrode 30 starts movement when the movable electrode 30 contacts the welding workpiece W.

On the contrary, if driving the movable electrode 30 by the servo motor 34, the effect of dynamic friction will be felt, but the effect of static friction can be eliminated. If not driving the movable electrode 30 by the servo motor 34 and leaving it stationary, the effect of static friction will be felt, but the effect of dynamic friction can be eliminated. Therefore, depending on whether it is desired to eliminate the effect of dynamic friction or eliminate the static friction, when making the welding workpiece W and the movable electrode 30 of the spot welding gun 14 move relative to each other so as to approach from a separated state, it is possible to suitably select whether to use the servo motor 34 to drive the movable electrode 30 with respect to the counter electrode 32 at the speed Vg or to use the multiarticulated robot 12 to make the welding workpiece W and spot welding gun 14 move relative to each other at the speed Vr.

Furthermore, in the method of detection of the welding workpiece position of the present invention, a worker may proceed step by step by manual operation, but the spot welding system 10 may also automatically execute a series of steps. For example, in a spot welding program in which all welding strike positions and program instructions for spot welding are already taught, by activating the mode where the above steps are automatically executed and playing the spot welding program and by executing program instructions automatically making the multiarticulated robot 12 move to be contiguous with the welding strike positions and perform spot welding, it is possible to automatically perform the above steps and detect the position of the surface of the welding workpiece W at the movable electrode side, use the detected position as the basis to correct the strike teaching position data for the welding workpiece W, and, furthermore, record the amount of correction (amount of deviation) in the robot control device 16. It is also possible to display the recorded amount of correction on a teaching control panel provided at the robot control device 16. Further, when the recorded amount of correction is excessively large, it is possible to deem this as an abnormality of the position of the welding workpiece W, raise an alarm at the teaching control panel provided at the robot control device 16, or raise an alarm at a line control console or computer or other external control device able to communicate with the robot control device 16.

Note that, in the method of detection of the welding workpiece position of the present invention, it is sufficient to be able to make the welding workpiece W move relative to the movable electrode 30. The relative movement of the welding workpiece W and the movable electrode 30 may be performed by the servo motor 34 or may be performed by the multiarticulated robot 12, but below, for simplification of the explanation, as shown in FIG. 1, the explanation is given with reference to the example of the case of holding the spot welding gun 14 by the multiarticulated robot 12 and making it move relative to the welding workpiece W. However, as shown in FIG. 2, it is also possible to have the welding workpiece W held by the multiarticulated robot 12 moved relative to the spot welding gun 14. In this case, in the following explanation, the multiarticulated robot 12 may also be used to make the welding workpiece W move instead of making the spot welding gun 14 move.

Embodiment C1

Figure 32:
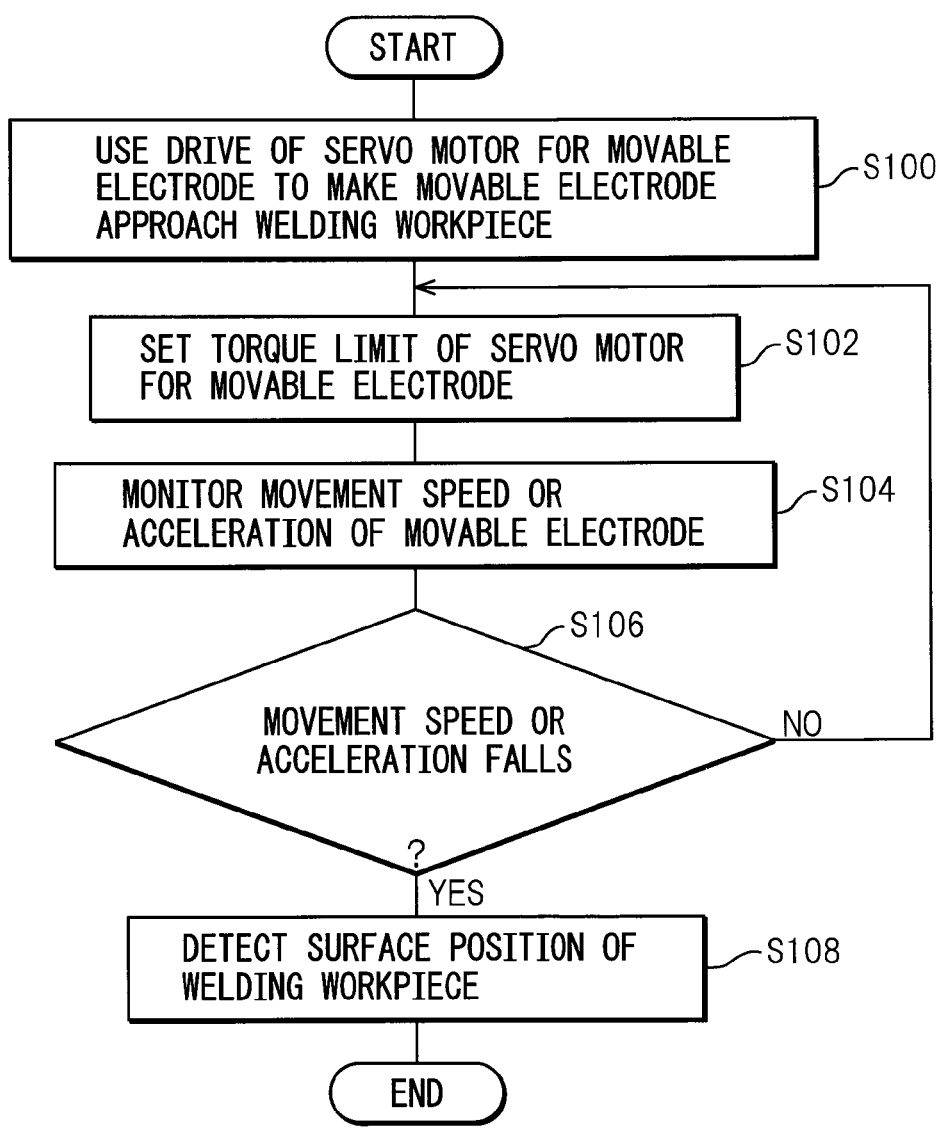
FIG. 32 is a flowchart of a method of driving a movable electrode of a spot welding gun by a servo motor to make it approach a welding workpiece from a state separated from the welding workpiece and thereby detect the surface position of the welding workpiece.

Referring to FIG. 32 and FIG. 33, a C1-th embodiment of a method of detection of the welding workpiece position of the present invention will be explained. In the C1-th embodiment, in a spot welding system 10 shown in FIG. 1, as shown in FIG. 33, the speed Vr by which the multiarticulated robot 12 is used to make the spot welding gun 14 move relative to the welding workpiece W is made 0 and the servo motor 34 is used to make the movable electrode 30 move in a direction making it approach the counter electrode 32 by a predetermined speed Vg so as to make the welding workpiece W fixed to the workpiece table (not shown) and the movable electrode 30 of the spot welding gun 14 held by the multiarticulated robot 12 move relatively at the speed Vg so as to make them approach from the separated state.

In this embodiment, first, the welding workpiece W is made to move between the movable electrode 30 and the counter electrode 32 of the spot welding gun 14, and the spot welding gun 14 is positioned at a position so as to contact a welding location (strike position) on the welding workpiece W when the movable electrode 30 and counter electrode 32 are closed. Note that, at this time, to prevent the movable electrode 30 and welding workpiece W from approaching too much, preferably the movable electrode 30 is positioned at a position a certain extent of distance away from the surface of the welding workpiece W to secure a preparatory operation zone. Further, the movable electrode 30 may be positioned at a welding location on the welding workpiece W, then the movable electrode 30 made to move to separate from the welding workpiece W by exactly any distance in the same way as well.

Then, as shown in FIG. 33, in the state when Vr=0 is set and the multiarticulated robot 12 is made stationary, the servo motor 34 is used to drive the movable electrode 30 and make it move in a direction making it approach the counter electrode 32 at a predetermined speed Vg so as to make the welding workpiece W fixed at the workpiece table (not shown) and the movable electrode 30 of the spot welding gun 14 move relatively at the speed Vg so as to approach each other from the separated state (step S100).

Then, the torque limit of the servo motor 34 driving the movable electrode 30 is set (step S102). The set value of the torque limit of the servo motor 34 is set so that the torque required for making the movable electrode 30 move with respect to the counter electrode 32 at the speed Vg in the state where the movable electrode 30 does not contact the welding workpiece W can be sufficiently output from the servo motor 34.

For example, at step S100 on, the operation for making the movable electrode 30 approach the welding workpiece W at a predetermined speed Vg is performed. The servo motor 34 outputs the torque necessary for the operation of making the movable electrode 30 approach the welding workpiece W at the speed Vg. Therefore, if measuring the torque of the servo motor 34 output in the preparatory operation zone after the start of relative movement of the welding workpiece W and movable electrode 30 and before contact of the welding workpiece W and movable electrode 30 and setting the measured value of the torque as the value of the torque limit of the servo motor 34, when the movable electrode 30 contacts the welding workpiece W, the servo motor 34 will no longer be able to counter the reaction force from the welding workpiece W and the movable electrode 30 will immediately no longer be able to maintain the speed Vg which is the speed during the approach operation (including stopped state, that is, speed 0). Due to this, the change of the speed or acceleration of the movable electrode 30 when the movable electrode 30 contacts the welding workpiece W appears more markedly, so contact can be detected with a higher sensitivity. However, in practice, due to the mechanical resistance of the spot welding gun 14 (dynamic friction of drive mechanism, elastic deformation of conductive parts connecting the moving parts and welding transformer, etc.), the torque of the servo motor 34 will fluctuate somewhat. Considering this, to enable the movable electrode 30 to be made to move at a constant speed Vg, it is necessary to set a value of the torque of the servo motor 34 measured at the preparatory operation zone plus somewhat of an extra margin as the value of the torque limit of the servo motor 34. Note that, if adding an excessive extra margin, at the time of contact of the welding workpiece W and movable electrode 30, there will be a delay in the torque reaching the set value of the torque limit, so as a result the sensitivity of detection of contact will deteriorate. Therefore, it is preferable to set a value of the torque limit plus a suitable extra margin. Further, as the set value of the torque limit, experiments etc. may be used to set a predetermined value.

Figure 35A:
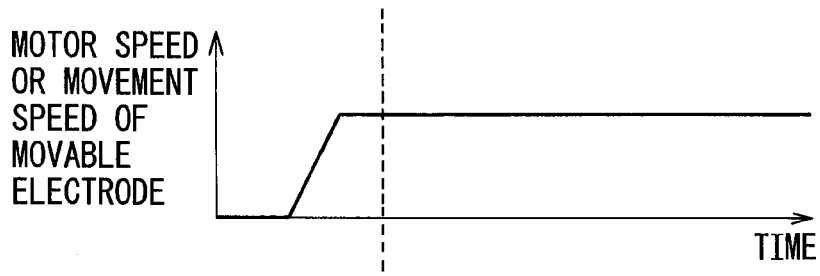
FIG. 35 are explanatory views showing a timing of setting a torque limit of a servo motor when using a servo motor to make a movable electrode of a spot welding gun approach a welding workpiece and the servo motor overshoots.
Figure 35B:
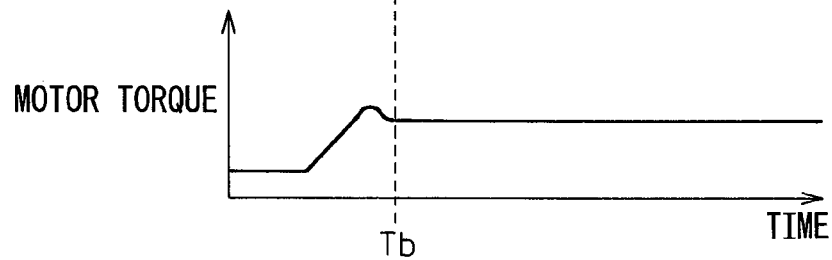

When setting the value of the torque limit of the servo motor 34 based on the torque of the servo motor 34 output in the preparatory operation zone, the timing of determining the value of the torque limit of the servo motor 34 may be any time in the preparatory operation zone in the state when the movable electrode 30 is separated from the welding workpiece W and is moving with respect to the counter electrode 32 at the speed Vg. Typically, as shown in FIG. 34, the speed of movement of the movable electrode 30 with respect to the counter electrode 32 may be set the value of the torque limit based on the torque output of the servo motor 34 at the time Ta when the speed of movement of the movable electrode 30 with respect to the counter electrode 32 reaches the predetermined speed Vg and on. However, right after the start of movement, the servo motor 34 has just started the acceleration operation. As shown in FIG. 35A and FIG. 35B, even if the speed of movement of the movable electrode 30 reaches Vg, the torque output of the servo motor 34 is unstable and overshoot sometimes occurs. Therefore, as shown in FIG. 35A and FIG. 35B, preferably the value of the torque limit of the servo motor 34 is determined based on the torque at the time Tb when the torque output of the servo motor 34 stabilizes after the elapse of a predetermined time from the start of movement. Note that, before setting the value of the torque limit, to prevent the movable electrode 30 from being contiguous with the welding workpiece, preferably the movable electrode 30 and the welding workpiece W are separated to secure a sufficient distance of the preparatory operation zone, then the detection operation is started.

Figure 36A:
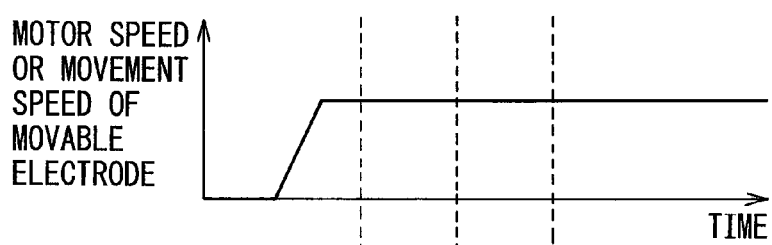
FIG. 36 are explanatory views showing various patterns of change along with time taken by a torque of a servo motor due to the mechanical resistance of the spot welding gun when making a servo motor rotate for making a movable electrode move.
Figure 36B:
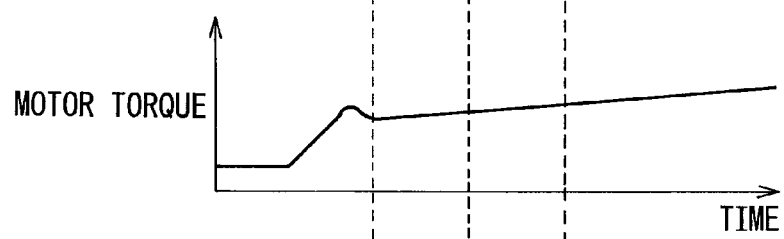
Figure 36C:
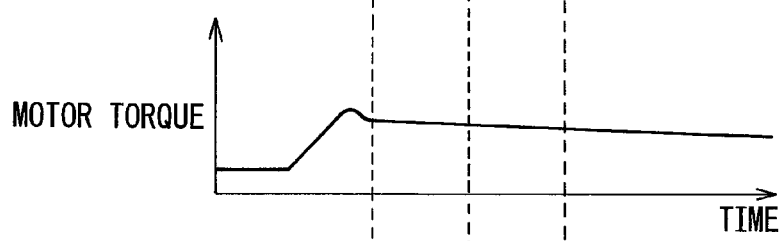
Figure 36D:
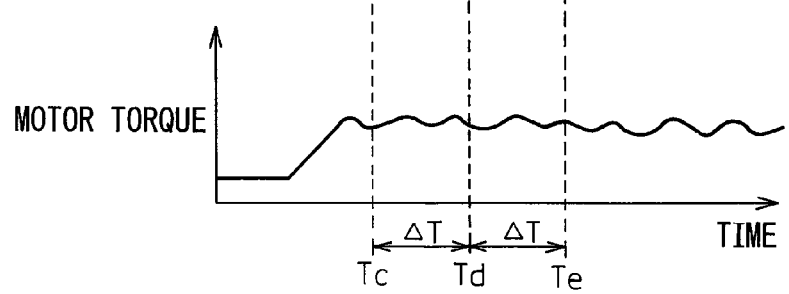

Furthermore, if it is judged that the counter electrode 32 and the welding workpiece W do not contact even after the elapse of a predetermined time when the movable electrode 30 is moving with respect to counter electrode 32 at the speed Vg, it is possible to determine the value of the torque limit based on the torque output of the servo motor 34 in that predetermined time. If shortening this predetermined time, it is possible to periodically update the set value of the torque limit every certain time period. As shown in FIG. 36A, even when the movable electrode 30 moves relative to the counter electrode 32 by a constant speed, due to the mechanical resistance present at the spot welding gun 14, the torque output of the servo motor 34 does not stabilize at a constant value but gently rises (FIG. 36B), gently falls (FIG. 36C), or varies (FIG. 36D) in some cases. When the torque output of the servo motor 34 does not stabilize at a constant value in this way, periodically updating the set value of the torque limit becomes an effective means. For example, as shown in FIG. 36A to FIG. 36D, if periodically repeating updating of the set value of the torque limit based on the torque of the servo motor 34 at the times Tc, Td, and Te at certain time intervals ΔT, it is possible to easily set a suitable torque limit.

Then, in the state with the servo motor 34 set with a torque limit in this way, at least one of the speed of movement and acceleration of the movable electrode 30 with respect to the counter electrode 32 is monitored (step S104). The speed of movement and acceleration of the movable electrode 30 may be directly measured or may be found from the rotational speed and rotational acceleration of the servo motor 34 driving the movable electrode 30. Further, the speed of movement and acceleration of the movable electrode 30 with respect to the counter electrode 32 are respectively proportional to the rotational speed and rotational acceleration of the servo motor 34 for driving the movable electrode 30, so instead of the speed of movement or acceleration of the movable electrode 30, it is also possible to monitor the rotational speed or rotational acceleration of the servo motor 34 driving the movable electrode 30. At the time of monitoring, the information of the speed of movement or acceleration of the movable electrode 30 or the rotational speed or rotational acceleration of the servo motor 34 and the position data of the front end of the wrist element 28 of the multiarticulated robot 12 and the relative position data of the movable electrode 30 with respect to the counter electrode 32 are successively recorded for each sampling time.

The movable electrode 30 moves relatively to the counter electrode at a preset constant speed Vg after the start of the detection operation, so at this time, the speed of the movable electrode 30 with respect to the counter electrode 32 becomes Vg and the acceleration of the movable electrode 30 with respect to the counter electrode 32 becomes 0. Therefore, the rotational speed of the servo motor 34 becomes constant and the rotational acceleration of the servo motor 34 becomes 0. Further, if the movable electrode 30 contacts the welding workpiece W, the welding workpiece W is pressed by the movable electrode 30 resulting in bending, denting, and other elastic deformation and a reaction force acts from the welding workpiece W to the movable electrode 30. This being the case, the servo motor 34 is controlled to maintain the speed Vg constant and tries to output a larger torque so as to counter the reaction force from the welding workpiece W, but the output torque of the servo motor 34 reaches the torque limit and the rotational speed of the servo motor 34 driving the movable electrode 30 decreases. As a result, the set speed Vg can no longer be maintained and the speed of movement of the movable electrode 30 with respect to the counter electrode 30 decreases from a predetermined value Vg. Along with this, the acceleration of the movable electrode 30 and the rotational acceleration of the servo motor 34 with respect to the counter electrode 32 change from 0 to negative value.

Utilizing this, the speed of movement of the movable electrode 30 with respect to the counter electrode 32 or the rotational speed of the servo motor 34 or the acceleration of the movable electrode 30 with respect to the counter electrode 32 or the rotational acceleration of the servo motor 34 is successively checked (step S106), it is judged that the movable electrode 30 contacts the welding workpiece W when the speed of movement of the movable electrode 30 with respect to the counter electrode 32 or the rotational speed of the servo motor 34 decreases or when the acceleration of the movable electrode 30 with respect to the counter electrode 32 or the rotational acceleration of the servo motor 34 changes from 0 to a negative value, while it is judged that the movable electrode 30 does not contact the welding workpiece W when otherwise.

When it is judged that the movable electrode 30 does not contact the welding workpiece W, the routine returns to step S102 where, if necessary, the value of the torque limit of the servo motor 34 is reset (step S102), and at least one of the speed of movement and acceleration of the movable electrode 30 with respect to the counter electrode 32 continues to be monitored (step S104). When resetting the value of the torque limit, for example, it is sufficient to determine and reset the set value of the torque limit based on the torque output by the servo motor 34 in an immediately preceding period of a predetermined length.

If judging that the movable electrode 30 has contacted the welding workpiece W, the movement of the movable electrode 30 with respect to the counter electrode 32 is made to stop, the position of the surface of the welding workpiece W at the movable electrode side is found based on the position data of the front end of the wrist element 28 of the multiarticulated robot 12 and the relative position data of the front end of the counter electrode 32 of the spot welding gun 14 with respect to the front end of the wrist element 28 when it is judged that the movable electrode 30 contacts the welding workpiece W, and the process of detection of the surface position of the welding workpiece W is ended (step S108).

Figure 37A:
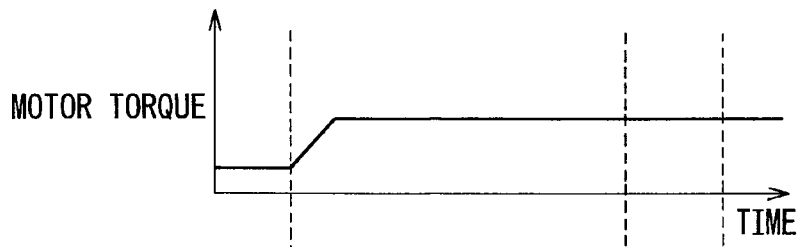
FIG. 37 are graphs showing the changes along with time in a torque of a servo motor and a rotational speed and rotational acceleration of a servo motor (or speed of movement and acceleration of the movable electrode) when using a servo motor to make a movable electrode of a spot welding gun approach a welding workpiece in accordance with a C1-th embodiment of a method of detection of a welding workpiece position of the present invention.
Figure 37B:
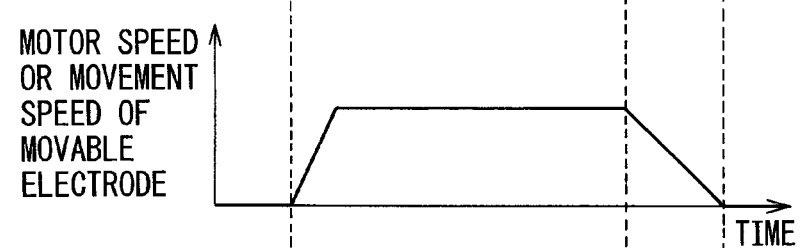
Figure 37C:
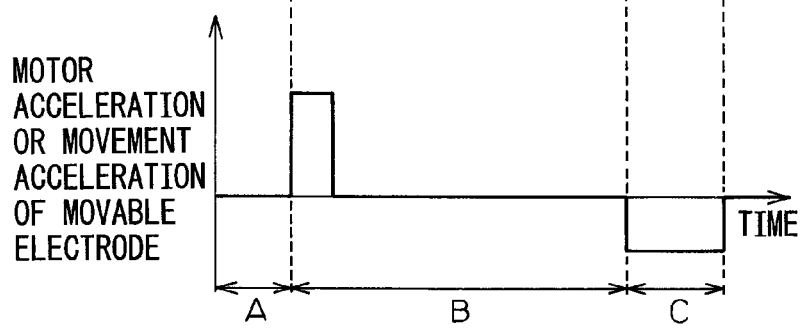

FIG. 37 show graphs expressing changes of the torque, rotational speed, and rotational acceleration of the servo motor 34 by time series when using the movable electrode 30 to detect the surface of the welding workpiece W in accordance with the present embodiment. FIG. 37A is a graph of the torque, FIG. 37B is a graph of the rotational speed, and FIG. 37C is a graph of the rotational acceleration. Note that, the graphs showing the speed of movement and acceleration of the movable electrode 30 with respect to the counter electrode 32 by time series also respectively become similar to FIG. 37B and FIG. 37C. In FIG. 37, the zone A shows the state when the detection operation is not being performed, the zone B shows the state during the detection operation when the movable electrode 30 does not contact the welding workpiece W, and the zone C shows the state during the detection operation when the movable electrode 30 contacts the welding workpiece W.

Before the start of the detection operation, the movable electrode 30 is stationary with respect to the counter electrode 32 and is not driven by the servo motor 34. Therefore, in the zone A, the torque of the servo motor 34 becomes constant at a value maintaining the stationary state and the rotational speed (that is, speed of movement of the movable electrode 30) and rotational acceleration (that is, the acceleration of the movable electrode 30) become 0. On the contrary, when the detection operation starts, the movable electrode 30 is made to move with respect to the counter electrode 32 at the speed Vg, so at the zone B, the torque and rotational speed of the servo motor 34 increase until the speed of movement of the movable electrode 30 with respect to the counter electrode 32 reaches Vg and both become constant when it reaches Vg. Along with this, the acceleration of the movable electrode 30 and the rotational acceleration of the servo motor 34 with respect to the counter electrode 32 become positive values until the speed of movement of the movable electrode 30 with respect to the counter electrode 32 reaches Vg, then both become 0 when it reaches Vg. Furthermore, at the zone C, if the movable electrode 30 contacts the welding workpiece W, the welding workpiece W elastically deforms and a reaction force acts from the welding workpiece W to the movable electrode 30, so movement of the movable electrode 30 is obstructed. This being the case, the servo motor 34 is controlled to maintain the speed of movement Vg constant and the torque of the servo motor 34 increases, but finally reaches the torque limit and becomes constant. As a result, the rotational speed of the servo motor 34 decreases and the speed of movement of the movable electrode 30 with respect to the counter electrode 32 also decreases from Vg. Along with this, the rotational acceleration of the servo motor 34 and the acceleration of the movable electrode 30 with respect to the counter electrode 32 change from 0 to negative values. Note that, FIG. 37A shows the case where the value of the torque limit of the servo motor 34 is set to a value equal to the torque of the servo motor 34 in the zone B (that is, the torque of the servo motor 34 required for making the movable electrode 30 move with respect to the counter electrode 32 at the speed Vg in the state with almost no load). In the zone B and the zone C, the torque of the servo motor 34 is a substantially constant value.

By recording the torque of the servo motor 34 in the zone B, it is possible to determine the set value of the torque limit of the servo motor 34 based on the torque of the servo motor 34 at the zone B. Further, if providing a distance between the movable electrode 30 and welding workpiece W in advance before the start of the detection operation, it is possible to lengthen the zone B and secure a sufficient preparatory operation zone, so it is possible to reliably record the torque of the servo motor 34 when the movable electrode 30 and welding workpiece W do not contact.

In this way, if using the servo motor 34 to drive the movable electrode 30 and thereby make the welding workpiece W and movable electrode 30 approach, when the movable electrode 30 contacts the welding workpiece W, as shown in FIG. 37B, the speed of movement of the movable electrode 30 and the rotational speed of the servo motor 34 for driving the movable electrode 30 change from a constant state to a gradually decrease. Therefore, if monitoring the speed of movement of the movable electrode 30 or the rotational speed of the servo motor 34, it is possible to judge that the movable electrode 30 contacts the welding workpiece W when speed of movement of the movable electrode 30 or the rotational speed of the servo motor 34 changes from a substantially constant state to a decrease. Further, when the movable electrode 30 contacts the welding workpiece W, the acceleration of the movable electrode 30 or the rotational acceleration of the servo motor 34 for driving the movable electrode 30, as shown in FIG. 37C, changes from 0 to change to a negative value. Therefore, if monitoring the acceleration of the movable electrode 30 or the rotational acceleration of the servo motor 34, it is possible to judge that the movable electrode 30 contacts the welding workpiece W when the acceleration of the movable electrode 30 or the rotational acceleration of the servo motor 34 changes from substantially 0 to a negative value.

Furthermore, it is possible to find the position data of the front end of the movable electrode 30 when it is judged that the movable electrode 30 has contacted the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has contacted the welding workpiece W. If deeming the found position data of the front end of the movable electrode 30 as the positional data of the surface of the welding workpiece W, it is possible to detect the surface position of the welding workpiece W at the movable electrode side.

The point of time when the speed of movement of the movable electrode 30 or the rotational speed of the servo motor 34 changes from a substantially constant state to a decrease is identified by analyzing the time-series curve, that is, waveform, of the speed of movement of the servo motor 34 or the rotational speed of the servo motor 34 and finding the point when the speed of movement of the movable electrode 30 or the rotational acceleration of the servo motor 34 changes from a substantially constant state to a decrease (hereinafter referred to as "the point of change"). The following three examples of the method of analysis of the time-series waveform of the speed of movement of the movable electrode 30 or the time-series waveform of the rotational speed of the servo motor 34 for finding the point of change may be mentioned.

(i) The point where the speed of movement of the movable electrode 30 decreases from the value of the reference state by a predetermined threshold value $\alpha$ (>0) or more is deemed the point of change. Alternatively, the point where the rotational speed of the servo motor 34 decreases from the value of the reference state by a predetermined threshold value $\alpha$ (>0) or more is deemed the point of change. The speed of movement of the moving electrode 30 of the reference state should be made the value Vg of the speed set. The rotational speed of the servo motor 34 of the reference state should be made the output torque of the servo motor 34 when the movable electrode 30 is moving at the speed Vg in the zone B or a predetermined value found by experiments. Further, the smaller the threshold value α, the earlier contact of the movable electrode 30 with the welding workpiece W can be detected. The threshold value α may also be determined using a ratio with respect to the set speed Vg of the movable electrode 30 or the rotational speed of the servo motor 34 in the zone B (for example, 10% etc.)

(ii) The point when the amount of change per unit time of the speed of movement of the movable electrode 30, that is, the slant of the time-series waveform of the speed of movement of the movable electrode 30, becomes a predetermined threshold value β (<0) or less is deemed the point of change. Alternatively, the amount of change per unit time of the rotational speed of the servo motor 34, that is, the slant of the time-series waveform of the rotational speed of the servo motor 34, becomes a predetermined threshold value β (<0) or less is deemed the point of change. If the movable electrode 30 contacts the welding workpiece W, the speed of movement of the movable electrode and the rotational speed of the servo motor 34 monotonically decrease from the state of a constant speed of movement of the movable electrode 30 and a constant rotational speed of the servo motor 34 before contact, so the threshold value β becomes a negative value. When desiring to detect the state right after the start of decrease, the threshold value β may be set to a negative value close to 0.

Figure 38:
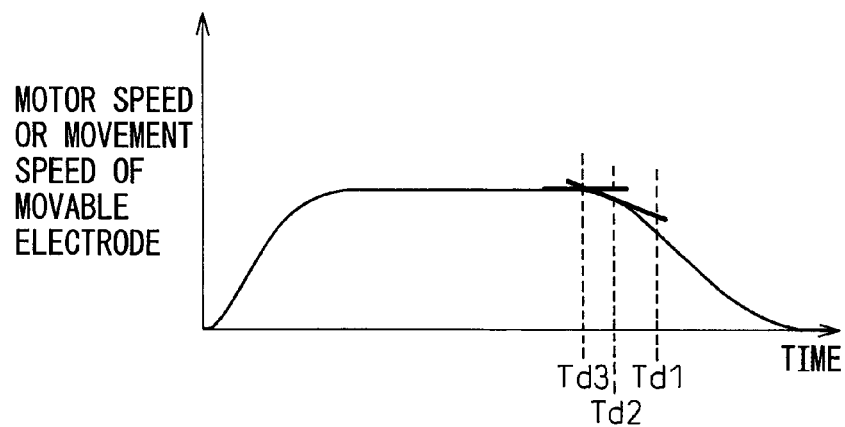
FIG. 38 is an explanatory view of a method of finding a point of change analytically from a time-series waveform of a rotational speed of a servo motor or a speed of movement of a movable electrode when working a C1-th embodiment of a method of detection of a welding workpiece position of the present invention.

(iii) If the movable electrode 30 contacts the welding workpiece W, the speed of movement of the movable electrode 30 and the rotational speed of the servo motor 34 monotonically decrease, so the slants of the time-series waveforms of the speed of movement of the movable electrode 30 and the rotational speed of the servo motor 34 become negative values. Therefore, as shown in FIG. 38, first, the method of (i) or (ii) is used to find the point of change of the speed of movement of the movable electrode 30 or the rotational speed of the servo motor 34, this is made the provisional point of change, the time-series waveform of the speed of movement of the movable electrode 30 or the rotational speed of the servo motor 34 is traced back along in time from the provisional point of change to find the amount of change per unit time of the speed of movement of the movable electrode 30 or the rotational speed of the servo motor 34 (that is, the slant of the time-series waveform of the speed of movement of the movable electrode 30 or the rotational speed of the servo motor 34), the point where the slant of the time-series waveform of the speed of movement of the movable electrode 30 or the rotational speed of the servo motor 34 becomes substantially 0 is made the true point of change, and the speed of movement of the movable electrode 30 or the rotational speed of the servo motor 34 at the true point of change is deemed to have changed from a substantially constant state to a decrease. Note that, the time-series waveform of the speed of movement of the movable electrode 30 or the rotational speed of the servo motor 34 is a set of discrete sampling points, so there is not necessarily any point on the time-series waveform where the slant becomes 0. Therefore, in practice, it is possible to trace back along in time the time-series waveform of the speed of movement of the movable electrode 30 or the rotational speed of the servo motor 34 from the provisional point of change (time Td1) to identify the point when the slant of the time-series waveform of the speed of movement of the movable electrode 30 or the rotational speed of the servo motor 34 becomes 0 or a positive value from a negative value (time Td3) and make the sampling point (time Td2) right before that, the true point of change. According to such a method, as shown in FIG. 38, even when the speed of movement of the movable electrode 30 or the rotational speed of the servo motor 34 decreases along a curve, the time right after the speed of movement of the movable electrode 30 or the rotational speed of the servo motor 34 changes from a constant 0 state to a decrease can be accurately identified and the position of the surface of the welding workpiece W at the movable electrode side can be accurately found.

Similar thinking may be applied for identifying the point of time when the acceleration of the movable electrode 30 or the rotational acceleration of the servo motor 34 changes from substantially 0 to a negative value. That is, the point of time when the acceleration of the movable electrode 30 or the rotational acceleration of the servo motor 34 changes from substantially 0 to a negative value is identified by analyzing the time-series curve, that is, waveform, of the acceleration of the movable electrode 30 or the rotational acceleration of the servo motor 34 and finding the point when the acceleration of the movable electrode 30 or the rotational acceleration of the servo motor 34 changes from a state of substantially 0 to negative (hereinafter referred to as "the point of change"). The following three examples of the method of analysis of the time-series waveform of the acceleration of the movable electrode 30 or the time-series waveform of the rotational acceleration of the servo motor 34 for finding the point of change may for example be mentioned.

(i) The point when the acceleration of the movable electrode 30 becomes a negative value is deemed the point of change. Alternatively, the point where the rotational acceleration of the servo motor 34 becomes a negative value is deemed the point of change. However, the actual speed of movement of the movable electrode 30 and rotational speed of the servo motor 34 fluctuate slightly, so to prevent erroneous detection, rather than make the point where the acceleration of the movable electrode 30 or the rotational acceleration of the servo motor 34 exactly become a negative value, the point of change, it is preferable to make the point where a predetermined threshold value γ (<0) is fallen below the point of change. The threshold value γ may be made any negative value. If making the threshold value γ a negative value close to 0, it is possible to detect when the movable electrode 30 contacts the welding workpiece W earlier.

(ii) The point where the amount of change per unit time of the acceleration of the movable electrode 30, that is, the slant of the time-series waveform of the acceleration of the movable electrode 30, becomes a predetermined threshold value σ (<0) or less is deemed the point of change. Alternatively, the point where the amount of change per unit time of the rotational acceleration of the servo motor 34, that is, the slant of the time-series waveform of the rotational acceleration of the servo motor 34, becomes a predetermined threshold value σ (<0) or less is deemed the point of change. If the movable electrode 30 contacts the welding workpiece W, the speed of movement of the movable electrode and the rotational speed of the servo motor 34 monotonically decrease from the state of a constant speed of movement of the movable electrode 30 and a constant rotational speed of the servo motor 34 and the acceleration of the movable electrode 30 and the rotational acceleration of the servo motor 34 become negative value, so the threshold value σ becomes a negative value. When desiring to detect the state right after the start of decrease, the threshold value σ may be set to a negative value close to 0.

Figure 39A:
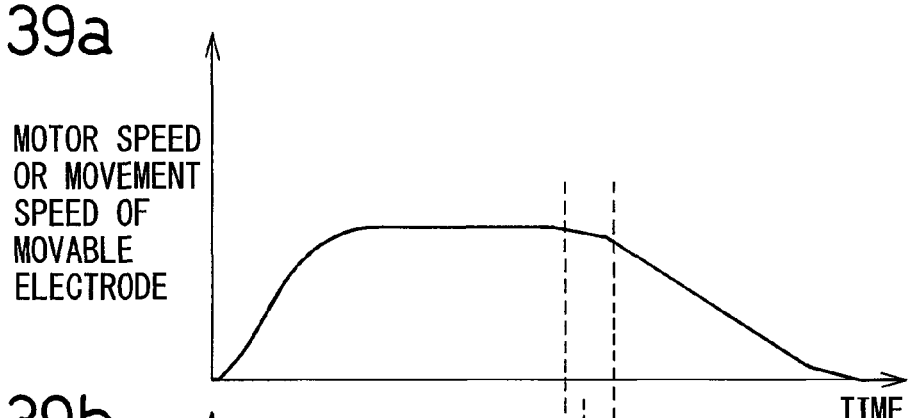
FIG. 39 are explanatory views of a method of finding a point of change analytically from a time-series waveform of a rotational acceleration of a servo motor or acceleration of a movable electrode when working a C1-th embodiment of a method of detection of a welding workpiece position of the present invention.
Figure 39B:
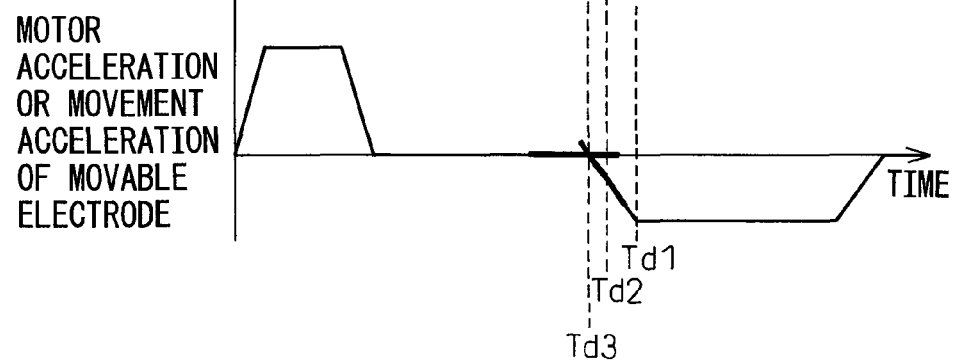

(iii) If the movable electrode 30 contacts the welding workpiece W, the acceleration of the movable electrode 30 decreases from 0 and along with this the rotational acceleration of the servo motor 34 also decreases from 0, so the slants of the time-series waveforms of the acceleration of the movable electrode 30 and the rotational acceleration of the servo motor 34 become negative values. Therefore, as shown in FIG. 39, first the method of (i) or (ii) is used to find the point of change of the acceleration of the movable electrode 30 or the rotational acceleration of the servo motor 34, this is made the provisional point of change, the time-series waveform of the acceleration of the movable electrode 30 or the rotational acceleration of the servo motor 34 is traced back along in time from the provisional point of change to find the amount of change per unit time of the acceleration of the movable electrode 30 or the rotational acceleration of the servo motor 34 (that is, the slant of the time-series waveform of the acceleration of the movable electrode 30 or the rotational acceleration of the servo motor 34), the point where the slant of the time-series waveform of the acceleration of the movable electrode 30 or the rotational acceleration of the servo motor 34 becomes substantially 0 is made the true point of change, and the acceleration of the movable electrode 30 or the rotational acceleration of the servo motor 34 is deemed to change from a substantially constant state to a decrease at the true point of change. Note that, the time-series waveform of the acceleration of the movable electrode 30 or the rotational speed of the servo motor 34 is a set of discrete sampling points, so there is not necessarily any point on the time-series waveform where the slant becomes 0. Therefore, in practice, it is possible to trace back along in time the time-series waveform of the acceleration of the movable electrode 30 or the rotational acceleration of the servo motor 34 from the provisional point of change (time Td1) to identify the point when the slant of the time-series waveform of the acceleration of the movable electrode 30 or the rotational acceleration of the servo motor 34 becomes 0 or a positive value from a negative value (time Td3) and make the sampling point (time Td2) right before that, the true point of change. According to such a method, as shown in FIG. 39, even when the acceleration of the movable electrode 30 or the rotational acceleration of the servo motor 34 decreases along a curve, the time right after the acceleration of the movable electrode 30 or the rotational acceleration of the servo motor 34 changes from a constant 0 state to a negative value can be accurately identified and the surface position of the welding workpiece W at the movable electrode side can be accurately found.

Note that, in this embodiment, even after judging that the movable electrode 30 and the welding workpiece W have contacted, sometimes the movable electrode 30 will end up running on inertia and the position of the front end of the movable electrode 30 when making the operation of the servo motor 34 stop and the position of the front end of the movable electrode 30 when judging that the movable electrode 30 and the welding workpiece W have contacted will end up differing. However, the servo motor 34 driving the movable electrode 30 is operating based on operating instructions on a time series, so it is possible to find the position of the movable electrode 30 at a past time from the already executed operating instructions. Therefore, when positioning of the movable electrode 30 of the spot welding gun 14 is the final object, to correct this continued running of the movable electrode 30, the multiarticulated robot 12 may be made to move to the position when it is judged that the movable electrode 30 and the welding workpiece W have contacted each other.

Embodiment C2

Figure 40:
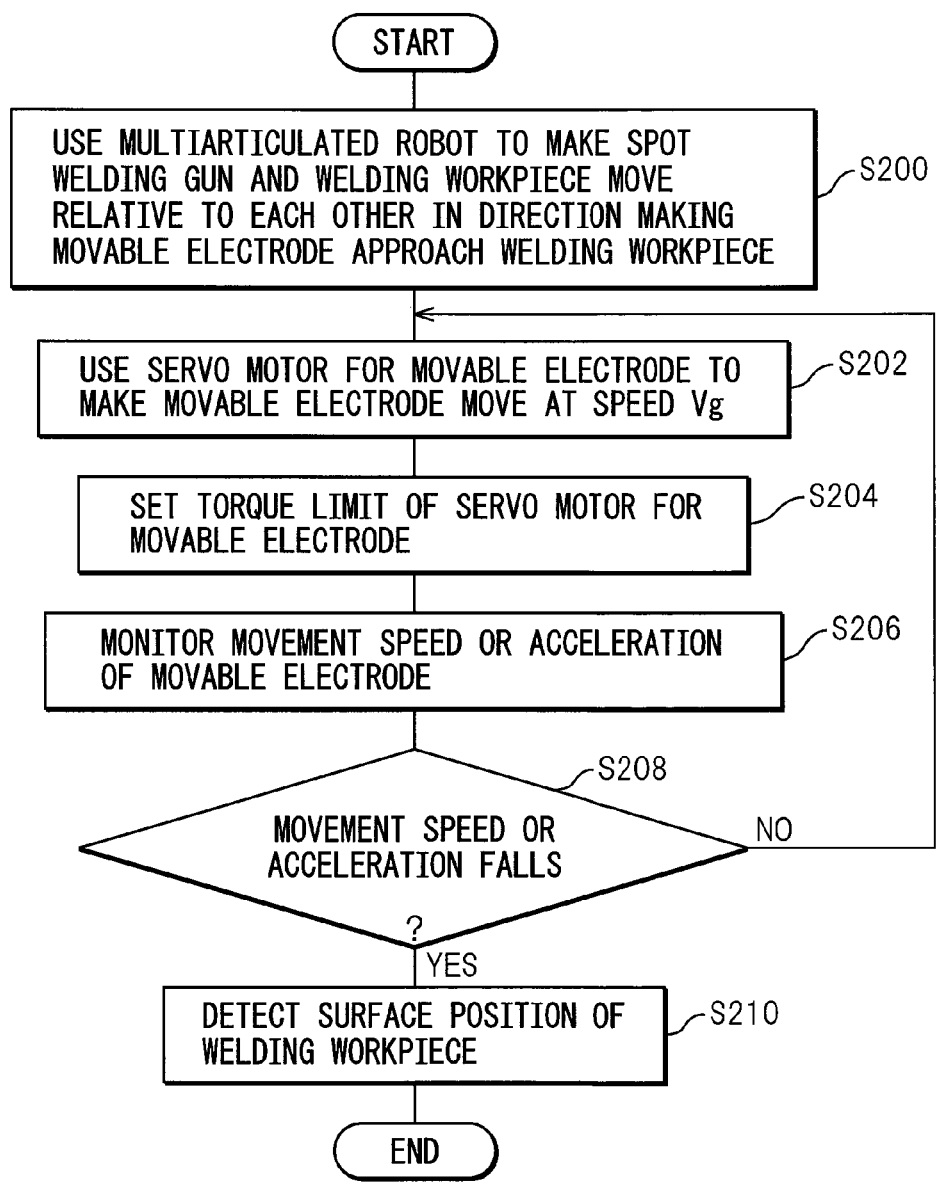
FIG. 40 is a flowchart of a method of using a multiarticulated robot to make a welding workpiece and spot welding gun move relative to each other to make the movable electrode approach the welding workpiece from a state separated from the welding workpiece and accordingly detect a surface position of the welding workpiece.
Figure 41:
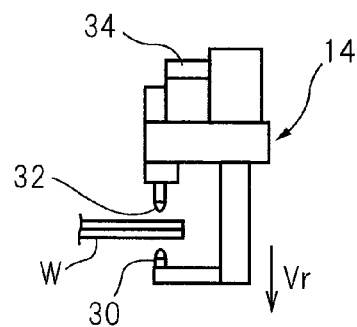
FIG. 41 is an explanatory view showing not driving the movable electrode of the spot welding gun, but using a multiarticulated robot to make the movable electrode approach a welding workpiece in accordance with a C2-th embodiment of a method of detection of the welding workpiece position of the present invention.

Referring to FIG. 40 and FIG. 41, a C2-th embodiment of a method of detection of the welding workpiece position of the present invention will be explained. In the C2-th embodiment, in a spot welding system 10 shown in FIG. 1, the servo motor 34 for driving the movable electrode 30 is set with a torque limit and, in that state, instead of using the servo motor 34 to drive the movable electrode 30 at the speed Vg, the multiarticulated robot 12 is used to make the welding workpiece W and spot welding gun 14 move relatively at the speed Vr whereby the welding workpiece W fixed to the workpiece table (not shown) and the movable electrode 30 of the spot welding gun 14 are made to move relatively at the speed Vr so as to make them approach each other from the separated state.

In the present embodiment as well, like in the C1-th embodiment, first, the welding workpiece W is made to move between the movable electrode 30 and the counter electrode 32 of the spot welding gun 14 and the spot welding gun 14 is positioned at a position so as to contact the welding location on a welding workpiece W (strike position) when the movable electrode 30 and counter electrode 32 are closed. At this time, to prevent the movable electrode 30 and welding workpiece W from approaching too much, preferably the movable electrode 30 is positioned at a position a certain extent of distance away from the surface of the welding workpiece W to secure a preparatory operation zone where the movable electrode 30 does not contact the welding workpiece W and the movable electrode 30 may be positioned at a welding location on the welding workpiece W, then the movable electrode 30 made to move to separate from the welding workpiece W by exactly any distance in the same way as well.

Then, as shown in FIG. 41, in the state when the speed of movement Vg of the movable electrode 30 driven by the servo motor 34 is set to 0 and the movable electrode 30 is made stationary with respect to the counter electrode 32, the multiarticulated robot 12 is used to make the welding workpiece W and spot welding gun 14 move relatively at the speed Vr whereby the welding workpiece W fixed to the workpiece table (not shown) and the movable electrode 30 of the spot welding gun 14 are made to move relatively at the speed Vr so as to make them approach from the separated state (step S200).

Then, the speed of movement Vg of the movable electrode 30 driven by the servo motor 34 is set to 0 to select a state of making the movable electrode 30 stationary with respect to the counter electrode 32 (step S202), and the torque limit of the servo motor 34 driving the movable electrode 30 is set (step S204). The set value of the torque limit of the servo motor 34 is set so that after this the torque required for maintaining the movable electrode 30 in a stationary state with respect to the counter electrode 32 in the state when the movable electrode 30 does not contact the welding workpiece W can be sufficiently output by the servo motor 34. For example, from step S200 on, as explained above, preferably the torque of the servo motor 34 is measured in the preparatory operation zone after the start of the relative movement of the welding workpiece W and movable electrode 30 and before the contact of the welding workpiece W and movable electrode 30, and the value of the measured torque plus an extra margin of the amount of fluctuation is set as the value of the torque limit. Further, as the set value of the torque limit, experiments etc. may be used to set the predetermined value.

When setting the value of the torque limit of the servo motor 34 based on the torque of the servo motor 34 output in the preparatory operation zone, the timing of determining the value of the torque limit of the servo motor 34, like in the C1-th embodiment, may be any time in the preparatory operation zone in the state when the movable electrode 30 is separated from the welding workpiece W and is stationary with respect to the counter electrode 32. Note that, before setting the value of the torque limit, to prevent the movable electrode 30 from being contiguous with the welding workpiece, preferably the movable electrode 30 and the welding workpiece W are separated to secure a sufficient distance of the preparatory operation zone, then the detection operation is started.

The setting of the other torque limits is the same as in the C1-th embodiment, so the explanation will be omitted here.

Then, in the state with the servo motor 34 set with the torque limit in this way, at least one of the speed of movement and acceleration of the movable electrode 30 with respect to the counter electrode 32 is monitored (step S206). The speed of movement and acceleration of the movable electrode 30 may be directly measured or may be found from the rotational speed and rotational acceleration of the servo motor 34 driving the movable electrode 30. Further, the speed of movement and acceleration of the movable electrode 30 with respect to the counter electrode 32 are respectively proportional to the rotational speed and rotational acceleration of the servo motor 34 for driving the movable electrode 30, so instead of the speed of movement or acceleration of the movable electrode 30, it is also possible to monitor the rotational speed or rotational acceleration of the servo motor 34 driving the movable electrode 30. At the time of monitoring, the information of the speed of movement or acceleration of the movable electrode 30 or the rotational speed or rotational acceleration of the servo motor 34 and the position data of the front end of the wrist element 28 of the multiarticulated robot 12 and the relative position data of the movable electrode 30 with respect to the counter electrode 32 are successively recorded for each sampling time.

The movable electrode 30 is not driven by the servo motor 34, so at first, the speed of movement and acceleration of the movable electrode 30 with respect to the counter electrode 32 both become 0. Further, if the movable electrode 30 contacts the welding workpiece W, the welding workpiece W is be pressed against the movable electrode 30 causing bending, denting, or other elastic deformation, and a reaction force acts from the welding workpiece W to the movable electrode 30. This being so, the servo motor 34 is controlled to try to maintain the state when the movable electrode 30 is stationary with respect to the counter electrode 32 (that is, the state when the speed Vg of the movable electrode 30 with respect to the counter electrode 32 is 0) and tries to increase the torque for countering the reaction force from the welding workpiece W in the positive direction (direction making the movable electrode 30 approach the counter electrode 32), but the output torque of the servo motor 34 reaches the torque limit. As a result, it no longer becomes possible to maintain the state where the movable electrode 30 is stationary with respect to the counter electrode 32, the movable electrode 30 is pushed back from the welding workpiece W by the speed of movement Vr of the multiarticulated robot 12, and the movable electrode 30 moves in a direction separating from the counter electrode 32 (negative direction). That is, the speed of movement of the movable electrode 30 and the rotational speed of the servo motor 34 decrease from 0 and change to negative values and the acceleration of the movable electrode and the rotational acceleration of the servo motor 34 decrease from 0 and change to negative values.

Utilizing this, the speed of movement of the movable electrode 30 or the rotational speed of the servo motor 34 with respect to the counter electrode 32 or the acceleration of the movable electrode 30 or the rotational acceleration of the servo motor 34 with respect to the counter electrode 32 is successively checked (step S208), it is judged that the movable electrode 30 contacts the welding workpiece W when the speed of movement of the movable electrode 30 with respect to the counter electrode 32 decreases from 0 and becomes a negative value, when the rotational speed of the servo motor 34 changes from 0 to a negative value, or when the acceleration of the movable electrode 30 or the rotational acceleration of the servo motor 34 with respect to the counter electrode 32 changes from 0 to a negative value, while it is judged that the movable electrode 30 does not contact the welding workpiece W when otherwise.

When it is judged that the movable electrode 30 does not contact the welding workpiece W, the routine returns to step S202 and the speed of movement Vg of the movable electrode 30 driven by the servo motor 34 is reset to 0 (step S202), if necessary, the set value of the torque limit of the servo motor 34 is reset (step S204), and at least one of the speed of movement and acceleration of the movable electrode 30 with respect to the counter electrode 32 continues to be monitored (step S206). When resetting the set value of the torque limit, for example, it is sufficient to determine and reset the set value of the torque limit based on the torque output by the servo motor 34 in the immediately preceding period of a predetermined length.

If judging that the movable electrode 30 has contacted the welding workpiece W, movement of the multiarticulated robot 12 is made to stop, the position of the surface of the welding workpiece W at the movable electrode side is found based on the position data of the front end of the wrist element 28 of the multiarticulated robot 12 and relative position data of the front end of the counter electrode 32 of the spot welding gun 14 with respect to the front end of the wrist element 28 when it is judged that the movable electrode 30 contacts the welding workpiece W, and the process of detection of the surface position of the welding workpiece W is ended (step S210).

Figure 42A:
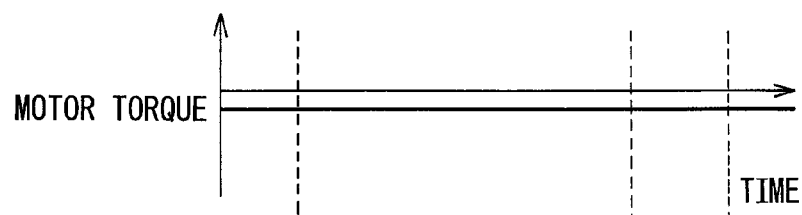
FIG. 42 are graphs showing the changes along with time in a torque of a servo motor and a rotational speed and rotational acceleration of a servo motor (or speed of movement and acceleration of the movable electrode) when not driving the movable electrode of spot welding gun but using a multiarticulated robot to make the movable electrode approach a welding workpiece according to a C2-th embodiment of a method of detection of the welding workpiece position of the present invention.
Figure 42B:
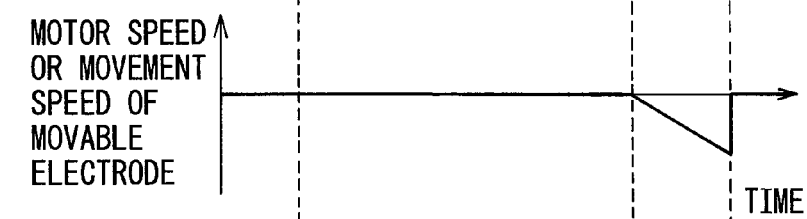
Figure 42C:
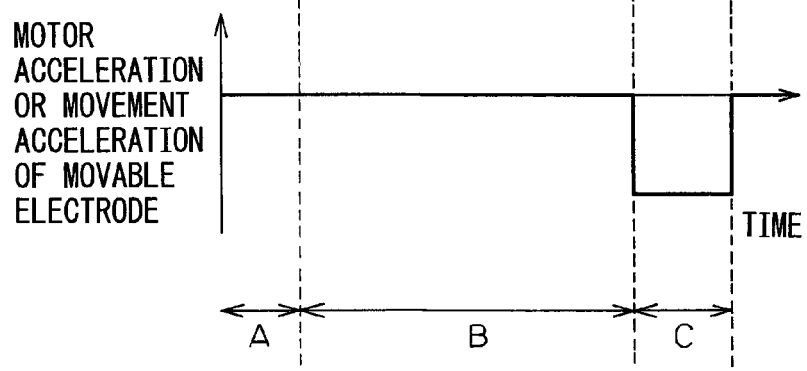

FIG. 42 show graphs expressing changes of the torque, rotational speed, and rotational acceleration of the servo motor 34 by time series when using the movable electrode 30 to detect the surface of the welding workpiece W in accordance with the present embodiment. FIG. 42A is a graph of the torque, FIG. 42B is a graph of the rotational speed, and FIG. 42C is a graph of the rotational acceleration. Note that, the graphs showing the speed of movement and acceleration of the movable electrode 30 with respect to the counter electrode 32 by time series also respectively become similar to FIG. 42B and FIG. 42C. In FIG. 42, the zone A shows the state when the detection operation is not being performed, the zone B shows the state during the detection operation when the movable electrode 30 does not contact the welding workpiece W, and the zone C shows the state during the detection operation when the movable electrode 30 contacts the welding workpiece W.

In this embodiment, not only before the start of the detection operation, but also after the start of the detection operation, the movable electrode 30 is not driven by the servo motor 34, and is maintained in a state stationary with respect to the counter electrode 32. Therefore, in the zone A and the zone B, the torque of the servo motor 34 becomes constant at a value maintaining the stationary state and the rotational speed (that is, speed of movement of the movable electrode) and rotational acceleration (that is, the acceleration of the movable electrode 30) become 0. On the contrary, at the zone C, if the movable electrode 30 contacts the welding workpiece W, the welding workpiece W elastically deforms, a reaction force acts from the welding workpiece W to the movable electrode 30, and the movable electrode 30 is pressed back in a direction where it is separated from the counter electrode 32. This being the case, the servo motor 34 is controlled to maintain a state where the movable electrode 30 is stationary with respect to the counter electrode 32 (that is, the state when the speed Vg of the movable electrode 30 with respect to the counter electrode 32 is 0). The increase of the torque of the servo motor 34 finally reaches the torque limit whereupon the torque becomes constant. As a result, the rotational speed of the servo motor 34 and the speed of movement of the movable electrode 30 with respect to the counter electrode 32 decrease from 0 and become negative values. Along with this, the rotational acceleration of the servo motor 34 and the acceleration of the movable electrode 30 with respect to the counter electrode 32 change from 0 to a negative value. Note that, FIG. 42A shows the case where the value of the torque limit of the servo motor 34 is set to a value equal to the torque of the servo motor 34 in the zone B (that is, the torque of the servo motor 34 required for maintaining the movable electrode 30 in a stationary state with respect to the counter electrode 32 in the state with almost no load). In the zone B and the zone C, the torque of the servo motor 34 is a substantially constant value.

By recording the torque of the servo motor 34 in the zone B, it is possible to use the torque of the servo motor 34 in the zone B as the basis to determine the set value of the torque limit of the servo motor. Further, if providing a distance between the movable electrode 30 and the welding workpiece W in advance before the detection operation, it is possible to lengthen the zone B and secure a sufficient preparatory operation zone, so it is possible to reliably record the torque of the servo motor 34 when the movable electrode 30 and welding workpiece W do not contact.

In this way, even when using the multiarticulated robot 12 to make the welding workpiece W and spot welding gun 14 move relative to each other and thereby make the welding workpiece W and movable electrode 30 approach, when the movable electrode 30 contacts the welding workpiece W, as shown in FIG. 42B, the speed of movement of the movable electrode 30 and the rotational speed of the servo motor 34 for driving the movable electrode 30 gradually decrease from 0 to a negative value. Therefore, if monitoring the speed of movement of the movable electrode 30 or acceleration of the servo motor 34, it is possible to judge that the movable electrode 30 contacts the welding workpiece W when the speed of movement of the movable electrode 30 or the rotational speed of the servo motor 34 decreases from a constant state of 0 to a negative value. Further, when movable electrode 30 contacts the welding workpiece W, the acceleration of the movable electrode 30 or the rotational acceleration of the servo motor 34 for driving the movable electrode 30, as shown in FIG. 42C, changes from 0 to a negative value. Therefore, if monitoring the acceleration of the movable electrode 30 or the rotational acceleration of the servo motor 34, it is possible to judge that the movable electrode 30 contacts the welding workpiece W when the acceleration of the movable electrode 30 or the rotational acceleration of the servo motor 34 changes from substantially 0 to a negative value.

Furthermore, it is possible to find the position data of the front end of the movable electrode 30 when it is judged that the movable electrode 30 has contacted the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has contacted the welding workpiece W. If deeming the found position data of the front end of the movable electrode 30 as the position of the surface of the welding workpiece W data, it is possible to detect the surface position of the welding workpiece at the movable electrode side.

The point of time when the speed of movement of the movable electrode 30 or the rotational speed of the servo motor 34 decreases from substantially 0 to a negative value is identified by analyzing the time-series curve, that is, waveform, of the speed of movement of the servo motor 34 or the rotational speed of the servo motor 34 and finding the point where the speed of movement of the movable electrode 30 or the rotational acceleration of the servo motor 34 decreases from substantially 0 to a negative value (hereinafter referred to as "the point of change"). The following three examples of the method of analysis of the time-series waveform of the speed of movement of the movable electrode or the time-series waveform of the rotational speed of the servo motor 34 for finding the point of change may be mentioned.

(i) The point where the speed of movement of the movable electrode 30 decreases from the value of the reference state by a predetermined threshold value $\alpha$ (>0) or more is deemed the point of change. Alternatively, the point where the rotational speed of the servo motor 34 decreases from the value of the reference state by a predetermined threshold value $\alpha$ (>0) or more is deemed the point of change. The movable electrode 30 is stationary with respect to the counter electrode 32, so the speed of movement of the movable electrode 30 of the reference state should be made 0. The rotational speed of the servo motor 34 of the reference state should be made the output torque of the servo motor 34 when maintaining the state of where the movable electrode 30 is stationary in the zone B or a predetermined value found by experiments. Further, the smaller the threshold value $\alpha$, the earlier contact of the movable electrode 30 with the welding workpiece W can be detected.

(ii) The point where the amount of change per unit time of the speed of movement of the movable electrode 30, that is, the slant of the time-series waveform of the speed of movement of the movable electrode 30, becomes a predetermined threshold value $\beta$ (<0) or less is deemed the point of change. Alternatively, the point where the amount of change per unit time of the rotational speed of the servo motor 34, that is, the slant of the time-series waveform of the rotational speed of the servo motor 34, becomes a predetermined threshold value $\beta$ (<0) or less is deemed the point of change. If the movable electrode 30 contacts the welding workpiece W, the speed of movement of the movable electrode 30 monotonically decreases from a constant state of 0 to a negative value showing movement of the movable electrode 30 in a direction separating from the counter electrode 32, so the threshold value $\beta$ becomes a negative value. When desiring to detect the state right after the start of decrease, the threshold value $\beta$ may be set to a negative value close to 0.

Figure 43:
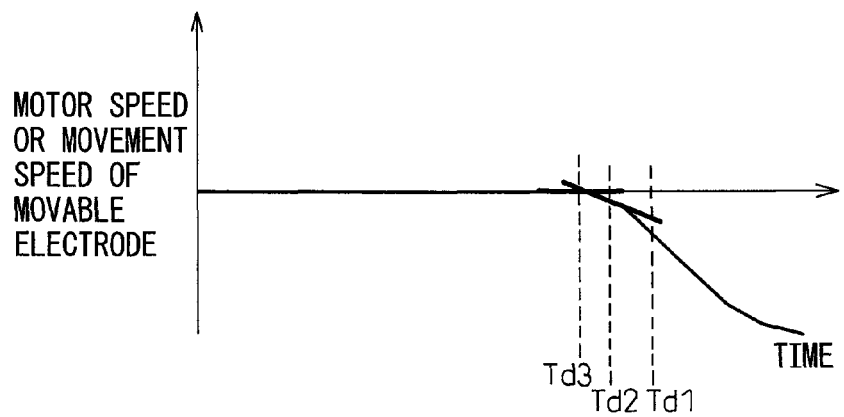
FIG. 43 is an explanatory view of a method of finding a point of change analytically from a time-series waveform of a rotational speed of a servo motor or a speed of movement of a movable electrode when working a C2-th embodiment of a method of detection of the welding workpiece position of the present invention.

(iii) If the movable electrode 30 contacts the welding workpiece W, the speed of movement of the movable electrode 30 monotonically decreases from a constant state of 0 to a negative value showing movement of the movable electrode 30 in a direction separating from the counter electrode 32, so the slant of the time-series waveforms of the speed of movement of the movable electrode 30 and the rotational speed of the servo motor 34 becomes a negative value. Therefore, as shown in FIG. 43, first, the method of (i) or (ii) is used to find the point of change of the speed of movement of the movable electrode 30 or the rotational speed of the servo motor 34, this is made the provisional point of change, the time-series waveform of the speed of movement of the movable electrode 30 or the rotational speed of the servo motor 34 is traced back along in time from the provisional point of change to find the amount of change per unit time of the speed of movement of the movable electrode 30 or the rotational speed of the servo motor 34 (that is, the slant of the time-series waveform of the speed of movement of the movable electrode 30 or the rotational speed of the servo motor 34), the point where the slant of the time-series waveform where the speed of movement of the movable electrode 30 or the rotational speed of the servo motor 34 becomes substantially 0 is made the true point of change, and it is deemed that the speed of movement of the movable electrode 30 or the rotational speed of the servo motor 34 has changed from a substantially constant state of 0 to a decrease at the true point of change. Note that, the time-series waveform of the speed of movement of the movable electrode 30 or the rotational speed of the servo motor 34 is a set of discrete sampling points, so there is not necessarily any point on the time-series waveform where the slant becomes 0. Therefore, in practice, it is possible to trace back along in time the time-series waveform of the speed of movement of the movable electrode 30 or the rotational speed of the servo motor 34 from the provisional point of change (time Td1) to identify the point when the slant of the time-series waveform of the speed of movement of the movable electrode 30 or the rotational speed of the servo motor 34 becomes 0 or a positive value from a negative value (time Td3) and make the sampling point (time Td2) right before that, the true point of change. According to such a method, as shown in FIG. 43, even when the speed of movement of the movable electrode 30 or the rotational speed of the servo motor 34 decrease along a curve, the time right after the speed of movement of the movable electrode 30 or the rotational speed of the servo motor 34 changes from a constant 0 state to a decrease can be accurately identified and the surface position of the welding workpiece W at the movable electrode side can be accurately found.

Similar thinking can be applied to identification of the point of time when the acceleration of the movable electrode 30 or the rotational acceleration of the servo motor 34 changes from substantially 0 to a negative value. That is, the point of time when the acceleration of the movable electrode 30 or the rotational acceleration of the servo motor 34 changes from substantially 0 to a negative value can be identified by analyzing the time-series curve, that is, waveform, of the acceleration of the movable electrode 30 or the rotational acceleration of the servo motor 34 and finding the point where the acceleration of the movable electrode 30 or the rotational acceleration of the servo motor 34 changed from a state of substantially 0 to negative (hereinafter referred to as "the point of change"). Three examples of the method of analysis of the time-series waveform of the acceleration of the movable electrode 30 or the time-series waveform of the rotational acceleration of the servo motor 34 for finding the point of change may be mentioned below.

(i) The point where the acceleration of the movable electrode 30 becomes a negative value is deemed the point of change. Alternatively, the point where the rotational acceleration of the servo motor 34 becomes a negative value is deemed the point of change. However, in practice, the speed of movement of the movable electrode 30 and the rotational speed of the servo motor 34 slightly change, so to prevent erroneous detection, it is preferable not to make the point where the acceleration of the movable electrode 30 or the rotational acceleration of the servo motor 34 becomes a negative value the point of change, but to make the point where a predetermined threshold value γ (<0) is fallen below the point of change. The threshold value γ may be made any negative value. If making the threshold value γ a negative value close to 0, the contact of the movable electrode 30 with the welding workpiece W can be detected early.

(ii) The point where the amount of change per unit time of the acceleration of the movable electrode 30, that is, the slant of the time-series waveform of the acceleration of the movable electrode 30, becomes a predetermined threshold value σ (<0) or less is deemed as the point of change. Alternatively, the point where the amount of change per unit time of the rotational acceleration of the servo motor 34, that is, the slant of the time-series waveform of the rotational acceleration of the servo motor 34, becomes a predetermined threshold value σ (<0) or less is deemed the point of change. If the movable electrode 30 contacts the welding workpiece W, the speed of movement of the movable electrode 30 monotonically decreases from a state of a constant 0 state to a negative value showing movement of the movable electrode in a direction separating from the counter electrode 32, so the threshold value σ becomes a negative value. When desiring to detect the point right after the start of decrease, the threshold value σ should be set to a negative value close to 0.

Figure 44:
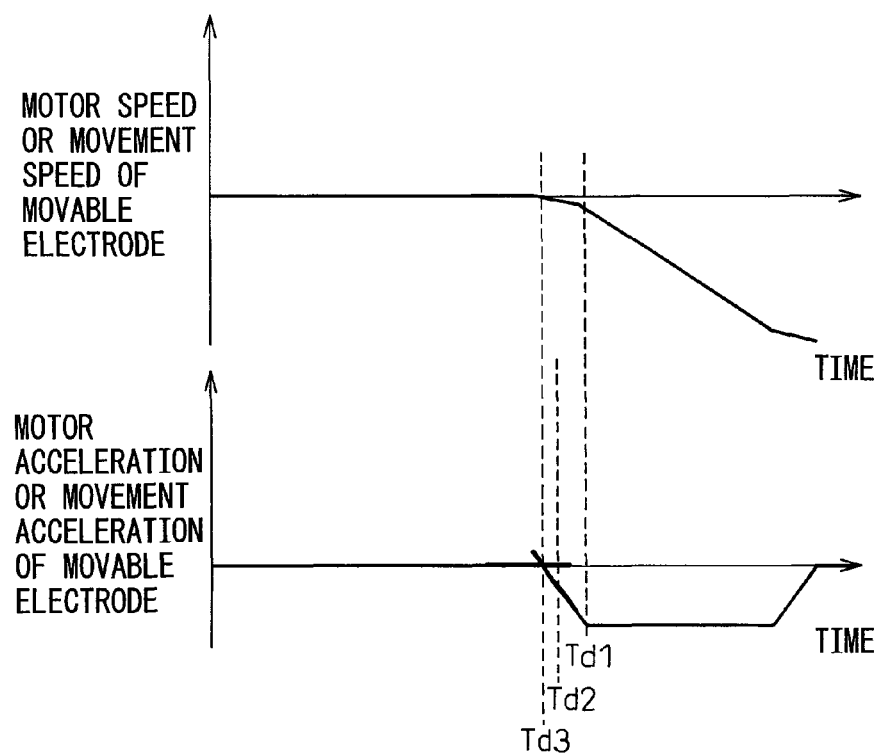
FIG. 44 is explanatory views of a method of finding a point of change analytically from a time-series waveform of a rotational speed of a servo motor or a speed of movement of a movable electrode when working a C2-th embodiment of a method of detection of the welding workpiece position of the present invention.

(iii) When the movable electrode 30 contacts the welding workpiece W, the acceleration of the movable electrode 30 decreases from 0 and, along with that, the rotational acceleration of the servo motor 34 also falls from 0, so the slant of the time-series waveform of the acceleration of the movable electrode 30 or the rotational acceleration of the servo motor 34 becomes a negative value. Therefore, as shown in FIG. 44, first, the method of (i) or (ii) is used to find the point of change of the acceleration of the movable electrode 30 or the rotational acceleration of the servo motor 34, this is used as the provisional point of change, the time-series waveform of the acceleration of the movable electrode 30 or the rotational acceleration of the servo motor 34 is traced back along in time from the provisional point of change, and the amount of change per unit time of the acceleration of the movable electrode 30 or the rotational acceleration of the servo motor 34 (that is, the slant of the time-series waveform of the acceleration of the movable electrode 30 or the rotational acceleration of the servo motor 34) is found. Further, the point where the slant of the time-series waveform of the acceleration of the movable electrode 30 or the rotational acceleration of the servo motor 34 becomes substantially 0 is defined as the true point of change and it is deemed that the acceleration of the movable electrode 30 or the rotational acceleration of the servo motor 34 changed from a substantially constant 0 state to a decrease at the true point of change. Note that, the time-series waveform of the acceleration of the movable electrode 30 or the rotational acceleration of the servo motor 34 is a set of discrete sampling points, so there will not necessarily be a point on the time-series waveform where the slant becomes 0. Therefore, in practice, it is sufficient to trace back along in time the time-series waveform of the acceleration of the movable electrode 30 or the rotational acceleration of the servo motor 34 from the provisional point of change (the time Td1), identify the point where the slant of the time-series waveform of the acceleration of the movable electrode 30 or the rotational acceleration of the servo motor 34 changes from a negative value to 0 or a positive value (the time Td3), and define the sampling point (the time Td2) right before that, as the true point of change. According to such a method, as shown in FIG. 44, even when the speed of movement of the movable electrode 30 or the rotational speed of the servo motor 34 decreases in a curve, it is possible to accurately identify the time right after the acceleration of the movable electrode 30 or the rotational acceleration of the servo motor 34 decreases from a state of substantially 0 and changes to a negative value and becomes possible to accurately find the position of the surface of the welding workpiece W at the movable electrode side.

Note that, in this embodiment, even after judging that the movable electrode 30 and the welding workpiece W have contacted, sometimes the multiarticulated robot 12 will end up running on inertia and the position of the front end of the wrist element 28 of the multiarticulated robot 12 when making the operation of the multiarticulated robot 12 stop and the position of the front end of the wrist element 28 of the multiarticulated robot 12 when judging that the movable electrode 30 and the welding workpiece W have contacted will end up differing. However, since the multiarticulated robot 12 is operating based on time-series operating instructions, the position of the multiarticulated robot 12 at a past time can be found from the already executed operating instructions. Therefore, when positioning of the movable electrode 30 of the spot welding gun 14 is the final object, to correct this continued running of the multiarticulated robot 12, the multiarticulated robot 12 may be made to move to the position when it is judged that the movable electrode 30 and the welding workpiece W have contacted each other.

When, like in the present embodiment, the movable electrode 30 is made to be stationary with respect to the counter electrode 32, the movable electrode 30 is not driven by the servo motor 34 and dynamic friction does not occur at the movable electrode drive mechanism of the spot welding gun 14, so the mechanical resistance of the drive mechanism of the movable electrode becomes smaller, almost no variation or fluctuation of the torque of the servo motor 34 occurs, and the extra margin added to the torque required for maintaining a stationary state of the movable electrode 30 when setting the value of the torque limit of the servo motor 34 can be made smaller. As a result, when the movable electrode 30 contacts the welding workpiece W, the torque of the servo motor 34 will easily reach the torque limit and movement of the movable electrode 30 with respect to the counter electrode 32 can be easily started. Further, the movable electrode 30 is not driven by the servo motor 34 and is stationary, so before the movable electrode 30 contacts the welding workpiece W, the speed of movement of the movable electrode 30 and the rotational speed of the servo motor 34 will not fluctuate much at all, so the absolute values of the above threshold values α, β, γ, and a can be set to small values. Therefore, it becomes possible to improve the precision of detection of contact.

In the C2-th embodiment, instead of using the servo motor 34 to drive the movable electrode 30 and thereby making the welding workpiece W and the movable electrode 30 approach like in the C1-th embodiment, the multiarticulated robot 12 is used to make the spot welding gun 14 and welding workpiece W move relative to each other and thereby make the movable electrode 30 and the welding workpiece W approach. Due to this, there is no longer a need to drive the movable electrode 30, and the effects of fluctuation of the torque of the servo motor 34 due to the dynamic friction of the movable electrode drive mechanism can be removed, but on the other hand, the movable electrode 30 is in a stationary state, so effects arise due to the insensitive zone caused by the static friction of the movable electrode drive mechanism. Therefore, the C2-th embodiment is effective in a spot welding gun 14 where the effect of static friction is smaller than the effect of dynamic friction.

Embodiment C3

Figure 45:
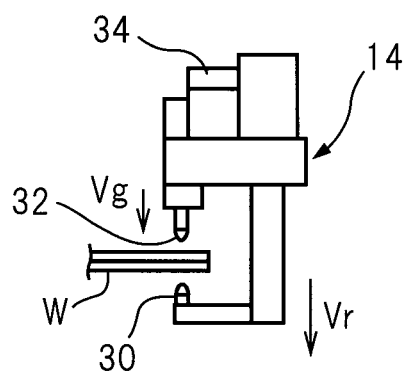
FIG. 45 is an explanatory view showing using a servo motor to drive a movable electrode of a spot welding gun to make it move in a direction making it approach a welding workpiece while using a multiarticulated robot to make a welding workpiece and spot welding gun move relative to each other to make the movable electrode approach the welding workpiece according to a C3-th embodiment of a method of detection of the welding workpiece position of the present invention.
Figure 46:
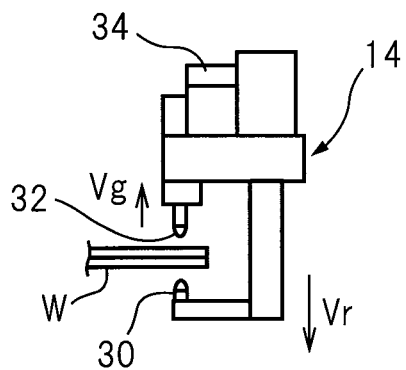
FIG. 46 is an explanatory view showing using a servo motor to drive a movable electrode of a spot welding gun to make it move in a direction separating from a welding workpiece while using a multiarticulated robot to make a welding workpiece and spot welding gun move relative to each other to make the movable electrode approach the welding workpiece according to a C3-th embodiment of a method of detection of the welding workpiece position of the present invention.

Referring to FIG. 40, FIG. 45, and FIG. 46, a C3-th embodiment of the method of detection of the welding workpiece position of the present invention will be explained. In the C3-th embodiment, in a spot welding system 10 shown in FIG. 1, the speed Vg by which the servo motor 34 drives the movable electrode 30 is not 0, the servo motor 34 is used to make the movable electrode 30 move at the speed Vg with respect to the counter electrode 32, while the multiarticulated robot 12 is used to make the welding workpiece W and spot welding gun 14 move by a speed Vr relative to each other. The embodiment differs from the C2-th embodiment on that point. The rest of the points are similar to the C2-th embodiment. Therefore, here, the different parts will basically be explained and explanations of similar parts will be omitted.

In the C2-th embodiment, the speed Vg by which the servo motor 34 drives the movable electrode 30 is made 0 and the movable electrode 30 is made stationary with respect to the counter electrode 32, so almost no fluctuation of the torque of the servo motor 34 due to the dynamic friction of the movable electrode drive mechanism of the spot welding gun 14 occurs and the extra margin added, considering torque fluctuation, to the torque required for maintaining the stationary state of the movable electrode 30 when setting the value of the torque limit of the servo motor 34 can be made smaller. Therefore, when the movable electrode 30 contacts the welding workpiece W, the torque of the servo motor 34 easily reaches the torque limit and movement of the movable electrode 30 easily starts, so it is possible to improve the precision of detection of contact. On the contrary, the movable electrode 30 is stationary with respect to the counter electrode 32, so the reaction force, due to the static friction in the movable electrode drive mechanism, received from the welding workpiece W when the movable electrode 30 contacts the welding workpiece W is lost and not transmitted to the servo motor 34 resulting in an insensitive zone where the torque of the servo motor 34 does not fluctuate much at all regardless of the movable electrode 30 contacting the welding workpiece W. As a result, the time when the torque of the servo motor 34 reaches the set value of the torque limit when the movable electrode 30 contacts the welding workpiece W and the start of movement by the movable electrode 30 end up being delayed. Therefore, when the static friction of the movable electrode drive mechanism is small, the effect due to the elimination of fluctuation of the torque of the servo motor 34 caused by dynamic friction of the movable electrode drive mechanism overcomes the detrimental effect due to the existence of the insensitive zone caused by the static friction of the movable electrode drive mechanism, whereupon the C2-th embodiment becomes effective, but when the static friction of the movable electrode drive mechanism is large, the detrimental effect due to the existence of the insensitive zone caused by the static friction of the movable electrode drive mechanism ends up becoming greater than the effect caused by elimination of the torque of the servo motor 34 caused by the dynamic friction of the movable electrode drive mechanism.

Therefore, in the C3-th embodiment, the servo motor 34 is used to make the movable electrode 30 move with respect to the counter electrode 32 by a low speed Vg ($\neq$0) so as to thereby eliminate the detrimental effect due to such an insensitive zone and enable both of the advantages by the C1-th embodiment and the advantages by the C2-th embodiment to be enjoyed. Note that, as will be understood from FIG. 5, to suppress the effect due to the dynamic friction of the movable electrode drive mechanism, the speed of movement of the movable electrode 30 should be lowered as much as possible, but when the speed Vg of movement of the movable electrode 30 is close to 0, the static friction of the movable electrode drive mechanism can no longer be sufficiently removed. Therefore, the speed Vg by which the servo motor 34 is used to make the movable electrode 30 move with respect to the counter electrode 32 is preferably made an extremely low speed eliminating the static friction while suppressing fluctuation of the torque of the servo motor 34 due to dynamic friction to a minimum extent.

Referring to FIG. 40, the procedure of the method of detection of the welding workpiece position according to the C3-th embodiment will be explained. In the C3-th embodiment as well, in the same way as the C2-th embodiment, first, the welding workpiece W is made to move between the movable electrode 30 and the counter electrode 32 of the spot welding gun 14 and the spot welding gun 14 is positioned at position where it will contact a welding location (strike position) on the welding workpiece W when the movable electrode 30 and counter electrode 32 are closed. At this time, similarly, it is also possible to position the movable electrode 30 at a position a certain distance away from the surface of the welding workpiece W so that the movable electrode 30 and the welding workpiece W do not approach too much so as to secure a preparatory operation zone where the movable electrode 30 does not contact the welding workpiece W and possible to position the movable electrode 30 at a welding location on the welding workpiece W, then perform an operation to make the movable electrode 30 separate from the welding workpiece W by exactly any distance.

Then, the multiarticulated robot 12 is used to make the welding workpiece W and spot welding gun 14 move relative to each other at the speed Vr to thereby make the welding workpiece W fixed on the workpiece table (not shown) and the movable electrode 30 of the spot welding gun 14 move relative to each other to make them approach at the speed Vr (step S200). Furthermore, the servo motor 34 is used to drive the movable electrode 30 to make the movable electrode 30 move with respect to the counter electrode 32 at the fine speed Vg (step S202). The speed Vg by which the servo motor 34 is used to make the movable electrode 30 move with respect to the counter electrode 32 is, as explained above, made an extremely low speed eliminating the static friction and keeping fluctuation of the torque of the servo motor 34 due to the dynamic friction at the minimum extent. Further, the movable electrode 30 is made to move relative to the counter electrode 32 for the purpose of eliminating the effect of the static friction of the movable electrode drive mechanism, so the movement of the movable electrode 30 with respect to the counter electrode 32 may, as shown in FIG. 45, be performed in a direction by which the movable electrode 30 approaches the counter electrode 32 (closing direction) or may, as shown in FIG. 46, be performed in a direction by which the movable electrode 30 separates from the counter electrode 32 (opening direction). For example, when making the movable electrode 30 move in a direction making it approach the counter electrode 32 and making it move in the opposite direction, the extent of variation of the torque of the servo motor 34 due to the dynamic friction sometimes differs, so the direction in which the movable electrode 30 is made to move should be selected so that the movable electrode 30 is made to move in a direction where the extent of variation at that time becomes smaller. Note that, when making the movable electrode 30 move in a direction away from the counter electrode 32, to enable the movable electrode 30 to approach the welding workpiece W overall, the multiarticulated robot 12 has to make the spot welding gun 14 move at a speed Vr of at least the speed Vg of movement of the movable electrode 30 with respect to the counter electrode 32 in a direction approaching the welding workpiece W.

Then, the torque limit of the servo motor 34 driving the movable electrode 30 is set (step S204). The set value of the torque limit of the servo motor 34 is subsequently set so as to enable the torque required for making the movable electrode 30 move with respect to the counter electrode 32 at the speed Vg to be sufficiently output from the servo motor 34 in the state when the movable electrode 30 does not contact the welding workpiece W. For example, from step S200 on, an operation is performed for making the movable electrode 30 approach the welding workpiece W at the predetermined speed Vg from the state when the welding workpiece W and movable electrode 30 are separated. The servo motor 34 outputs the torque required by the operation for making the movable electrode 30 approach the welding workpiece W at the speed Vg. Therefore, it is preferable to measure the torque of the servo motor 34 output in the preparatory operation zone after the start of relative movement of the welding workpiece W and the movable electrode 30 and before contact of the welding workpiece W and the movable electrode 30 and set the measured value of the torque plus an extra margin of the amount of fluctuation as the value of the torque limit. Further, as the set value of the torque limit, experiments etc. may be used to set a predetermined value. The C3-th embodiment is the same as the C1-th embodiment in the point of making the movable electrode 30 move with respect to the counter electrode 32. The details of setting of the torque limit are common with the C1-th embodiment on the other points, so the detailed explanation will be omitted here.

Then, in the state with the servo motor 34 set with a torque limit in this way, at least one of the speed of movement and acceleration of the movable electrode 30 with respect to the counter electrode 32 is monitored (step S206). The speed of movement and acceleration of the movable electrode 30 may be directly measured or may be found from the rotational speed and rotational acceleration of the servo motor 34 driving the movable electrode 30. Further, the speed of movement and acceleration of the movable electrode 30 with respect to the counter electrode 32 are respectively proportional to the rotational speed and rotational acceleration of the servo motor 34 for driving the movable electrode 30, so instead of the speed of movement or acceleration of the movable electrode 30, it is also possible to monitor the rotational speed or rotational acceleration of the servo motor 34 driving the movable electrode 30. At the time of monitoring, the information of the speed of movement or acceleration of the movable electrode 30 or the rotational speed or rotational acceleration of the servo motor 34 and the position data of the front end of the wrist element 28 of the multiarticulated robot 12 and the relative position data of the movable electrode 30 with respect to the counter electrode 32 are successively recorded for each sampling time.

The movable electrode 30 first moves at a preset constant speed Vg relative to the counter electrode 32, so at this time, the speed of movement of the movable electrode 30 with respect to the counter electrode 32 becomes Vg, and the acceleration of the movable electrode 30 with respect to the counter electrode 32 becomes 0. This is the same when the movable electrode is made to move in a direction approaching the counter electrode 32 and made to move in a direction separating from it.

When the movable electrode 30 is made to move in a direction approaching the counter electrode 32 at the speed Vg, the movable electrode 30 first moves relative to the counter electrode 32 at the preset constant speed Vg (>0), so at this time, the speed of movement of the movable electrode 30 with respect to the counter electrode 32 becomes Vg and the acceleration of the movable electrode 30 with respect to the counter electrode 32 becomes 0. Further, if the movable electrode 30 contacts the welding workpiece W, the welding workpiece W is pressed against the movable electrode 30 causing bending, denting, or other elastic deformation and a reaction force acts from the welding workpiece W to the movable electrode 30. This being so, the servo motor 34 is controlled to try to maintain the speed Vg constant and tries to output a larger torque so as to counter the reaction force from the welding workpiece W, but the output torque of the servo motor 34 reaches the torque limit, and the rotational speed and rotational acceleration of the servo motor 34 driving the movable electrode 30 decrease. As a result, the set speed Vg can no longer be maintained, the speed of movement of the movable electrode 30 with respect to the counter electrode 32 decreases from a predetermined value Vg, and the rotational speed of the servo motor 34 also decreases. Further, the acceleration of the movable electrode 30 and the rotational acceleration of the servo motor 34 with respect to the counter electrode 32 change from 0 to negative values.

On the contrary, when the movable electrode 30 is made to move in a direction separating from the counter electrode 32 at the speed Vg, the movable electrode 30 first moves relative to the counter electrode 32 at the preset constant speed Vg (<0), so at this time, the speed of movement of the movable electrode 30 with respect to the counter electrode 32 becomes Vg and the acceleration of the movable electrode 30 with respect to the counter electrode 32 becomes 0. Further, if the movable electrode 30 contacts the welding workpiece W, the welding workpiece W is pressed against the movable electrode 30 causing bending, denting, or other elastic deformation and a reaction force acts from the welding workpiece W to the movable electrode 30. This being so, since the movable electrode 30 is pressed by the welding workpiece W in a direction separating from the counter electrode 30, the servo motor 34 is controlled to try to maintain the speed Vg constant and tries to increase the torque in a direction making the movable electrode 30 approach the counter electrode 32 so as to counter the reaction force from the welding workpiece W, but the output torque of the servo motor 34 reaches the torque limit. As a result, the movable electrode 30 is accelerated in a direction further separating from the counter electrode 32. That is, the speed of movement of the movable electrode 30 and the rotational speed of the servo motor 34 further decrease from the negative values. Further, the acceleration of the movable electrode 30 and the rotational acceleration of the servo motor 34 with respect to the counter electrode 32 change from 0 to negative values.

Utilizing this, the speed of movement of the movable electrode 30 or the rotational speed of the servo motor 34 with respect to the counter electrode 32 or the acceleration of the movable electrode 30 or the rotational acceleration of the servo motor 34 with respect to the counter electrode 32 is successively checked (step S208). When the speed of movement of the movable electrode 30 or the rotational speed of the servo motor 34 with respect to the counter electrode 32 changes to a decrease or the acceleration of the movable electrode 30 or the rotational acceleration of the servo motor 34 with respect to the counter electrode 32 changes from 0 to a negative value, it is judged that the movable electrode 30 contacts the welding workpiece W. When not, it is judged that the movable electrode 30 does not contact the welding workpiece W.

When it is judged that the movable electrode 30 does not contact the welding workpiece W, the routine returns to step S202 where the speed of movement of the movable electrode 30 driven by the servo motor 34 continues to be set at Vg (step S202), if necessary, the set value of the torque limit of the servo motor 34 is reset (step S204), and at least one of the speed of movement and acceleration of the movable electrode 30 with respect to the counter electrode 32 continues to be monitored (step S206). When resetting the set values of the torque limit, for example, it is sufficient to determine and reset the set value of the torque limit based on the torque output by the servo motor 34 in an immediately preceding period of a predetermined length.

If judging that the movable electrode 30 has contacted the welding workpiece W, the movement of the movable electrode 30 and movement of the multiarticulated robot 12 with respect to the counter electrode 32 are made to stop, the surface position of the welding workpiece W at the movable electrode side is detected based on the position data of the front end of the wrist element 28 of the multiarticulated robot 12 and the relative position data of the front end of the counter electrode 32 of the spot welding gun 14 with respect to the front end of the wrist element 28 when it is judged that the movable electrode 30 contacts the welding workpiece W are used as the basis, and the process of detection of the surface position of the welding workpiece W is ended (step S210).

FIG. 47 show graphs showing changes in the torque, rotational speed, and rotational acceleration of the servo motor 34 when making the movable electrode 30 move in a direction separating from the counter electrode 32 while using the movable electrode 30 to detect the surface position of the welding workpiece W in the present embodiment. FIG. 47A is a graph of the torque, FIG. 47B is a graph of the rotational speed, and FIG. 47C is a graph of the rotational acceleration. Note that the graphs showing the changes in the speed of movement and acceleration of the movable electrode 30 with respect to the counter electrode 32 by a time series are respectively similar to FIG. 47B and FIG. 47C. In FIG. 47, the zone A shows the state when the detection operation is not being performed, the zone B shows the state during the detection operation when the movable electrode 30 does not contact the welding workpiece W, and the zone C shows the state during the detection operation when the movable electrode 30 contacts the welding workpiece W.

Note that, in the present embodiment, when making the movable electrode 30 move in a direction making it approach the counter electrode 32 while using the movable electrode 30 to detect the surface position of the welding workpiece W, at the point when the movable electrode 30 is moving in a direction approaching the counter electrode 32, the behaviors of the movable electrode 30 and servo motor 34 become similar to the C1-th embodiment. The graphs showing the changes in the torque, rotational speed, and rotational acceleration of the servo motor 34 by a time series are similar to the graphs respectively shown in FIG. 37A to FIG. 37C. Further, the graphs showing the changes of the speed of movement and acceleration of the movable electrode 30 with respect to the counter electrode 32 by a time series are also similar to FIG. 37B and FIG. 37C, so here detailed explanations will be omitted.

When making the movable electrode 30 move in a direction separating from the counter electrode 32 while using the movable electrode 30 to detect the surface position of the welding workpiece W, before the start of the detection operation, the movable electrode 30 is not driven by the servo motor 34 and is stationary with respect to the counter electrode 32. Therefore, at the zone A, the torque of the servo motor 34 is constant at a value holding the movable electrode 30 stationary with respect to the counter electrode 32 and the rotational speed (that is, the speed of movement of the movable electrode 30) and rotational acceleration (that is, the acceleration of the movable electrode 30) become 0. On the contrary, when the detection operation is started, the movable electrode 30 is made to move in a direction separating from the counter electrode 32 (that is, a negative direction) by a speed Vg (<0) with respect to the counter electrode 32, so at the zone B, until the speed of movement of the movable electrode 30 with respect to the counter electrode 32 reaches Vg, the torque and rotational speed of the servo motor 34 decrease. When reaching Vg, both become constant. Along with this, the acceleration of the movable electrode 30 and the rotational acceleration of the servo motor 34 with respect to the counter electrode 32 become negative values until the speed of movement of the movable electrode 30 with respect to the counter electrode 32 reaches Vg. Both become 0 when reaching Vg. Furthermore, at the zone C, if the movable electrode 30 contacts the welding workpiece W, the welding workpiece W elastically deforms and a reaction force acts from the welding workpiece W on the movable electrode 30, so the movable electrode 30 is pressed by the welding workpiece W in a direction where it is separated from the counter electrode 30. This being so, the servo motor 34 is controlled to try to maintain the speed Vg constant and tries to make the torque increase in a direction making the movable electrode 30 approach the counter electrode 32, but the output torque of the servo motor 34 reaches the torque limit and becomes constant. As a result, the rotational speed of the servo motor 34 decreases (increases in a negative direction) and the speed of movement of the movable electrode 30 with respect to the counter electrode 32 decreases from Vg (increases in a negative direction). Along with this, the rotational acceleration of the servo motor 34 and the acceleration of the movable electrode 30 with respect to the counter electrode 32 changes from 0 to a negative value. Note that, FIG. 47A shows the case where the value of the torque limit of the servo motor 34 is set to a value equal to the torque of the servo motor 34 at the zone B (that is, the torque of the servo motor 34 required for making the movable electrode 30 move with respect to the counter electrode 32 at the speed Vg). At the zone B and the zone C, the torque of the servo motor 34 is substantially a constant value.

By recording the torque of the servo motor 34 at the zone B, it is possible to determine the setting of the torque limit of the servo motor 34 based on the torque of the servo motor 34 at the zone B. Further, if providing a distance between the movable electrode 30 and the welding workpiece W in advance before the start of the detection operation, the zone B can be lengthened and a sufficient preparatory operation zone can be secured, so the torque of the servo motor 34 when the movable electrode 30 and the welding workpiece W do not contact can be reliably recorded.

In this way, even when making the movable electrode 30 move with respect to the counter electrode 32 by a low speed Vg while using the multiarticulated robot 12 to make the movable electrode 30 of the spot welding gun 14 move relatively in a direction making it approach the welding workpiece W, if designating the direction in which the movable electrode 30 approaches the counter electrode 32 as positive and the direction in which it separates from the counter electrode 32 as negative, in the same way as the C1-th embodiment, when the movable electrode 30 contacts the welding workpiece W, as shown in FIG. 37B or FIG. 47B, the speed of movement of the movable electrode 30 and the rotational speed of the servo motor 34 for driving the movable electrode 30 will change from a constant state and gradually decrease (when making the movable electrode 30 move in a direction separating from the counter electrode 32, the speed of movement of the movable electrode 30 and the rotational speed of the servo motor 34 thereby increasing in the negative direction). Therefore, if monitoring the speed of movement of the movable electrode 30 or the rotational speed of the servo motor 34, it is possible to judge that the movable electrode 30 contacts the welding workpiece W when the speed of movement of the movable electrode 30 or the rotational speed of the servo motor 34 changes from a substantially constant state to a decrease. Further, when the movable electrode 30 contacts the welding workpiece W, the acceleration of the movable electrode 30 or the rotational acceleration of the servo motor 34 for driving the movable electrode 30, as shown in FIG. 37c and FIG. 47c, changes from 0 to become a negative value. Therefore, if monitoring the acceleration of the movable electrode 30 or the rotational acceleration of the servo motor 34, it is possible to judge that the movable electrode 30 contacts the welding workpiece W when the acceleration of the movable electrode 30 or the rotational acceleration of the servo motor 34 changes from substantially 0 to a negative value.

Furthermore, it is possible to find the position data of the front end of the movable electrode 30 when it is judged that the movable electrode 30 has contacted the welding workpiece W from the position data of the front end of the wrist element 28 of the multiarticulated robot 12 and the relative position data of the movable electrode 30 with respect to the counter electrode 32 in the spot welding gun 14 when it is judged that the movable electrode 30 has contacted the welding workpiece W. If deeming the found position data of the front end of the movable electrode 30 to be the positional data of the surface of the welding workpiece W, it is possible to detect the surface position of the welding workpiece W at the movable electrode side surface.

The point of time when the speed of movement of the movable electrode 30 or the rotational speed of the servo motor 34 changes from a substantially constant state to a decrease is identified by analyzing the time-series curve, that is, waveform, of the speed of movement of the servo motor 34 or the rotational speed of the servo motor 34 and finding the point when the speed of movement of the movable electrode 30 or the rotational acceleration of the servo motor 34 changed from a substantially constant state to a decrease (hereinafter referred to as "the point of change"). If designating the direction in which the movable electrode 30 moves to approach the counter electrode 32 and the direction of rotation of the servo motor 34 at that time as positive and the direction in which the movable electrode 30 moves to separate from the counter electrode 32 and the direction of rotation of the servo motor 34 at that time as negative, the method of analysis of the time-series waveform of the speed of movement of the movable electrode 30 or the method of analysis of the time-series waveform of the rotational speed of the servo motor 34 for finding the point of change is the same as in the case of the C1-th embodiment, so detailed explanations will be omitted here.

If, like in the present embodiment, making the movable electrode 30 move with respect to the counter electrode 32 at the speed Vg while using the multiarticulated robot 12 to make the spot welding gun 14 and welding workpiece W move relatively so that the movable electrode 30 is made to approach the welding workpiece W, compared with the C2-th embodiment, the variation of the torque of the servo motor 34 becomes slightly larger by the amount of the dynamic friction of the movable electrode drive mechanism and, when setting the value of the torque limit of the servo motor 34, the extra margin added, considering torque fluctuation, to the torque required for maintaining the speed Vg of the movable electrode 30 has to be made larger, so detection of contact of the movable electrode 30 and the welding workpiece W becomes slightly more difficult, but almost the same advantageous effects are obtained as the case of the C2-th embodiment. Furthermore, as explained above, the insensitive zone due to the static friction in the movable electrode drive mechanism can be eliminated and fluctuation starts from the state when the torque of the servo motor 34 is constant immediately when the movable electrode 30 contacts the welding workpiece W. Therefore, the method of the present embodiment becomes effective when the static friction of the movable electrode drive mechanism is large and the detrimental effect due to the existence of the insensitive zone exceeds the effect caused by the suppression of variation of the torque of the servo motor 34 arising due to the dynamic friction of the movable electrode drive mechanism. The rest of the points are similar to the C2-th embodiment, so the explanations will be omitted here.

Above, illustrative embodiments were used to explain the present invention, but the present invention is not limited to the above-mentioned embodiments. For example, in the above embodiments, at least one of the speed of movement and acceleration of the movable electrode 30 was monitored and simultaneously the position data of the front end of the wrist element 28 of the multiarticulated robot 12 and the relative position data of the movable electrode 30 with respect to the counter electrode 32 were recorded. However, the multiarticulated robot 12 and movable electrode 30 operate based on operating commands on a time series from the robot control device 16 and spot welding gun control device 18, so it is also possible to find the position data of the front end of the wrist element 28 of the multiarticulated robot 12 and the relative position data of the movable electrode 30 with respect to the counter electrode 32 of a past time from the executed operating instructions of the multiarticulated robot 12 and movable electrode 30.

EFFECTS OF INVENTION

According to the aspect A, the operation for making the movable electrode and welding workpiece contact each other from the separated state or making the movable electrode and welding workpiece separate from each other from the contact state is performed by movement of the multiarticulated robot instead of the movement of the movable electrode by the servo motor, so the speed of movement of the movable electrode is reduced by exactly the amount of the speed of movement by the multiarticulated robot and thereby the movement of the movable electrode by the servo motor can be kept to the minimum extent and the fluctuation of the current or torque of the servo motor due to the dynamic friction of the movable electrode drive mechanism can be made smaller. Therefore, it becomes possible to more accurately detect the instant when the movable electrode and welding workpiece contact and improve the detection precision of the surface position of the welding workpiece. Furthermore, since the variation of the current or torque of the servo motor driving the movable electrode becomes smaller, even in the case of a soft welding workpiece, the change in the current or torque of the servo motor when the movable electrode and welding workpiece contact will no longer end up being hidden by the fluctuation of the current or torque of the servo motor due to the dynamic friction of the movable electrode drive mechanism and detection of the surface position of the welding workpiece by the movable electrode becomes easier.

Further, by not making the speed of movement of the movable electrode by the servo motor increase, but by making the relative speed of movement between the spot welding gun and welding workpiece by the multiarticulated robot increase, the time for detection of the surface position of the welding workpiece can be shortened, so even if reducing the speed of movement of the movable electrode for suppressing the fluctuation of the current or torque of the servo motor due to dynamic friction, it is possible to make the relative speed of movement between the spot welding gun and welding workpiece by the multiarticulated robot increase to thereby maintain the relative speed of movement between the movable electrode and welding workpiece. It is possible to improve the precision of detection of the surface position of the welding workpiece without lengthening the time required for detection of the surface position of the welding workpiece by the movable electrode.

Furthermore, by using the position of the movable electrode and the position of the multiarticulated robot when the trend of change of the current or torque of the servo motor changes, it is possible to accurately detect the surface position of the welding workpiece without using a complex workpiece deformation model even with an amount of deformation of the workpiece dependent in complex calculations, the material or method of fastening of the welding workpiece, or the mechanical rigidity of the spot welding gun.

According to the aspect B, the movable electrode is made to move in a direction making it approach the counter electrode at the speed Vg and the spot welding gun and welding workpiece are made to move relatively at the same speed as the speed Vg so as to make the counter electrode and welding workpiece approach each other from the state positioning the movable electrode so as to be contiguous with the surface of the welding workpiece or from the state positioning it at a position offset from the surface of the welding workpiece by exactly a predetermined distance, so when the counter electrode contacts the welding workpiece, the movement of the movable electrode with respect to the counter electrode is inhibited, the speed of movement of the movable electrode with respect to the counter electrode falls from the predetermined speed Vg, and the acceleration of the movable electrode with respect to the counter electrode changes from 0 to negative. By utilizing this and monitoring the speed of movement or acceleration of the movable electrode with respect to the counter electrode, it is possible to detect the contact of the counter electrode with the welding workpiece without being affected by the rigidity of the welding workpiece, spot welding gun, and multiarticulated robot and possible to detect the surface position of the welding workpiece which the counter electrode contacts from the position data of the counter electrode when it is judged that the counter electrode has contacted the welding workpiece.

Further, it is possible to accurately find the thickness of the welding workpiece from the found surface position of the welding workpiece which the counter electrode contacts and the surface position of the welding workpiece which the movable electrode contacts found by another method.

According to the aspect C, by monitoring at least one of the speed of movement and acceleration of the movable electrode with respect to the counter electrode, it is possible to detect contact of the welding workpiece and the movable electrode and to use the position of the movable electrode at the time of contact as the basis to find the movable electrode side surface position of the welding workpiece. Further, the servo motor driving the movable electrode is subjected to speed control, so the speed of movement and acceleration of the movable electrode with respect to the counter electrode are resistant to fluctuation or variation due to the mechanical properties of the spot welding gun. Furthermore, if setting the servo motor with a torque limit, when the movable electrode contacts the welding workpiece, the speed of movement of the movable electrode with respect to the counter electrode will remarkably fall. Therefore, the change in the speed of movement or acceleration of the servo motor when the movable electrode contacts the welding workpiece will become much more marked than the change of the current or torque of the servo motor and there will be greater resistance to the effects of fluctuation or variation due to the mechanical properties of the spot welding gun, so the point of time of contact of the movable electrode and welding workpiece can be accurately detected.

The invention claimed is:

1. A method of detection of a welding workpiece position using a movable electrode to detect a surface position of a welding workpiece in a spot welding system provided with a spot welding gun having a movable electrode driven by a servo motor and a counter electrode arranged facing the movable electrode and a multiarticulated robot holding one of the welding workpiece and the spot welding gun, the servo motor being used to make the movable electrode and the counter electrode approach and move away from each other and clamp the welding workpiece between the counter electrode and the movable electrode of the spot welding gun for spot welding the welding workpiece, which method comprises steps of using the multiarticulated robot to make the welding workpiece and the spot welding gun move relative to each other so that the movable electrode and the welding workpiece are made to approach each other from a separated state or to move away from each other from a contact state, while doing this, monitoring a current or torque of the servo motor and, when a trend of change of the current or torque changes, judging that the movable electrode has contacted the welding workpiece or that the movable electrode has separated from the welding workpiece, and detecting the surface position of the welding workpiece from the position of the movable electrode and the position of the multiarticulated robot when the trend of change of the current or torque has changed.

2. A method of detection of the welding workpiece position using a movable electrode as set forth in claim 1, further comprising, when monitoring the current or torque of said servo motor to detect the position of said welding workpiece, using said servo motor to drive said movable electrode at a speed Vg while using said multiarticulated robot to make said spot welding gun and said welding workpiece move relative to each other.

3. A method of detection of the welding workpiece position using a movable electrode as set forth in claim 2, wherein the speed Vg is a speed of an extent enabling elimination of static friction of a mechanism for driving said movable electrode.

4. A method of detection of the welding workpiece position using a movable electrode as set forth in claim 1, further comprising steps of monitoring the current or torque of said servo motor to detect the position of said welding workpiece while using said multiarticulated robot to make said spot welding gun and said welding workpiece move relative to each other in a direction making the movable electrode and the welding workpiece approach each other from a separated state and judging said movable electrode has contacted said welding workpiece when the actual value or amount of change per unit time of the current or torque of said servo motor changes to a trend of increase compared with the value or amount of change of the current or torque of said servo motor when assuming a reference state.

5. A method of detection of a welding workpiece position detecting a surface position of a welding workpiece which a counter electrode contacts in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and separate from each other and insert the welding workpiece between the movable electrode and the counter electrode of the spot welding gun for spot welding the welding workpiece, which method comprises steps of positioning the movable electrode so as to be contiguous with the surface of the welding workpiece, then using the servo motor to make the movable electrode move by a predetermined speed Vg in a direction making it approach the counter electrode, simultaneously using the multiarticulated robot to make the spot welding gun and the welding workpiece move relative to each other at a speed the same as the speed Vg so as to make the counter electrode and the welding workpiece approach each other, while doing so, monitoring at least one of the speed of movement and acceleration of the movable electrode with respect to the counter electrode, and thereby detecting contact of the counter electrode and the welding workpiece and detecting the surface position of the welding workpiece, to which the counter electrode contacts, from the detected position of the counter electrode.

6. A method of detection of the welding workpiece position using a movable electrode as set forth in claim 5, wherein the servo motor for driving said movable electrode with respect to said counter electrode is set with a torque limit.

7. A method of detection of the welding workpiece position using a movable electrode as set forth in claim 6, wherein the torque limit of said servo motor is set based on the value of the torque of said servo motor when making said spot welding gun and said welding workpiece move by the same speed as said speed Vg.

8. A method of detection of a welding workpiece position detecting respective surface positions of a welding workpiece to which a movable electrode and a counter electrode contact in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and move away from each other and clamp the welding workpiece between the counter electrode and the movable electrode of the spot welding gun for spot welding the welding workpiece, which method comprises steps of using the multiarticulated robot to make the welding workpiece and the spot welding gun move relative to each other so that the movable electrode and the welding workpiece are made to approach each other from a separated state or to separate from each other from a contact state, while doing so, monitoring a current or torque of the servo motor and, when a trend of change of the current or torque changes, judging that the movable electrode has contacted the welding workpiece or that the movable electrode has moved away from the welding workpiece, detecting the surface position of the welding workpiece, to which the movable electrode contacts, from the position of the movable electrode and the position of the multiarticulated robot when the trend of change of the current or torque has changed, and detecting the surface position of the welding workpiece which the counter electrode contacts by the method of detection of the welding workpiece position of claim 5.

9. A method of detection of the welding workpiece position using a movable electrode as set forth in claim 8, further including a step of finding a thickness of the welding workpiece from the detected surface position of the welding workpiece to which said movable electrode contacts and the detected surface position of the welding workpiece to which said counter electrode contacts.

10. A method of detection of a welding workpiece position detecting a surface position of a welding workpiece to which a movable electrode contacts in a spot welding system provided with a spot welding gun having a movable electrode driven by a servo motor and a counter electrode arranged facing the movable electrode and a multiarticulated robot holding one of the welding workpiece and the spot welding gun and making it move relative to the other, the servo motor being used to make the movable electrode and the counter electrode approach and move away from each other and clamp the welding workpiece between the counter electrode and the movable electrode of the spot welding gun for spot welding the welding workpiece,
　　which method comprises steps of making the movable electrode and the welding workpiece move relative to each other so as to approach each other from a separated state, monitoring at least one of the speed of movement and acceleration of the movable electrode with respect to the counter electrode during the relative movement of the movable electrode and the welding workpiece, judging that the movable electrode has contacted the welding workpiece when the speed of movement or acceleration of the movable electrode with respect to the counter electrode has changed, and finding a surface position of the welding workpiece from the position of the movable electrode and the position of the multiarticulated robot when the speed of movement or acceleration changed.

11. A method of detection of the welding workpiece position using a movable electrode as set forth in claim 10, further comprising a step of setting said servo motor driving said movable electrode with a torque limit and in that state making said movable electrode and said welding workpiece move relative to each other so that they approach each other from a separated state.

12. A method of detection of the welding workpiece position using a movable electrode as set forth in claim 11, wherein the torque limit of said servo motor is set to at least a value of a torque required for maintaining the speed of movement of said movable electrode with respect to said counter electrode at a constant level.

13. A method of detection of the welding workpiece position using a movable electrode as set forth in claim 12, wherein the torque limit of the servo motor is set based on the value of the torque of said servo motor when said movable electrode is moving in a preparatory operation zone after the start of relative movement of said movable electrode and said welding workpiece and before contact of said movable electrode and said welding workpiece.

14. A method of detection of the welding workpiece position using a movable electrode as set forth in claim 13, wherein the relative movement of said movable electrode and said welding workpiece is performed by using said servo motor to drive said movable electrode so as to make said movable electrode approach said counter electrode.

15. A method of detection of the welding workpiece position as set forth in claim 1 wherein said method of detection of the welding workpiece position is performed by executing welding program instructions.

\* \* \* \* \*